(12) United States Patent
Li et al.

(10) Patent No.: US 11,258,571 B2
(45) Date of Patent: Feb. 22, 2022

(54) DOWNLINK CONTROL INFORMATION TRANSMISSION METHOD, APPARATUS, AND SYSTEM

(71) Applicant: Huawei Technologies Co., Ltd., Shenzhen (CN)

(72) Inventors: Hua Li, Shanghai (CN); Hao Tang, Shanghai (CN); Yi Wang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 16/780,024

(22) Filed: Feb. 3, 2020

(65) Prior Publication Data

US 2020/0177355 A1    Jun. 4, 2020

Related U.S. Application Data

(63) Continuation of application No. PCT/CN2018/094958, filed on Jul. 9, 2018.

(30) Foreign Application Priority Data

Aug. 11, 2017    (CN) .......................... 201710685372.6

(51) Int. Cl.
*H04L 12/28*    (2006.01)
*H04L 5/00*    (2006.01)
(Continued)

(52) U.S. Cl.
CPC .......... *H04L 5/0092* (2013.01); *H04L 5/0044* (2013.01); *H04W 72/042* (2013.01); *H04W 72/0453* (2013.01)

(58) Field of Classification Search
CPC .. H04L 5/0053; H04W 72/04; H04W 72/0453
(Continued)

(56) References Cited

U.S. PATENT DOCUMENTS

2013/0188505 A1    7/2013   Nory et al.
2017/0048829 A1    2/2017   Kim et al.
(Continued)

FOREIGN PATENT DOCUMENTS

CN    102577571 A    7/2012
CN    102934503 A    2/2013
(Continued)

OTHER PUBLICATIONS

Mediatek, "Evaluation on UE-specific RF Bandwidth Adaptation for Wider Bandwidth Operation," 3GPP TSG RAN WG1 Meeting #88 R1-1702725, Athens, Greece, Feb. 13-17, 2017, 9 pages.
(Continued)

*Primary Examiner* — John Pezzlo
(74) *Attorney, Agent, or Firm* — Slater Matsil, LLP

(57) ABSTRACT

This application provides a downlink control information transmission method, an apparatus, and a system. The method includes: sending, by a gNB, downlink control information (DCI) to UE on a first bandwidth resource, where the DCI is used for data transmission between the gNB and the UE on the first bandwidth resource or data transmission between the gNB and the UE on a second bandwidth resource; and if the DCI is used for data transmission between the gNB and the UE on the first bandwidth resource, a size of the DCI is L1_1, or if the DCI is used for data transmission between the gNB and the UE on the second bandwidth resource, a size of the DCI is L1_2, where L1_1 is equal to L1_2, and L1_1 and L1_2 are integers greater than or equal to 1.

15 Claims, 16 Drawing Sheets

(51) Int. Cl.
*H04W 72/04* (2009.01)
*H04J 1/16* (2006.01)
(58) Field of Classification Search
USPC .................................. 370/252, 329, 430
See application file for complete search history.

(56) References Cited

U.S. PATENT DOCUMENTS

| 2018/0255578 A1* | 9/2018 | Kim .................. H04W 72/1268 |
| 2019/0165894 A1* | 5/2019 | Choi ....................... H04B 17/24 |

FOREIGN PATENT DOCUMENTS

| CN | 102938934 A | 2/2013 |
| CN | 103298118 A | 9/2013 |
| CN | 104521306 A | 4/2015 |
| CN | 103298119 B | 4/2016 |
| WO | 2011044494 A1 | 4/2011 |
| WO | 2011084822 A1 | 7/2011 |
| WO | 2016146181 A1 | 9/2016 |

OTHER PUBLICATIONS

Guangdong Oppo Mobile Telecom, "Bandwidth part configuration and frequency resource allocation," 3GPP TSG RAN WG1 NR Ad-Hoc#2, R1-1710164, Qingdao, P.R. China, Jun. 27-30, 2017, 6 pages.
3GPP TS 38.212 V0.0.0 (May 2017);3rd Generation Partnership Project;Technical Specification Group Radio Access Network;NR;Multiplexing and channel coding(Release 15);total 10 pages.
Huawei et al., "Resource allocation and indication for data channel," 3GPP TSG RAN WG1 Meeting #88bis, R1 -1705069, Spokane, WA, USA, Apr. 3-7, 2017, 8 pages.
Intel Corporation, "Timing relationships for DL scheduling," 3GPP TSG RAN WG1 #89, R1-1707403, Hangzhou, P.R. China, May 15-19, 2017, 5 pages.
NEC et al., "WF on UL Resource Allocation for PUSCH with DFT-s-OFDM waveform in NR," 3GPP TSG-RAN WG1 NR Ad-Hoc#2, R1-1711753, Qingdao, P.R. China, Jun. 27-30, 2017, 3 pages.
3GPP TS 36.213 V14.3.0 (Jun. 2017);3rd Generation Partnership Project;Technical Specification Group Radio Access Network;Evolved Universal Terrestrial Radio Access (E-UTRA);Physical layer procedures(Release 14);total 460 pages.
Ericsson, "On Resource Allocation in the Frequency Domain", 3GPP TSG RAN WG1 NR Ad-Hoc#2, R1-1711499, Qingdao, P.R. China, Jun. 27-30, 2017, 4 pages.
Nokia et al., "On resource allocation in frequency domain for PDSCH and PUSCH in NR", 3GPP TSG RAN WG1 Ad Hoc Meeting #2, R1-1710989, Qingdao, China, Jun. 27-30, 2017, 4 pages.

\* cited by examiner

DOWNLINK CONTROL INFORMATION TRANSMISSION METHOD, APPARATUS, AND SYSTEM

CROSS-REFERENCE TO RELATED APPLICATIONS

This application is a continuation of International Application No. PCT/CN2018/094958, filed on Jul. 9, 2018, which claims priority to Chinese Patent Application No. 201710685372.6, filed on Aug. 11, 2017, the disclosures of the aforementioned applications are hereby incorporated by reference in their entireties.

TECHNICAL FIELD

This application relates to the field of communications technologies, and in particular, to a downlink control information transmission method, an apparatus, and a system.

BACKGROUND

In a wireless communications system, a network device sends downlink control information (DCI) to a terminal device, for data transmission between the network device and the terminal device. For example, the network device sends the downlink control information to the terminal device through a downlink control channel (PDCCH). The downlink control information includes scheduling information of a data channel. The network device and the terminal device perform data transmission through the data channel based on the scheduling information. The downlink control information plays an important role in data transmission. Therefore, in the wireless communications system, design of the downlink control information is a key research topic.

SUMMARY

According to a first aspect, this application provides a downlink control information transmission method, including: sending downlink control information (DCI) on a first bandwidth resource, where the DCI is used for data transmission on the first bandwidth resource or data transmission on a second bandwidth resource; and if the DCI is used for data transmission on the first bandwidth resource, a size of the DCI is L1_1, or if the DCI is used for data transmission on the second bandwidth resource, a size of the DCI is L1_2, where L1_1 is equal to L1_2, and L1_1 and L1_2 are integers greater than or equal to 1.

In a first design, according to the first aspect, the DCI includes resource allocation information; and if the DCI is used for data transmission on the first bandwidth resource, the resource allocation information indicates a resource allocated in the first bandwidth resource, and a length of the resource allocation information is L2_1, or if the DCI is used for data transmission on the second bandwidth resource, the resource allocation information indicates a resource allocated in the second bandwidth resource, and a length of the resource allocation information is L2_2, where L2_1 is equal to L2_2, and L2_1 and L2_2 are integers greater than or equal to 1.

In a second design, according to the first design of the first aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is $\max(N_{RBG}(i))$ or $\max(\lceil \log_2(N_{RBG}(i) \times (N_{RBG}(i)+1)/2) \rceil)$, where a value of, ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a third design, according to the second design of the first aspect, the method further includes: predefining the quantity of RBs in the RBG in the $i^{th}$ bandwidth resource; sending RRC signaling, where the RRC signaling is used to indicate the quantity of RBs in the RBG in the $i^{th}$ bandwidth resource; or determining the quantity of RBs in the RBG in the $i^{th}$ bandwidth resource based on a bandwidth of the $i^{th}$ bandwidth resource and a mapping relationship between a bandwidth and an RBG size.

In a fourth design, according to the first design of the first aspect, the method further includes: determining the length of the resource allocation information in the DCI based on the first bandwidth resource. In an example, the length of the resource allocation information in the DCI is $N_{RBG\_1}$ or $\lceil \log_2(N_{RBG\_1} \times (N_{RBG\_1}+1)/2) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fifth design, according to the fourth design of the first aspect, the method further includes: predefining the quantity of RBs in the first RBG; sending RRC signaling, where the RRC signaling is used to indicate the quantity of RBs in the first RBG; or determining the quantity of RBs in the first RBG based on a bandwidth of the first bandwidth resource and a mapping relationship between a bandwidth and an RBG size.

In a sixth design, according to the fourth design of the first aspect or the fifth design of the first aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; sending RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

In a seventh design, according to the first design of the first aspect, if the DCI is used for data transmission on the first bandwidth resource, the resource allocation information in the DCI includes an X1_1-bit bitmap and X1_2 padding bits, where one bit in the X1_1-bit bitmap is corresponding to one first RBG in the first bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. X1_1 is an integer greater than or equal to 1, and X1_2 is an integer greater than or equal to 0. If the DCI is used for data transmission on the second bandwidth resource, the resource allocation information in the DCI includes a Y1_1-bit bitmap and Y1_2 padding bits, where one bit in the Y1_1-bit bitmap is corresponding to one second RBG in the second bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. Y1_1 is an integer greater than or equal to 1, Y1_2 is an integer greater than or equal to 0, and t1 and t2 are integers.

In an eighth design, according to the seventh design of the first aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is $\max(N_{RBG}(i))$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a ninth design, according to the seventh design of the first aspect, the method further includes: determining the length of the resource allocation information in the DCI based on the first bandwidth resource. In an example, the length of the resource allocation information in the DCI is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a tenth design, according to the ninth design of the first aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; sending RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

In an eleventh design, according to the first design of the first aspect, if the DCI is used for data transmission on the first bandwidth resource, the resource allocation information in the DCI includes an X2_1-bit resource indicator value RIV and X2_2 padding bits, and the X2_1-bit RIV indicates a start first RBG allocated in the first bandwidth resource and a quantity of first RBGs consecutively allocated in the first bandwidth resource, where X2_1 is an integer greater than or equal to 1, and X2_2 is an integer greater than or equal to 0. If the DCI is used for data transmission on the second bandwidth resource, the resource allocation information in the DCI includes a Y2_1-bit RIV and Y2_2 padding bits, and the Y2_1-bit RIV indicates a start second RBG allocated in the second bandwidth resource and a quantity of second RBGs consecutively allocated in the second bandwidth resource, where Y2_1 is an integer greater than or equal to 1, and Y2_2 is an integer greater than or equal to 0.

In a twelfth design, according to the eleventh design of the first aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is $\max(\lceil \log_2(N_{RBG}(i) \times (N_{RBG}(i)+1)/2) \rceil)$, where a value of, ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a thirteenth design, according to the eleventh design of the first aspect, the method further includes: determining the length of the resource allocation information in the DCI based on the first bandwidth resource. In an example, the length of the resource allocation information in the DCI is $\lceil \log_2((N_{RBG\_1} \times (N_{RBG\_1}+1)/2) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fourteenth design, according to the thirteenth design of the first aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; sending RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

According to a second aspect, this application provides a downlink control information transmission method, including: receiving downlink control information (DCI) on a first bandwidth resource, where the DCI is used for data transmission on the first bandwidth resource or data transmission on a second bandwidth resource; and if the DCI is used for data transmission on the first bandwidth resource, a size of the DCI is L1_1, or if the DCI is used for data transmission on the second bandwidth resource, a size of the DCI is L1_2, where L1_1 is equal to L1_2, and L1_1 and L1_2 are integers greater than or equal to 1. According to this design, during cross-bandwidth-resource scheduling, a quantity of times that UE detects DCI can be reduced, thereby reducing power consumption of the UE.

In a first design, according to the second aspect, the DCI includes resource allocation information; and if the DCI is used for data transmission on the first bandwidth resource, the resource allocation information indicates a resource allocated in the first bandwidth resource, and a length of the resource allocation information is L2_1, or if the DCI is used for data transmission on the second bandwidth resource, the resource allocation information indicates a resource allocated in the second bandwidth resource, and a length of the resource allocation information is L2_2, where L2_1 is equal to L2_2, and L2_1 and L2_2 are integers greater than or equal to 1. According to this design, a length of the DCI used for data transmission on the first bandwidth resource can be identical to a length of the DCI used for data transmission on the second bandwidth resource; and during cross-bandwidth-resource scheduling, the quantity of times that the UE detects DCI can be reduced, thereby reducing the power consumption of the UE.

In a second design, according to the first design of the second aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is max($N_{RBG}(i)$) or max($\lceil \log_2(N_{RBG}(i) \times (N_{RBG}(i)+1)/2) \rceil$), where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}((i)/S_{RBG}(i)) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a third design, according to the second design of the second aspect, the method further includes: predefining the quantity of RBs in the RBG in the $i^{th}$ bandwidth resource; receiving RRC signaling, where the RRC signaling is used to indicate the quantity of RBs in the RBG in the $i^{th}$ bandwidth resource; or determining the quantity of RBs in the RBG in the $i^{th}$ bandwidth resource based on a bandwidth of the $i^{th}$ bandwidth resource and a mapping relationship between a bandwidth and an RBG size.

In a fourth design, according to the first design of the second aspect, the method further includes: determining the length of the resource allocation information in the DCI based on the first bandwidth resource. In an example, the length of the resource allocation information in the DCI is $\lceil N_{RB\_1}/S_{RBG\_1} \rceil$ or $\lceil \log_2(N_{RBG\_1} \times (N_{RBG\_1}+1)/2) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$, is a quantity of RBs in the first RBG, and the RB in the first RBG is an RB in the first bandwidth resource.

In a fifth design, according to the fourth design of the second aspect, the method further includes: predefining the quantity of RBs in the first RBG; receiving RRC signaling, where the RRC signaling is used to indicate the quantity of RBs in the first RBG; or determining the quantity of RBs in the first RBG based on a bandwidth of the first bandwidth resource and a mapping relationship between a bandwidth and an RBG size.

In a sixth design, according to the fourth design of the second aspect or the fifth design of the second aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; receiving RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

In a seventh design, according to the first design of the second aspect, if the DCI is used for data transmission on the first bandwidth resource, the resource allocation information in the DCI includes an X1_1-bit bitmap and X1_2 padding bits, where one bit in the X1_1-bit bitmap is corresponding to one first RBG in the first bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. X1_1 is an integer greater than or equal to 1, and X1_2 is an integer greater than or equal to 0. If the DCI is used for data transmission on the second bandwidth resource, the resource allocation information in the DCI includes a Y1_1-bit bitmap and Y1_2 padding bits, where one bit in the Y1_1-bit bitmap is corresponding to one second RBG in the second bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. Y1_1 is an integer greater than or equal to 1, Y1_2 is an integer greater than or equal to 0, and t1 and t2 are integers. According to this design, during resource allocation, any RBG in a bandwidth resource can be allocated to the UE based on a value of each bit in the bitmap for data transmission. This can provide flexible resource configuration, and can be used for continuous and discontinuous resource allocation.

In an eighth design, according to the seventh design of the second aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is max($N_{RBG}(i)$), where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource. According to this design, during cross-bandwidth-resource scheduling, when bandwidths of different bandwidth resources are different, lengths of resource allocation information that are determined based on the different bandwidth resources are different, and a maximum length of resource allocation information is determined as a length of resource allocation information used for cross-bandwidth-resource scheduling. This can satisfy a requirement of performing resource allocation based on different bandwidth resources.

In a ninth design, according to the seventh design of the second aspect, the method further includes: determining the length of the resource allocation information in the DCI based on the first bandwidth resource. In an example, the length of the resource allocation information in the DCI is a quantity of first RBGs in the first bandwidth resource. For example, the quantity of first RBGs in the first bandwidth resource is $\lceil N_{RB\_1}/S_{RBG\_1} \rceil$, where $N_{RB\_1}$, is a quantity of RBs in the first bandwidth resource, $S_{RBG\_1}$ is a quantity of RBs in the first RBG, and the RB in the first RBG is an RB in the first bandwidth resource. According to this design, during cross-bandwidth-resource scheduling, when bandwidths of the first bandwidth resource and the second bandwidth resource are different, the length of the resource allocation information is determined based on the first bandwidth resource. This can avoid that the length of the resource allocation information exceeds an actual required length, thereby reducing signaling overheads.

In a tenth design, according to the ninth design of the second aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; receiving RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

In an eleventh design, according to the first design of the second aspect, if the DCI is used for data transmission on the first bandwidth resource, the resource allocation information in the DCI includes an X2_1-bit resource indicator value (RIV) and X2_2 padding bits, and the X2_1-bit RIV indicates a start first RBG allocated in the first bandwidth resource and a quantity of first RBGs consecutively allocated in the first bandwidth resource, where X2_1 is an integer greater than or equal to 1, and X2_2 is an integer greater than or equal to 0. If the DCI is used for data transmission on the second bandwidth resource, the resource allocation information in the DCI includes a Y2_1-bit RIV and Y2_2 padding bits, and the Y2_1-bit RIV indicates a start second RBG allocated in the second bandwidth resource and a quantity of second RBGs consecutively allocated in the second bandwidth resource, where Y2_1 is an integer greater than or equal to 1, and Y2_2 is an integer greater than or equal to 0. According to this design, during resource allocation, joint coding is performed on an index of an allocated start RBG and a quantity of consecutively allocated RBGs, so that resource allocation can be performed for the UE by using less information, thereby reducing signaling overheads.

In a twelfth design, according to the eleventh design of the second aspect, the method further includes: determining the length of the resource allocation information in the DCI based on M bandwidth resources, where M is an integer greater than or equal to 2, and the M bandwidth resources include the first bandwidth resource and the second bandwidth resource. In an example, the length of the resource allocation information in the DCI is $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a thirteenth design, according to the eleventh design of the second aspect, the method further includes: determining the length of the resource allocation information in the DCI based on the first bandwidth resource. In an example, the length of the resource allocation information in the DCI is $\lceil \log((N_{RBG\_1}(N_{RBG\_1} \times (N_{RBG\_1}+1)/2)) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fourteenth design, according to the thirteenth design of the second aspect, if the DCI is used for data transmission on the second bandwidth resource, the resource allocation information in the DCI indicates a second RBG allocated in the second bandwidth resource, and an RB in the second RBG is an RB in the second bandwidth resource; and the design further includes: predefining a quantity of RBs in the second RBG; receiving RRC signaling, where the RRC signaling is used to indicate a quantity of RBs in the second RBG; determining a quantity of RBs in the second RBG based on the length of the resource allocation information in the DCI and a bandwidth of the second bandwidth resource; determining a quantity of RBs in the second RBG based on a bandwidth of the first bandwidth resource and a mapping relationship between a bandwidth and an RBG size; or determining a quantity of RBs in the second RBG based on a bandwidth of the second bandwidth resource and a mapping relationship between a bandwidth and an RBG size.

According to a third aspect, this application provides a network device, where the network device is capable of implementing at least one function in any one of the first aspect or the designs of the first aspect. The function may be implemented in a form of hardware, software, or a combination of hardware and software. The hardware or software includes one or more modules corresponding to the foregoing function. In an example, the network device includes: a processor; a memory, where the memory is coupled to the processor, and the processor executes a program instruction stored in the memory; and a transceiver, where the transceiver is coupled to the processor, and the processor uses the transceiver to send downlink control information DCI on a first bandwidth resource, where the DCI is used for data transmission on the first bandwidth resource or data transmission on a second bandwidth resource; and if the DCI is used for data transmission on the first bandwidth resource, a size of the DCI is L1_1, or if the DCI is used for data transmission on the second bandwidth resource, a size of the DCI is L1_2, where L1_1 is equal to L1_2, and L1_1 and L1_2 are integers greater than or equal to 1.

In a first design, according to the third aspect, the DCI includes resource allocation information; and if the DCI is used for data transmission on the first bandwidth resource, the resource allocation information indicates a resource allocated in the first bandwidth resource, and a length of the resource allocation information is L2_1, or if the DCI is used for data transmission on the second bandwidth resource, the resource allocation information indicates a resource allocated in the second bandwidth resource, and a length of the resource allocation information is L2_2, where L2_1 is equal to L2_2, and L2_1 and L2_2 are integers greater than or equal to 1.

In a second design, according to the first design of the third aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(N_{RBG}(i))$ or $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. The processor is further configured to determine that a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a third design, according to the second design of the third aspect, the processor is further configured to: predefine the quantity of RBs in the RBG in the $i^{th}$ bandwidth resource; use the transceiver to send RRC signaling, where the RRC signaling is used to indicate the quantity of RBs in the RBG in the $i^{th}$ bandwidth resource; or determine the quantity of RBs in the RBG in the $i^{th}$ bandwidth resource based on a bandwidth of the $i^{th}$ bandwidth resource and a mapping relationship between a bandwidth and an RBG size.

In a fourth design, according to the first design of the third aspect, the processor is further configured to determine the length of the resource allocation information in the DCI based on the first bandwidth resource. In an example, the processor determines that the length of the resource allocation information is $N_{RBG\_1}$ or $\lceil \log_2(N_{RBG\_1} \times (N_{RBG\_1}+1)/2) \rceil$, where $N_{RBG\_1}$ is a quantity of first RBGs in the first bandwidth resource. The processor is further configured to determine that the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fifth design, according to the fourth design of the third aspect, the processor is further configured to: predefine the quantity of RBs in the first RBG; use the transceiver to send RRC signaling, where the RRC signaling is used to indicate the quantity of RBs in the first RBG; or determine the quantity of RBs in the first RBG based on a bandwidth of the first bandwidth resource and a mapping relationship between a bandwidth and an RBG size.

In a sixth design, according to the fourth design of the third aspect or the fifth design of the third aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver to send RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

In a seventh design, according to the first design of the third aspect, if the DCI is used for data transmission on the first bandwidth resource, the resource allocation information in the DCI includes an X1_1-bit bitmap and X1_2 padding bits, where one bit in the X1_1-bit bitmap is corresponding to one first RBG in the first bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. X1_1 is an integer greater than or equal to 1, and X1_2 is an integer greater than or equal to 0. If the DCI is used for data transmission on the second bandwidth resource, the resource allocation information in the DCI includes a Y1_1-bit bitmap and Y1_2 padding bits, where one bit in the Y1_1-bit bitmap is corresponding to one second RBG in the second bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. Y1_1 is an integer greater than or equal to 1, Y1_2 is an integer greater than or equal to 0, and t1 and t2 are integers.

In an eighth design, according to the seventh design of the third aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(N_{RBG}(i))$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a ninth design, according to the seventh design of the third aspect, the processor is further configured to determine the length of the resource allocation information in the DCI based on the first bandwidth resource. In an example, the processor determines that the length of the resource allocation information in the DCI is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a tenth design, according to the ninth design of the third aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver to send RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

In an eleventh design, according to the first design of the third aspect, if the DCI is used for data transmission on the first bandwidth resource, the resource allocation information in the DCI includes an X2_1-bit resource indicator value RIV and X2_2 padding bits, and the X2_1-bit RIV indicates a start first RBG allocated in the first bandwidth resource and a quantity of first RBGs consecutively allocated in the first bandwidth resource, where X2_1 is an integer greater than or equal to 1, and X2_2 is an integer greater than or equal to 0. If the DCI is used for data transmission on the second bandwidth resource, the resource allocation information in the DCI includes a Y2_1-bit RIV and Y2_2 padding bits, and the Y2_1-bit RIV indicates a start second RBG allocated in the second bandwidth resource and a quantity of second RBGs consecutively allocated in the second bandwidth resource, where Y2_1 is an integer greater than or equal to 1, and Y2_2 is an integer greater than or equal to 0.

In a twelfth design, according to the eleventh design of the third aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a thirteenth design, according to the eleventh design of the third aspect, the processor is further configured to determine the length of the resource allocation information in the DCI based on the first bandwidth resource. In an example, the processor determines that the length of the resource allocation information in the DCI is $\lceil \log_2((N_{RBG} \times (N_{RBG\_1}+1)/2) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fourteenth design, according to the thirteenth design of the third aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver to send RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

According to a fourth aspect, this application provides a terminal device, where the terminal device is capable of implementing at least one function in any one of the second aspect or the designs of the second aspect. The function may be implemented in a form of hardware, software, or a combination of hardware and software. The hardware or software includes one or more modules corresponding to the foregoing function. In an example, the terminal device includes: a processor; a memory, where the memory is coupled to the processor, and the processor executes a program instruction stored in the memory; and a transceiver, where the transceiver is coupled to the processor, and the processor uses the transceiver to receive downlink control information (DCI) on a first bandwidth resource, where the DCI is used for data transmission on the first bandwidth resource or data transmission on a second bandwidth resource; and if the DCI is used for data transmission on the first bandwidth resource, a size of the DCI is L1_1, or if the DCI is used for data transmission on the second bandwidth resource, a size of the DCI is L1_2, where L1_1 is equal to L1_2, and L1_1 and L1_2 are integers greater than or equal to 1.

In a first design, according to the fourth aspect, the DCI includes resource allocation information; and if the DCI is used for data transmission on the first bandwidth resource, the resource allocation information indicates a resource allocated in the first bandwidth resource, and a length of the resource allocation information is L2_1, or if the DCI is used for data transmission on the second bandwidth resource, the resource allocation information indicates a resource allocated in the second bandwidth resource, and a length of the resource allocation information is L2_2, where L2_1 is equal to L2_2, and L2_1 and L2_2 are integers greater than or equal to 1.

In a second design, according to the first design of the fourth aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(N_{RBG}(i))$, where a value of i ranges from 0 to M−1, and $N_{RBG}(i)$ is a quantity of RBGs in an $i^{th}$ bandwidth resource of the M bandwidth resources. In another example, the processor determines that the length of the resource allocation information in the DCI is $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. The processor is further configured to determine that a value of $N_{RBG}(i)$ is $\lceil N_{RB}(i)/S_{RBG}(i) \rceil$, where $N_{RBG}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a third design, according to the second design of the fourth aspect, the processor is further configured to: predefine the quantity of RBs in the RBG in the $i^{th}$ bandwidth resource; use the transceiver in the terminal device to receive RRC signaling, where the RRC signaling is used to indicate the quantity of RBs in the RBG in the $i^{th}$ bandwidth resource; or determine the quantity of RBs in the RBG in the $i^{th}$ bandwidth resource based on a bandwidth of the $i^{th}$ bandwidth resource and a mapping relationship between a bandwidth and an RBG size.

In a fourth design, according to the first design of the fourth aspect, the processor is further configured to determine the length of the resource allocation information in the DCI based on the first bandwidth resource. In an example, the processor determines that the length of the resource allocation information is a quantity of first RBGs in the first bandwidth resource. In another example, the processor determines that the length of the resource allocation information is $\lceil \log_2(N_{RBG} \times (N_{RBG\_1}+1)/2) \rceil$, where $N_{RBG\_1}$ is a quantity of first RBGs in the first bandwidth resource. The processor is further configured to determine that the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fifth design, according to the fourth design of the fourth aspect, the processor is further configured to: predefine the quantity of RBs in the first RBG; use the transceiver to receive RRC signaling, where the RRC signaling is used to indicate the quantity of RBs in the first RBG; or determine the quantity of RBs in the first RBG based on a bandwidth of the first bandwidth resource and a mapping relationship between a bandwidth and an RBG size.

In a sixth design, according to the fourth design of the fourth aspect or the fifth design of the fourth aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver in the terminal device to receive RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

In a seventh design, according to the first design of the fourth aspect, if the DCI is used for data transmission on the first bandwidth resource, the resource allocation information in the DCI includes an X1_1-bit bitmap and X1_2 padding bits, where one bit in the X1_1-bit bitmap is corresponding to one first RBG in the first bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. X1_1 is an integer greater than or equal to 1, and X1_2 is an integer greater than or equal to 0. If the DCI is used for data transmission on the second bandwidth resource, the resource allocation information in the DCI includes a Y1_1-bit bitmap and Y1_2 padding bits, where one bit in the Y1_1-bit bitmap is corresponding to one second RBG in the second bandwidth resource. When a value of the bit is t1, a resource indicated by the resource allocation information in the DCI includes the RBG corresponding to the bit. When a value of the bit is t2 or is not t1, a resource indicated by the resource allocation information in the DCI does not include the RBG corresponding to the bit. Y1_1 is an integer greater than or equal to 1, Y1_2 is an integer greater than or equal to 0, and t1 and t2 are integers.

In an eighth design, according to the seventh design of the fourth aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(N_{RBG}(i))$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a ninth design, according to the seventh design of the fourth aspect, the processor is further configured to determine the length of the resource allocation information in the DCI based on the first bandwidth resource. In an example, the processor determines that the length of the resource allocation information in the DCI is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a tenth design, according to the ninth design of the fourth aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver to receive RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

In an eleventh design, according to the first design of the fourth aspect, if the DCI is used for data transmission on the first bandwidth resource, the resource allocation information in the DCI includes an X2_1-bit resource indicator value RIV and X2_2 padding bits, and the X2_1-bit RIV indicates a start first RBG allocated in the first bandwidth resource and a quantity of first RBGs consecutively allocated in the first bandwidth resource, where X2_1 is an integer greater than or equal to 1, and X2_2 is an integer greater than or equal to 0. If the DCI is used for data transmission on the second bandwidth resource, the resource allocation information in the DCI includes a Y2_1-bit RIV and Y2_2 padding bits, and the Y2_1-bit RIV indicates a start second RBG allocated in the second bandwidth resource and a quantity of second RBGs consecutively allocated in the second bandwidth resource, where Y2_1 is an integer greater than or equal to 1, and Y2_2 is an integer greater than or equal to 0.

In a twelfth design, according to the eleventh design of the fourth aspect, the processor is further configured to determine the length of the resource allocation information in the DCI based on M bandwidth resources, where M is an integer greater than or equal to 2, and the M bandwidth resources include the first bandwidth resource and the second bandwidth resource. In an example, the processor determines that the length of the resource allocation information in the DCI is $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, and $S_{RBG}(i)$ is a quantity of RBs in the RBG in the $i^{th}$ bandwidth resource.

In a thirteenth design, according to the eleventh design of the fourth aspect, the processor is further configured to determine the length of the resource allocation information in the DCI based on the first bandwidth resource. In an example, the processor determines that the length of the resource allocation information in the DCI is $\lceil \log_2((N_{RBG\_1} \times (N_{RBG\_1}+1)/2) \rceil$, where $N_{RBG\_1}$ is a quantity of first RBGs in the first bandwidth resource. For example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

In a fourteenth design, according to the thirteenth design of the fourth aspect, if the DCI is used for data transmission on the second bandwidth resource, the resource allocation information in the DCI indicates a second RBG allocated in the second bandwidth resource, and an RB in the second RBG is an RB in the second bandwidth resource; and the processor is further configured to: predefine a quantity of RBs in the second RBG; use the transceiver to receive RRC signaling, where the RRC signaling is used to indicate a quantity of RBs in the second RBG; determine a quantity of RBs in the second RBG based on the length of the resource allocation information in the DCI and a bandwidth of the second bandwidth resource; determine a quantity of RBs in the second RBG based on a bandwidth of the first bandwidth resource and a mapping relationship between a bandwidth and an RBG size; or determine a quantity of RBs in the second RBG based on a bandwidth of the second bandwidth resource and a mapping relationship between a bandwidth and an RBG size.

According to a fifth aspect, this application provides a system, including the network device in the third aspect and the terminal device in the fourth aspect.

According to a sixth aspect, this application provides a chip system. The chip system includes a processor, and may further include a memory, configured to implement the method in at least one of the first aspect or the designs of the first aspect. The chip system may include a chip, or include a chip and another discrete device.

According to a seventh aspect, this application provides a chip system. The chip system includes a processor, and may further include a memory, configured to implement the method in at least one of the second aspect or the designs of the second aspect. The chip system may include a chip, or include a chip and another discrete device.

According to an eighth aspect, this application provides a computer program product including an instruction. When the instruction runs on a computer, the computer is enabled to perform the method in at least one of the first aspect or the designs of the first aspect.

According to a ninth aspect, this application provides a computer program product including an instruction. When the instruction runs on a computer, the computer is enabled to perform the method in at least one of the second aspect or the designs of the second aspect.

The downlink control information transmission method, the apparatus, and the system that are provided in the first aspect to the ninth aspect are intended to: during cross-bandwidth-resource scheduling, reduce a quantity of times that the UE detects DCI, thereby reducing the power consumption of the UE.

According to a tenth aspect, this application provides a downlink control information sending method, including: sending indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, sending the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and performing data transmission on the bandwidth resource indicated by the bandwidth resource identifier in the control information. In an example, the indication information is sent by using RRC signaling. According to this design, cross-bandwidth-resource scheduling may be performed based on groups, and cross-bandwidth-resource scheduling is performed between bandwidth resources in a bandwidth resource group, so that the bandwidth resource identifier that is in the control information and that is used for implementing cross-bandwidth-resource scheduling is targeted for only the bandwidth resources in the bandwidth resource group. This can reduce information bits of the bandwidth resource identifier in the control information, thereby reducing signaling overheads during data transmission.

In a first design, according to the tenth aspect, the indication information includes a bandwidth resource group identifier, and a bandwidth resource group corresponding to the bandwidth resource group identifier is the first bandwidth resource group. The indication information described in the first design indicates the bandwidth resource group identifier to indicate the bandwidth resource group that can be used for intra-group cross-bandwidth-resource scheduling.

In a second design, according to the tenth aspect, the indication information includes J-bit information, and 1-bit information of the J-bit information is corresponding to one of the J bandwidth resource groups; and if a value of the 1-bit information is t1, the first bandwidth resource group includes the bandwidth resource group corresponding to the 1-bit information; or if a value of the 1-bit information is t2 or is not t1, the first bandwidth resource group does not include the bandwidth resource group corresponding to the 1-bit information, where t1 and t2 are integers. For example, a value of t1 is 1. The indication information described in the second design may indicate that any one of the J bandwidth resource groups is used for cross-bandwidth-resource scheduling.

In a third design, according to the tenth aspect, the indication information includes 1-bit information; and if a value of the information is t1, for one of the J bandwidth resource groups, control information transmitted on a bandwidth resource included in the bandwidth resource group includes a bandwidth resource identifier field; or if a value of the information is t2 or is not t1, for one of the J bandwidth resource groups, control information transmitted on a bandwidth resource included in the bandwidth resource group does not include a bandwidth resource identifier field, where t1 and t2 are integers. For example, a value of t1 is 1. In the indication information, the 1-bit information indicates whether all bandwidth resource groups can be used for cross-bandwidth-resource scheduling. This effectively reduces indication overheads.

In a fourth design, according to any one of the tenth aspect or the designs of the tenth aspect, the method further includes: sending J pieces of bandwidth resource group configuration information, where one piece of the J pieces of bandwidth resource group configuration information includes an identifier of the bandwidth resource group and resource configuration information of a bandwidth resource in the bandwidth resource group. According to the fourth design, bandwidth resources in a system resource can be flexibly grouped based on a scheduling requirement.

In a fifth design, according to any one of the tenth aspect, or the first design of the tenth aspect to the third design of the tenth aspect, the method further includes: sending configuration information and numerologies that are of M2 bandwidth resources, and determining the J bandwidth resource groups based on the numerologies of the M2 bandwidth resources. In the fifth design, bandwidth resources with a same numerology are classified into one group. This can avoid cross-bandwidth-resource scheduling with different numerologies, thereby reducing implementation complexity.

In a sixth design, according to any one of the tenth aspect, or the first design of the tenth aspect to the third design of the tenth aspect, the method further includes: predefining the J bandwidth resource groups. In the sixth design, overheads for indicating a bandwidth resource group configuration are reduced in a predefinition manner.

According to an eleventh aspect, this application provides a downlink control information receiving method, including: receiving indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, receiving the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and performing data transmission on the bandwidth resource indicated by the bandwidth resource identifier in the control information. In an example, the indication information is received by using RRC signaling.

In a first design, according to the eleventh aspect, the indication information includes a bandwidth resource group identifier, and a bandwidth resource group corresponding to the bandwidth resource group identifier is the first bandwidth resource group.

In a second design, according to the eleventh aspect, the indication information includes J-bit information, and 1-bit information of the J-bit information is corresponding to one of the J bandwidth resource groups; and if a value of the 1-bit information is t1, the first bandwidth resource group includes the bandwidth resource group corresponding to the 1-bit information; or if a value of the 1-bit information is t2 or is not t1, the first bandwidth resource group does not include the bandwidth resource group corresponding to the 1-bit information, where t1 and t2 are integers. For example, a value of t1 is 1.

In a third design, according to the eleventh aspect, the indication information includes 1-bit information; and if a value of the information is t1, for one of the J bandwidth resource groups, control information transmitted on a bandwidth resource included in the bandwidth resource group includes a bandwidth resource identifier field; or if a value of the information is t2 or is not t1, for one of the J bandwidth resource groups, control information transmitted on a bandwidth resource included in the bandwidth resource group does not include a bandwidth resource identifier field, where t1 and t2 are integers. For example, a value of t1 is 1.

In a fourth design, according to any one of the eleventh aspect or the designs of the eleventh aspect, the method further includes: receiving J pieces of bandwidth resource group configuration information, where one piece of the J pieces of bandwidth resource group configuration information includes an identifier of the bandwidth resource group and resource configuration information of a bandwidth resource included in the bandwidth resource group.

In a fifth design, according to any one of the eleventh aspect, or the first design of the eleventh aspect to the third design of the eleventh aspect, the method further includes: receiving configuration information and numerologies that are of M2 bandwidth resources, and determining the J bandwidth resource groups based on the numerologies of the M2 bandwidth resources.

In a sixth design, according to any one of the eleventh aspect, or the first design of the eleventh aspect to the third design of the eleventh aspect, the method further includes: predefining the J bandwidth resource groups.

According to a twelfth aspect, this application provides a network device, where the network device is capable of implementing at least one function in any one of the tenth aspect or the designs of the tenth aspect. The function may be implemented in a form of hardware, software, or a combination of hardware and software. The hardware or software includes one or more modules corresponding to the foregoing function. In an example, the network device includes: a processor; a memory, where the memory is coupled to the processor, and the processor executes a program instruction stored in the memory; and a transceiver, where the transceiver is coupled to the processor, and the processor uses the transceiver to: send indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, send the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and perform data transmission on the bandwidth resource indicated by the bandwidth resource identifier in the control information. In an example, the processor uses the transceiver to send the indication information by using RRC signaling.

In a first design, according to the twelfth aspect, the indication information includes a bandwidth resource group identifier, and a bandwidth resource group corresponding to the bandwidth resource group identifier is the first bandwidth resource group.

In a second design, according to the twelfth aspect, the indication information includes J-bit information, and 1-bit information of the J-bit information is corresponding to one of the J bandwidth resource groups; and if a value of the 1-bit information is t1, the first bandwidth resource group includes the bandwidth resource group corresponding to the 1-bit information; or if a value of the 1-bit information is t2 or is not t1, the first bandwidth resource group does not include the bandwidth resource group corresponding to the 1-bit information, where t1 and t2 are integers. For example, a value of t1 is 1.

In a third design, according to the twelfth aspect, the indication information includes 1-bit information; and if a value of the information is t1, for one of the J bandwidth resource groups, control information transmitted on a bandwidth resource included in the bandwidth resource group includes a bandwidth resource identifier field; or if a value of the information is t2 or is not t1, for one of the J bandwidth resource groups, control information transmitted on a bandwidth resource included in the bandwidth resource group does not include a bandwidth resource identifier field, where t1 and t2 are integers. For example, a value of t1 is 1.

In a fourth design, according to any one of the twelfth aspect or the designs of the twelfth aspect, the processor further uses the transceiver to send J pieces of bandwidth resource group configuration information, where one piece of the J pieces of bandwidth resource group configuration information includes an identifier of the bandwidth resource group and resource configuration information of a bandwidth resource included in the bandwidth resource group.

In a fifth design, according to any one of the twelfth aspect, or the first design of the twelfth aspect to the third design of the twelfth aspect, the processor further uses the transceiver to: send configuration information and numerologies that are of M2 bandwidth resources, and determine the J bandwidth resource groups based on the numerologies of the M2 bandwidth resources.

In a sixth design, according to any one of the twelfth aspect, or the first design of the twelfth aspect to the third design of the twelfth aspect, the processor is further configured to predefine the J bandwidth resource groups.

According to a thirteenth aspect, this application provides a terminal device, where the terminal device is capable of implementing at least one function in any one of the eleventh aspect or the designs of the eleventh aspect. The function may be implemented in a form of hardware, software, or a combination of hardware and software. The hardware or software includes one or more modules corresponding to the foregoing function. In an example, the terminal device includes: a processor; a memory, where the memory is coupled to the processor, and the processor executes a program instruction stored in the memory; and a transceiver, where the transceiver is coupled to the processor, and the processor uses the transceiver to: receive indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, receive the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and perform data transmission on the bandwidth resource indicated by the bandwidth resource identifier in the control information. In an example, the processor uses the transceiver to receive the indication information by using RRC signaling.

In a first design, according to the thirteenth aspect, the indication information includes a bandwidth resource group identifier, and a bandwidth resource group corresponding to the bandwidth resource group identifier is the first bandwidth resource group.

In a second design, according to the thirteenth aspect, the indication information includes J-bit information, and 1-bit information of the J-bit information is corresponding to one of the J bandwidth resource groups; and if a value of the 1-bit information is t1, the first bandwidth resource group includes the bandwidth resource group corresponding to the 1-bit information; or if a value of the 1-bit information is t2 or is not t1, the first bandwidth resource group does not include the bandwidth resource group corresponding to the 1-bit information, where t1 and t2 are integers. For example, a value of t1 is 1.

In a third design, according to the thirteenth aspect, the indication information includes 1-bit information; and if a value of the information is t1, for one of the J bandwidth resource groups, control information transmitted on a bandwidth resource included in the bandwidth resource group includes a bandwidth resource identifier field; or if a value of the information is t2 or is not t1, for one of the J bandwidth resource groups, control information transmitted on a bandwidth resource included in the bandwidth resource group does not include a bandwidth resource identifier field, where t1 and t2 are integers. For example, a value of t1 is 1.

In a fourth design, according to any one of the thirteenth aspect or the designs of the thirteenth aspect, the processor further uses the transceiver to receive J pieces of bandwidth resource group configuration information, where one piece of the J pieces of bandwidth resource group configuration information includes an identifier of the bandwidth resource group and resource configuration information of a bandwidth resource included in the bandwidth resource group.

In a fifth design, according to any one of the thirteenth aspect, or the first design of the thirteenth aspect to the third design of the thirteenth aspect, the processor further uses the transceiver to: receive configuration information and numerologies that are of M2 bandwidth resources, and determine the J bandwidth resource groups based on the numerologies of the M2 bandwidth resources.

In a sixth design, according to any one of the thirteenth aspect, or the first design of the thirteenth aspect to the third design of the thirteenth aspect, the processor is further configured to predefine the J bandwidth resource groups.

According to a fourteenth aspect, this application provides a system, including the network device in the twelfth aspect and the terminal device in the thirteenth aspect.

According to a fifteenth aspect, this application provides a chip system. The chip system includes a processor, and may further include a memory, configured to implement the method in at least one of the tenth aspect or the designs of the tenth aspect. The chip system may include a chip, or include a chip and another discrete device.

According to a sixteenth aspect, this application provides a chip system. The chip system includes a processor, and may further include a memory, configured to implement the method in at least one of the eleventh aspect or the designs of the eleventh aspect. The chip system may include a chip, or include a chip and another discrete device.

According to a seventeenth aspect, this application provides a computer program product including an instruction. When the instruction runs on a computer, the computer is enabled to perform the method in at least one of the tenth aspect or the designs of the tenth aspect.

According to an eighteenth aspect, this application provides a computer program product including an instruction. When the instruction runs on a computer, the computer is enabled to perform the method in at least one of the eleventh aspect or the designs of the eleventh aspect.

The downlink control information transmission method, the apparatus, and the system that are described in the tenth aspect to the eighteenth aspect are intended to perform cross-bandwidth-resource scheduling and reduce signaling overheads for indicating a bandwidth resource.

According to a nineteenth aspect, this application provides a downlink control information sending method, including: sending downlink control information DCI, where the control information includes G-bit resource allocation information, and the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. That a resource is allocated in the bandwidth resource based on a resource allocation type 0 includes: One information bit in the resource allocation information is corresponding to one RBG in the bandwidth resource; and if a value of the information bit is t1, the resource allocated in the bandwidth resource includes the RBG; or if a value of the information bit is not t1 or is t2, the resource allocated in the bandwidth resource does not include the RBG, where t1 and t2 are integers. That a resource is allocated in the bandwidth resource based on a resource allocation type 1 includes: The resource allocation information indicates a start RB allocated in the bandwidth resource and a quantity of RBs consecutively allocated in the bandwidth resource. According to this design, lengths of control information corresponding to different resource allocation types can be identical, so that a receive end of the control information uses one control information length to detect control information, thereby reducing power consumption of the receive end.

In a first design, according to the nineteenth aspect, the length of the resource allocation information determined when the resource is allocated in the bandwidth resource based on the resource allocation type 0 is a quantity of RBGs in the bandwidth resource. In an example, the quantity of RBGs in the bandwidth resource is $\lceil N_{RB}/S_{RBG} \rceil$, where $N_{RB}$ is a quantity of RBs in the bandwidth resource, $S_{RBG}$ is a quantity of RBs included in an RBG, and the RBG includes at least one RB in the bandwidth resource.

In a second design, according to the nineteenth aspect or the first design of the nineteenth aspect, the length of the resource allocation information determined when the resource is allocated in the bandwidth resource based on the resource allocation type 1 is $\lceil \log_2 (N_{RB} \times (N+1)/2) \rceil$, where $N_{RB}$ is the quantity of RBs included in the bandwidth resource.

In a third design, according to any one of the nineteenth aspect or the designs of the nineteenth aspect, the method further includes: sending resource allocation type indication information, to indicate a resource allocation type corresponding to the G-bit resource allocation information.

According to a twentieth aspect, this application provides a downlink control information receiving method, including: receiving downlink control information DCI, where the control information includes G-bit resource allocation information, and the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. That a resource is allocated in the bandwidth resource based on a resource allocation type 0 includes: One information bit in the resource allocation information is corresponding to one RBG in the bandwidth resource; and if a value of the information bit is t1, the resource allocated in the bandwidth resource includes the RBG; or if a value of the information bit is not t1 or is t2, the resource allocated in the bandwidth resource does not include the RBG, where t1 and t2 are integers. That a resource is allocated in the bandwidth resource based on a resource allocation type 1 includes: The resource allocation information indicates a start RB allocated in the bandwidth resource and a quantity of RBs consecutively allocated in the bandwidth resource.

In a first design, according to the twentieth aspect, the length of the resource allocation information determined when the resource is allocated in the bandwidth resource based on the resource allocation type 0 is a quantity of RBGs in the bandwidth resource. In an example, the quantity of RBGs in the bandwidth resource is $\lceil N_{RB}/S_{RBG} \rceil$, where $N_{RB}$ is a quantity of RBs in the bandwidth resource, $S_{RBG}$ is a quantity of RBs included in an RBG, and the RBG includes at least one RB in the bandwidth resource.

In a second design, according to the twentieth aspect or the first design of the twentieth aspect, the length of the resource allocation information determined when the resource is allocated in the bandwidth resource based on the resource allocation type 1 is $\lceil \log_2(N_{RB} \times (N_{RB}+1)/2) \rceil$, where $N_{RB}$ is the quantity of RBs included in the bandwidth resource.

In a third design, according to any one of the twentieth aspect or the designs of the twentieth aspect, the method further includes: receiving resource allocation type indication information, to determine a resource allocation type corresponding to the G-bit resource allocation information.

According to a twenty-first aspect, this application provides a network device, where the network device is capable of implementing at least one described function in any one of the nineteenth aspect or the designs of the nineteenth aspect. The function may be implemented in a form of hardware, software, or a combination of hardware and software. The hardware or software includes one or more modules corresponding to the foregoing function. In an example, the network device includes: a processor; a memory, where the memory is coupled to the processor, and the processor executes a program instruction stored in the memory; and a transceiver, where the transceiver is coupled to the processor, and the processor uses the transceiver to send downlink control information DCI, where the control information includes G-bit resource allocation information, and the G-bit resource allocation information indicates a resource allocated in a bandwidth resource, for performing data transmission on the bandwidth resource; and G=max (LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. That a resource is allocated in the bandwidth resource based on a resource allocation type 0 includes: One information bit in the resource allocation information is corresponding to one RBG in the bandwidth resource; and if a value of the information bit is t1, the resource allocated in the bandwidth resource includes the RBG; or if a value of the information bit is not t1 or is t2, the resource allocated in the bandwidth resource does not include the RBG, where t1 and t2 are integers. That a resource is allocated in the bandwidth resource based on a resource allocation type 1 includes: The resource allocation information indicates a start RB allocated in the bandwidth resource and a quantity of RBs consecutively allocated in the bandwidth resource.

In a first design, according to the twenty-first aspect, the processor is further configured to: when the resource is allocated to UE in the bandwidth resource based on the resource allocation type 0, determine that the length of the resource allocation information is a quantity of RBGs in the bandwidth resource. In an example, the processor determines that the quantity of RBGs in the bandwidth resource is $\lceil N_{RB}/S_{RBG} \rceil$, where $N_{RB}$ is a quantity of RBs in the bandwidth resource, $S_{RBG}$ is a quantity of RBs included in an RBG, and the RBG includes at least one RB in the bandwidth resource.

In a second design, according to the twenty-first aspect or the first design of the twenty-first aspect, the processor is further configured to: when the resource is allocated in the bandwidth resource based on the resource allocation type 1, determine that the length of the resource allocation information is $\lceil \log_2(N_{RB} \times (N_{RB}+1)/2) \rceil$, where $N_{RB}$ is the quantity of RBs included in the bandwidth resource.

In a third design, according to any one of the twenty-first aspect or the designs of the twenty-first aspect, the processor further uses the transceiver to send resource allocation type indication information, to indicate a resource allocation type corresponding to the G-bit resource allocation information.

According to a twenty-second aspect, this application provides a terminal device, where the terminal device is capable of implementing at least one described function in any one of the twentieth aspect or the designs of the twentieth aspect. The function may be implemented in a form of hardware, software, or a combination of hardware and software. The hardware or software includes one or more modules corresponding to the foregoing function. In an example, the terminal device includes: a processor; a memory, where the memory is coupled to the processor, and the processor executes a program instruction stored in the memory; and a transceiver, where the transceiver is coupled to the processor, and the processor uses the transceiver to receive downlink control information DCI, where the control information includes G-bit resource allocation information, and the G-bit resource allocation information indicates a resource allocated in a bandwidth resource, for performing data transmission on the bandwidth resource; and G=max (LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. That a resource is allocated in the bandwidth resource based on a resource allocation type 0 includes: One information bit in the resource allocation information is corresponding to one RBG in the bandwidth resource; and if a value of the information bit is t1, the resource allocated in the bandwidth resource includes the RBG; or if a value of the information bit is not t1 or is t2, the resource allocated in the bandwidth resource does not include the RBG, where t1 and t2 are integers. That a resource is allocated in the bandwidth resource based on a resource allocation type 1 includes: The resource allocation information indicates a start RB allocated in the bandwidth resource and a quantity of RBs consecutively allocated in the bandwidth resource.

In a first design, according to the twenty-second aspect, the processor is further configured to: when the resource is allocated in the bandwidth resource based on the resource allocation type 0, determine that the length of the resource allocation information is a quantity of RBGs in the bandwidth resource. In an example, the quantity of RBGs in the bandwidth resource is $\lceil N_{RB}/S_{RBG} \rceil$, where $N_{RB}$ is a quantity of RBs in the bandwidth resource, $S_{RBG}$ is a quantity of RBs included in an RBG, and the RBG includes at least one RB in the bandwidth resource.

In a second design, according to the twenty-second aspect or the first design of the twenty-second aspect, the processor is further configured to: when the resource is allocated in the bandwidth resource based on the resource allocation type 1, determine that the length of the resource allocation information is $\lceil \log_2(N_{RB} \times (N_{RB}+1)/2) \rceil$, where $N_{RB}$ is a quantity of RBs included in the bandwidth resource.

In a third design, according to any one of the twenty-second aspect or the designs of the twenty-second aspect, the processor further uses the transceiver to receive resource allocation type indication information, to determine a resource allocation type corresponding to the G-bit resource allocation information.

According to a twenty-third aspect, this application provides a system, including the network device in the twenty-first aspect and the terminal device in the twenty-second aspect.

According to a twenty-fourth aspect, this application provides a chip system. The chip system includes a processor, and may further include a memory, configured to implement the method in at least one of the nineteenth aspect or the designs of the nineteenth aspect. The chip system may include a chip, or include a chip and another discrete device.

According to a twenty-fifth aspect, this application provides a chip system. The chip system includes a processor, and may further include a memory, configured to implement the method in at least one of the twentieth aspect or the designs of the twentieth aspect. The chip system may include a chip, or include a chip and another discrete device.

According to a twenty-sixth aspect, this application provides a computer program product including an instruction. When the instruction runs on a computer, the computer is enabled to perform the method in at least one of the nineteenth aspect or the designs of the nineteenth aspect.

According to a twenty-seventh aspect, this application provides a computer program product including an instruction. When the instruction runs on a computer, the computer is enabled to perform the method in at least one of the twentieth aspect or the designs of the twentieth aspect.

The downlink control information transmission method, the apparatus, and the system that are described in the nineteenth aspect to the twenty-seventh aspect are intended to: during resource allocation, reduce a quantity of times that the UE detects DCI, thereby reducing power consumption of the UE.

BRIEF DESCRIPTION OF THE DRAWINGS

To describe technical solutions in embodiments of this application more clearly, the following describes the accompanying drawings in the embodiments of this application.

DETAILED DESCRIPTION OF ILLUSTRATIVE EMBODIMENTS

Figure 1:
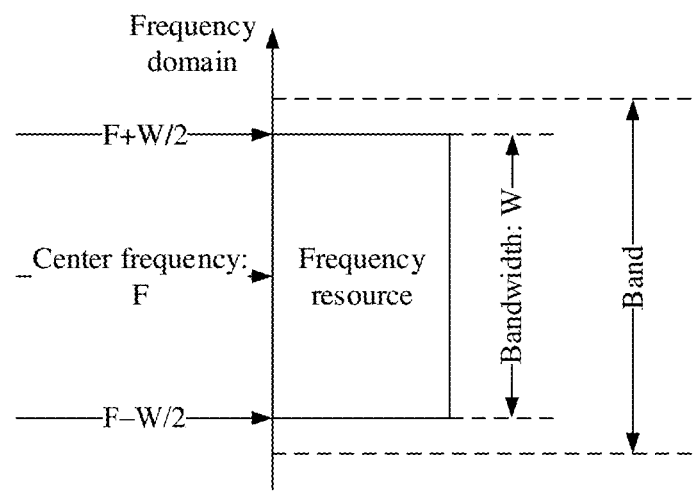
FIG. 1 is a schematic diagram of a location of a frequency resource according to an embodiment of this application.

Network architectures and service scenarios described in the embodiments of this application are intended to more clearly describe technical solutions in the embodiments of this application, and do not constitute any limitation on the technical solutions provided in the embodiments of this application. With evolution of a network architecture or emergence of a new service scenario, the technical solutions provided in the embodiments of this application are also applicable to a similar technical issue.

The technical solutions provided in the embodiments of this application may be applied to a wireless communications system in which a frequency resource can be allocated, for example, a fifth generation mobile communications technology (5G) system. The 5G system may also be referred to as a new radio (NR) system. In addition to the 5G system, the technical solutions provided in the embodiments of this application may also be applied to other networks based on orthogonal frequency division multiplexing (OFDM). Scopes of terms "system" and "network" are similar in the embodiments of this application.

The wireless communications system includes communications devices, and the communications devices may perform wireless communication by using an air interface resource. The communications device includes a network device and a terminal device, and the network device may also be referred to as a network-side device. Wireless communication between the communications device includes wireless communication between the network device and the terminal device and wireless communication between network devices. When the communications devices perform wireless communication by using the air interface resource, a communications device managing and/or allocating the air interface resource may also be referred to as a scheduling entity, and a scheduled communications device may also be referred to as a subordinate entity. For example, when the network device performs wireless communication with the terminal device, the network device may also be referred to as a scheduling entity, and the terminal device may also be referred to as a subordinate entity. The technical solutions provided in the embodiments of this application may be applied to wireless communication between the scheduling entity and the subordinate entity. Wireless communication between the network device and the terminal device is used as an example in the embodiments of this application for describing the technical solutions provided in the embodiments of this application. Further, in the technical solutions provided in the embodiments of this application, a device implementing a function of the network device may be the network device, or may be a device A that can be located in the network device and that supports the network device in implementing the function, and the device A also falls within the protection scope of this application; a device implementing a function of the terminal device may be the terminal device, or may be a device B that can be located in the terminal device and that supports the terminal device in implementing the function, and the device B also falls within the protection scope of this application. In the embodiments of this application, the term "wireless communication" may be referred to as "communication" for short, and the term "communication" may also be described as "data transmission".

The terminal device in the embodiments of this application may also be referred to as a terminal, and is a device having wireless receiving and sending functions. The terminal device may be deployed on land, including an indoor device, an outdoor device, a handheld device, or an in-vehicle device; may be deployed on the surface of water (such as in a steamship); or may be deployed in the air (such as on an airplane, a balloon, and a satellite). The terminal device may be user equipment (UE), and the UE is a handheld device, an in-vehicle device, a wearable device, or a computing device that has a wireless communication function. For example, the UE may be a mobile phone, a tablet computer, or a computer having wireless receiving and sending functions. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like.

The network device in the embodiments of this application includes a base station (BS), and is a device that is deployed in a radio access network and that can perform wireless communication with the terminal device. The base station may be in a plurality of forms, for example, a macro base station, a micro base station, a relay node, and an access point. When a macro base station and a micro base station perform wireless communication, the macro base station may manage an air interface resource and allocate an air interface resource to the micro base station, and the macro base station and the micro base station may perform data transmission on the allocated air interface resource. In the communication scenario, the macro base station may also be referred to as a scheduling entity, and the micro base station may also be referred to as a subordinate entity. The base station in the embodiments of this application may be a gNB in the 5G system, and the gNB in the 5G system may also be referred to as a transmission/reception point (TRP) or a gNB.

In the technical solutions provided in the embodiments of this application, an example in which the network device is a gNB in the 5G system and the terminal device is UE is used for describing the technical solutions provided in the embodiments of this application.

In the wireless communications system, the gNB and the UE may perform wireless communication by using an air interface resource. In a possible wireless communications system, for example, in the 5G system, an air interface resource includes a frequency resource. The frequency resource may be located within a specified frequency range. The frequency range may also be referred to as a band or a frequency band. In frequency domain, a center point of the frequency resource may be referred to as a center frequency, and a width of the frequency domain resource may be referred to as a bandwidth (BW). For example, FIG. 1 is a schematic diagram of a location of a frequency resource. As shown in FIG. 1, a frequency resource may be some or all of resources in a band, a bandwidth of the frequency resource is W, and a frequency of a center frequency is F. Frequencies of boundary points of the frequency resource are F−W/2 and F+W/2. This may also be described as: A frequency of a highest frequency in the frequency resource is F+W/2, and a frequency of a lowest frequency in the frequency resource is F−W/2. In the wireless communications system, a frequency resource used for downlink communication may be the same as or different from that used for uplink communication. This is not limited in this application.

When the gNB and the UE perform wireless communication by using a frequency resource, the gNB manages a system frequency resource, and allocates a frequency resource in the system frequency resource to the UE, so that the gNB and the UE can use the allocated frequency resource to perform communication. The system frequency resource may be a frequency resource that can be managed and allocated by the gNB, or may be a frequency resource that can be used for communication between the gNB and the UE. In the embodiments of this application, the system frequency resource may also be referred to as a system resource or a transmission resource. In frequency domain, a width of the system frequency resource may be referred to as a bandwidth of the system frequency resource, a system bandwidth, or a transmission bandwidth.

Figure 2:
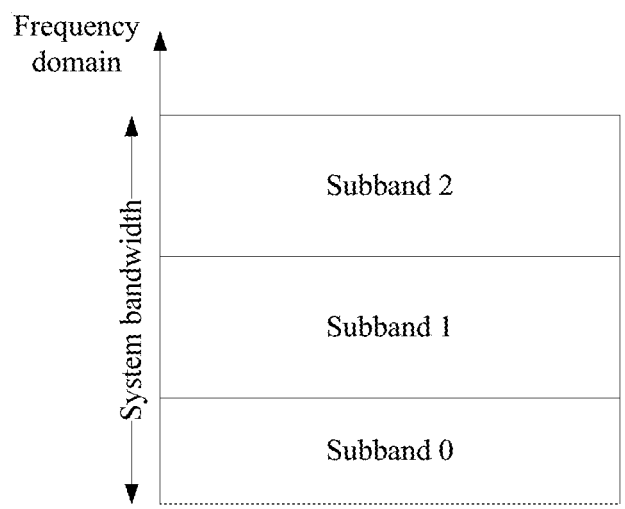
FIG. 2 is a schematic structural diagram of a bandwidth resource in a system frequency resource according to an embodiment of this application.

A possible design of allocating a frequency resource by the gNB to the UE is: The gNB configures a bandwidth resource in the system frequency resource for the UE, and the gNB schedules a resource to the UE in the configured bandwidth resource. This may also be described as: The gNB configures a bandwidth resource in the system frequency resource for the UE, and the gNB can allocate some or all of resources in the configured bandwidth resource to the UE, for communication between the gNB and the UE. The bandwidth resource is included in the system frequency resource, and may be some consecutive or inconsecutive resources in the system frequency resource or may be all resources in the system frequency resource. The bandwidth resource may also be referred to as a bandwidth part, a frequency resource part, some frequency resources, or a carrier bandwidth part, or may have other names. This is not limited in this application. When the bandwidth resource is a segment of consecutive resources in the system frequency resource, the bandwidth resource may also be referred to as a subband or a narrowband, or may have other names. This is not limited in this application. For example, FIG. 2 is a schematic structural diagram of a bandwidth resource in a system frequency resource. As shown in FIG. 2, the system frequency resource includes a total of three different bandwidth resources: a bandwidth resource 0, a bandwidth resource 1, and a bandwidth resource 2. In actual application, the system frequency resource may include any integer quantity of bandwidth resources. This is not limited in this application. For different bandwidth resources, for example, for a bandwidth resource A and a bandwidth resource B, that the bandwidth resource A is different from the bandwidth resource B includes: Some or all of frequency resources included in the bandwidth resource A are not included in the bandwidth resource B, or some or all of frequency resources included in the bandwidth resource B are not included in the bandwidth resource A. For example, in an OFDM-based communications system, that the bandwidth resource A is different from the bandwidth resource B may be: At least one subcarrier included in the bandwidth resource A is not included in the bandwidth resource B, or at least one subcarrier included in the bandwidth resource B is not included in the bandwidth resource A.

For example, the foregoing possible design of allocating a frequency resource by the gNB to the UE may be applied to but is not limited to the following three scenarios.

Scenario 1: High-Bandwidth Scenario

In a communications system, as a service volume of the UE and a quantity of UEs increase, a system service volume significantly increases. Therefore, a design of using a high bandwidth as a system bandwidth is proposed in an existing communications system, and is used for providing a relatively large quantity of system resources, so that a relatively high data transmission rate can be provided. In the communications system in which a high bandwidth is used as the system bandwidth, a bandwidth supported by the UE may be lower than the system bandwidth in consideration of costs of the UE and the service volume of the UE. A higher bandwidth supported by the UE indicates a higher processing capability of the UE, a possible higher data transmission rate of the UE, and possible higher design costs of the UE. The bandwidth supported by the UE may also be referred to as a bandwidth capability of the UE. For example, in the 5G system, a maximum of the system bandwidth may be 400 MHz, and the bandwidth capability of the UE may be 20 MHz, 50 MHz, 100 MHz, or the like. In the wireless communications system, bandwidth capabilities of different UEs may be the same or may be different. This is not limited in the embodiments of this application.

In the communications system in which a high bandwidth is used as the system bandwidth, because the bandwidth capability of the UE is lower than the system bandwidth, the gNB may configure a bandwidth resource in the system frequency resource for the UE, where a bandwidth of the bandwidth resource is lower than or equal to the bandwidth capability of the UE. When the UE and the gNB perform communication, the gNB may allocate, to the UE, some or all of resources in the bandwidth resource configured for the UE, for communication between the gNB and the UE.

Scenario 2: Multi-Parameter Scenario

In a wireless communications system, for example, in the 5G system, a design supporting a plurality of parameters is proposed to support more service types and/or communication scenarios. A separate parameter may be set for each of different service types and/or communication scenarios. The parameter includes at least one of a subcarrier spacing and a cyclic prefix (CP). In a standard of the wireless communications system researched and formulated by the 3rd Generation Partnership Project (3GPP), the parameter may be referred to as a numerology.

In a possible configuration, the gNB may configure a plurality of bandwidth resources in the system frequency resource, and configure a separate numerology for each of the plurality of bandwidth resources, to support a plurality of service types and/or communication scenarios in the system frequency resource. Numerologies of different bandwidth resources may be the same or may be different. This is not limited in this application.

When the UE and the gNB perform communication, the gNB may determine, based on a service type and/or a communication scenario corresponding to the communication, a numerology A used for communication, to configure a corresponding bandwidth resource for the UE based on the numerology A. A numerology of the corresponding bandwidth resource is configured to be the numerology A. When the UE and the gNB perform communication, the gNB may allocate, to the UE, some or all of resources in the bandwidth resource configured for the UE, for communication between the gNB and the UE.

Scenario 3: Bandwidth Fallback

When the UE and the gNB perform communication, the gNB may configure a bandwidth resource for the UE based on a service volume of the UE, to reduce power consumption of the UE. For example, if the UE has no service, the UE may receive control information only on a bandwidth resource with a relatively low bandwidth, to reduce radio frequency processing workloads and baseband processing workloads of the UE, thereby reducing power consumption of the UE. If a service volume of the UE is relatively small, the gNB may configure a bandwidth resource with a relatively low bandwidth for the UE, to reduce radio frequency processing workloads and baseband processing workloads of the UE, thereby reducing power consumption of the UE. If a service volume of the UE is relatively large, the gNB may configure a bandwidth resource with a relatively high bandwidth for the UE, to provide a higher data transmission rate. When the UE and the gNB perform communication, the gNB may allocate, to the UE, some or all of resources in the bandwidth resource configured for the UE, for communication between the gNB and the UE.

Based on the foregoing possible design of allocating a frequency resource by the gNB to the UE, a possible frequency resource allocation method is as follows: Step 1: The gNB configures a bandwidth resource in the system frequency resource for the UE by using signaling A or through predefinition. Step 2: The gNB schedules, in the bandwidth resource configured for the UE, a resource to the UE by using downlink control information (DCI), that is, the gNB allocates, to the UE by using the DCI, a frequency resource in the bandwidth resource configured for the UE in step 1. The gNB and the UE may perform data transmission on the allocated frequency resource. The signaling A may be radio resource control (RRC) signaling, a broadcast message, a system message, a medium access control (MAC) control element (CE), DCI, or signaling carried on a physical downlink data channel. The DCI is signaling sent by the gNB to the UE through a physical downlink control channel (PDCCH), or the DCI may be described as signaling carried on a PDCCH. The DCI may also be referred to as control information or may have other names, and is mainly used for data transmission between the gNB and the UE. The term "carry" may also be described as "bear". The PDCCH may also be referred to as a physical control channel or a control channel, or may have other names. This is not limited in this application.

In the embodiments of this application, predefinition may also be referred to as preconfiguration. For a parameter, predefining a value of the parameter is configuring the value of the parameter to be a fixed value.

In the embodiments of this application, gNB configuring the bandwidth resource for the UE includes the gNB configuring a UE operating bandwidth resource for the UE. The UE operating bandwidth resource may also be described as a bandwidth resource used by the gNB and the UE to communicate UE-specific information. The UE-specific information includes at least one of UE-specific DCI, UE-specific uplink control information (UCI), UE-specific information carried on a data channel, and a UE-specific reference signal. The UE-specific information carried on the data channel includes UE-specific information carried on an uplink data channel and UE-specific information carried on a downlink data channel, the UE-specific information carried on the uplink data channel may also be referred to as uplink UE-specific information, and the UE-specific information carried on the downlink data channel may also be referred to as downlink UE-specific information. Transmission of the UE-specific information between the gNB and the UE includes at least one of the following: The gNB sends the UE-specific information to the UE, the gNB receives the UE-specific information sent by the UE, the UE receives the UE-specific information sent by the gNB, and the UE sends the UE-specific information to the gNB. The UE operating bandwidth resource may also be referred to as an operating bandwidth resource of the UE or an operating bandwidth resource, or may have other names. This is not limited in this application. UE operating bandwidth resources of different UEs may be the same or may be different. This is not limited in this application. For example, a same UE operating bandwidth resource may be configured for a plurality of UEs, or a separate UE operating bandwidth resource may be configured for each of different UEs.

In the embodiments of this application, "configuration" may be "initial configuration" or "reconfiguration". When the gNB reconfigures an operating bandwidth resource for the UE, a UE source operating bandwidth resource is an operating bandwidth resource of the UE before reconfiguration. The UE source operating bandwidth resource may also be referred to as a source operating bandwidth resource, a source bandwidth resource, a first bandwidth resource, or a bandwidth resource A, or may have other names. This is not limited in this application. The UE source operating bandwidth resource may be one or more bandwidth resources, and it may also be understood that the gNB may configure one or more operating bandwidth resources for the UE. When the gNB reconfigures the operating bandwidth resource for the UE, a UE target operating bandwidth resource is an operating bandwidth resource reconfigured by the gNB for the UE. After the reconfiguration takes effect, the gNB and the UE may use the UE target operating bandwidth resource as the operating bandwidth resource of the UE. The UE target operating bandwidth resource may also be referred to as a target operating bandwidth resource, a target bandwidth resource, a second bandwidth resource, or a bandwidth resource B, or may have other names. This is not limited in this application. The UE target operating bandwidth resource may be one or more bandwidth resources, and it may also be understood that the gNB may configure one or more operating bandwidth resources for the UE during reconfiguration. A quantity of UE source operating bandwidth resources may be the same as or different from a quantity of UE target operating bandwidth resources. This is not limited in this application.

In the embodiments of this application, in a possible system, for example, in a frequency division duplex (FDD) system, when resource locations of an uplink bandwidth resource and a downlink bandwidth resource of the UE are different, the uplink bandwidth resource and the downlink bandwidth resource of the UE may be collectively referred to as bandwidth resources of the UE, that the gNB sends information to the UE on a bandwidth resource is that the gNB sends information to the UE on the downlink bandwidth resource, and that the UE sends information to the gNB on a bandwidth resource is that the UE sends information to the gNB on the uplink bandwidth resource.

In the foregoing possible frequency resource allocation method, in the bandwidth resource configured for the UE, a resource to the UE by using the DCI. Specifically, the DCI includes resource allocation information, where the resource allocation information indicates a resource allocated by the gNB to the UE in the bandwidth resource configured for the UE. The gNB and the UE may perform data transmission on the allocated resource. The DCI may include uplink resource allocation information and/or downlink resource allocation information. If the DCI includes the uplink resource allocation information, the UE sends data information to the gNB on a resource indicated by the uplink resource allocation information, and the gNB receives, on the resource indicated by the uplink resource allocation information, the data information sent by the UE. If the DCI includes the downlink resource allocation information, the gNB sends data information to the UE on a resource indicated by the downlink resource allocation information, and the UE receives, on the resource indicated by the downlink resource allocation information, the data information sent by the gNB. Based on the method, the UE may detect a plurality of pieces of DCI, that is, the UE may detect a plurality of PDCCHs. Consequently, power consumption of the UE is increased. The term "detection" may also be referred to as "receiving". Application scenarios in which the UE may detect a plurality of PDCCHs include but are not limited to application scenarios of cross-bandwidth-resource scheduling. The application scenarios of cross-bandwidth-resource scheduling may include the following two application scenarios.

Application Scenario 1:

When reconfiguring a bandwidth resource of the UE for the UE, the gNB performs, on a source operating bandwidth resource, cross-bandwidth-resource scheduling corresponding to a target operating bandwidth resource for the UE. Specifically, the gNB may send DCI to the UE on the UE source operating bandwidth resource. The DCI may be used for scheduling the UE source operating bandwidth resource, or may be used for scheduling the UE target operating bandwidth resource. If the DCI is used for scheduling the UE source operating bandwidth resource, the DCI may also be referred to as first DCI. If the DCI is used for scheduling the UE target operating bandwidth resource, the DCI may also be referred to as second DCI. The first DCI may be different from the second DCI. In a time unit in which DCI may be sent, the gNB may send at least one of the first DCI and the second DCI to the UE, or the gNB may not send DCI to the UE.

When the UE detects DCI, if the UE does not know whether the gNB has sent DCI to the UE, or does not know what is sent by the gNB to the UE is the first DCI or the second DCI, the UE may need to perform two times of DCI detection based on the first DCI and the second DCI. This increases a quantity of times that the UE performs detection, thereby increasing power consumption of the UE.

Application Scenario 2:

When the gNB configures a plurality of operating bandwidth resources for the UE, that the gNB configures a bandwidth resource C and a bandwidth resource D for the UE as operating bandwidth resources of the UE is used as an example. The gNB may perform, on the bandwidth resource C, cross-bandwidth-resource scheduling corresponding to the bandwidth resource D for the UE. Specifically, the gNB may send DCI to the UE on the bandwidth resource C. The DCI may be used for scheduling corresponding to the bandwidth resource C, or may be used for scheduling corresponding to the bandwidth resource D. This may also be described as: The DCI may be used for data transmission between the gNB and the UE on the bandwidth resource C, or may be used for data transmission between the gNB and the UE on the bandwidth resource D. If the DCI is used for scheduling corresponding to the bandwidth resource C, the DCI may also be referred to as first DCI. If the DCI is used for scheduling corresponding to the bandwidth resource D, the DCI may also be referred to as second DCI. The first DCI may be different from the second DCI. In a time unit in which DCI may be sent, the gNB may send at least one of the first DCI and the second DCI to the UE, or the gNB may not send DCI to the UE.

When the UE detects DCI, if the UE does not know whether the gNB has sent DCI to the UE, or does not know what is sent by the gNB to the UE is the first DCI or the second DCI, the UE may need to perform two times of DCI detection based on the first DCI and the second DCI. This increases a quantity of times that the UE performs detection, thereby increasing power consumption of the UE.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

Figure 3:
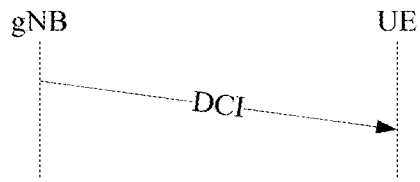
FIG. 3 is a schematic diagram of a downlink control information (DCI) transmission method according to an embodiment of this application.

Based on the foregoing descriptions, to reduce power consumption of the UE, an embodiment of this application provides a downlink control information transmission method shown in FIG. 3.

As shown in FIG. 3, a gNB sends DCI to UE on a first bandwidth resource, where the DCI is used for data transmission between the gNB and the UE on the first bandwidth resource or data transmission between the gNB and the UE on a second bandwidth resource; and if the DCI is used for data transmission between the gNB and the UE on the first bandwidth resource, a size of the DCI is L1_1, or if the DCI is used for data transmission between the gNB and the UE on the second bandwidth resource, a size of the DCI is L1_2, where L1_1 is equal to L1_2, and L1_1 and L1_2 are integers greater than or equal to 1. The UE detects the DCI on the first bandwidth resource. In the embodiments of this application, detecting the DCI by the UE may be alternatively detecting, by the UE, a PDCCH carrying the DCI. In the downlink control information transmission method corresponding to FIG. 3, if the DCI is used for data transmission between the gNB and the UE on the first bandwidth resource, the DCI may also be referred to as first DCI or DCI A, or may have other names; if the DCI is used for data transmission between the gNB and the UE on the second bandwidth resource, the DCI may also be referred to as second DCI, or may have other names. This is not limited in this application. In the embodiments of this application, for one piece of information such as DCI, a size of the information may also be referred to as a length of the information, a quantity of information bits in the information, or a volume of the information. This is not limited in this application. The size of the information may be measured in bits or OFDM symbols.

During DCI transmission between the gNB and the UE, in a time unit in which the gNB may send DCI to the UE, regardless of whether the gNB sends the DCI to the UE, the UE may detect the DCI. Specifically, in the method corresponding to FIG. 3, in the time unit in which the gNB may send the DCI to the UE, when the UE detects the DCI on the first bandwidth resource, one piece of DCI may be detected by the UE, where the DCI may be DCI used for data transmission between the gNB and the UE on the first bandwidth resource, or may be DCI used for data transmission between the gNB and the UE on the second bandwidth resource. Alternatively, two pieces of DCI may be detected by the UE, where one piece of the two pieces of DCI is DCI used for data transmission between the gNB and the UE on the first bandwidth resource, and the other piece of the two pieces of DCI is DCI used for data transmission between the gNB and the UE on the second bandwidth resource. Alternatively, no DCI may be detected by the UE. In the time unit in which the gNB may send the DCI to the UE, the gNB may send one piece of DCI to the UE on the first bandwidth resource, where the DCI may be DCI used for data transmission between the gNB and the UE on the first bandwidth resource, or may be DCI used for data transmission between the gNB and the UE on the second bandwidth resource. Alternatively, the gNB may send two pieces of DCI to the UE on the first bandwidth resource, where one piece of the two pieces of DCI may be DCI used for data transmission between the gNB and the UE on the first bandwidth resource, and the other piece of the two pieces of DCI is DCI used for data transmission between the gNB and the UE on the second bandwidth resource. Alternatively, the gNB may send no DCI to the UE on the first bandwidth resource. In the embodiments of this application, the time unit may also be referred to as a unit of time, including a symbol, a slot, a mini-slot, a sub-slot, a subframe, a mini-subframe, a sub-subframe, a radio subframe, or another time unit commonly used in the communications system field. When a communications system supports a plurality of numerologies, time unit lengths corresponding to different numerologies may be the same or may be different. This is not limited in this application.

When DCI is transmitted between the gNB and the UE through a PDCCH, the gNB configures search space of the PDCCH for the UE. The search space of the PDCCH may also be referred to as a candidate resource location of the PDCCH or a PDCCH candidate resource location, and the PDCCH candidate resource location includes N resource locations used for transmitting the PDCCH, where N is an integer greater than or equal to 1. The gNB may select one resource location from the PDCCH candidate resource location. For example, the gNB selects one resource location from the candidate resource location based on channel quality, and sends one PDCCH to the UE at the selected resource location. The UE monitors the search space of the PDCCH, and detects the PDCCH in the search space, that is, detects the PDCCH at the PDCCH candidate resource location. Before receiving the PDCCH, the UE does not know a specific resource location, in the N resource locations, at which the gNB sends the PDCCH, or does not know whether the gNB sends the PDCCH to the UE, and the UE considers that the gNB may send the PDCCH at any one of the N resource locations. Consequently, the UE detects the PDCCH at the N resource locations. To detect one PDCCH, the UE performs detection for one to N times. In the method corresponding to FIG. 3, when the UE detects the PDCCH in the search space of the PDCCH in the first bandwidth resource, by making L1_1 equal to L1_2, the UE may detect two pieces of DCI in the search space of the PDCCH based on one DCI size. One piece of the two pieces of DCI is used for data transmission between the gNB and the UE on the first bandwidth resource, and the other piece of the two pieces of DCI is used for data transmission between the gNB and the UE on the second bandwidth resource. There are two to N times of detection in total. Otherwise, if L1_1 is not equal to L1_2, the UE detects, in the search space of the PDCCH based on the DCI size of L1_1, DCI used for data transmission between the gNB and the UE on the first bandwidth resource, where there is one to N times of detection; and the UE detects, in the search space of the PDCCH based on the DCI size of L1_2, DCI used for data transmission between the gNB and the UE on the second bandwidth resource, where there is one to N times of detection. In other words, if L1_1 is not equal to L1_2, there are two to 2N times of detection performed by the UE in total. It can be learned based on the foregoing analysis that, in the method corresponding to FIG. 3, if the DCI is used for data transmission between the gNB and the UE on the first bandwidth resource, the DCI size is L1_1; or if the DCI is used for data transmission between the gNB and the UE on the second bandwidth resource, the DCI size is L1_2. Making L1_1 equal to L1_2 can reduce a quantity of times that the UE performs detection, thereby reducing power consumption of the UE.

In the embodiments of this application, the DCI may include at least one of resource allocation information, a carrier identifier, a power control command, a modulation and coding scheme (MCS), a redundancy version (RV), and a new data indicator (NDI).

Based on the downlink control information transmission method corresponding to FIG. 3, in a possible method A, the gNB sends DCI to the UE on the first bandwidth resource, where the DCI includes resource allocation information. If the DCI is used for data transmission between the gNB and the UE on the first bandwidth resource, the resource allocation information in the DCI indicates a resource allocated by the gNB to the UE in the first bandwidth resource, where a length of the resource allocation information is L2_1; or if the DCI is used for data transmission between the gNB and the UE on the second bandwidth resource, the resource allocation information in the DCI indicates a resource allocated by the gNB to the UE in the second bandwidth resource, where a length of the resource allocation information is L2_2, L2_1 is equal to L2_2, and L2_1 and L2_2 are integers greater than or equal to 1.

Based on the downlink control information transmission method corresponding to FIG. 3, if the DCI sent by the gNB to the UE includes the resource allocation information and a conventional resource allocation method is used, the following content is satisfied: If the DCI is used for data transmission between the gNB and the UE on the first bandwidth resource, a length of the resource allocation information included in the DCI is determined based on the first bandwidth resource, and the DCI is referred to as the first DCI; or if the DCI is used for data transmission between the gNB and the UE on the second bandwidth resource, a length of the resource allocation information included in the DCI is determined based on the second bandwidth resource, and the DCI is referred to as the second DCI. When a bandwidth of the first bandwidth resource is different from that of the second bandwidth resource, the length of the resource allocation information in the first DCI may be different from that of the resource allocation information in the second DCI. In this case, a size of the first DCI may be different from that of the second DCI. Therefore, in the possible method A, by making the length of the resource allocation information in the first DCI equal to the length of the resource allocation information in the second DCI, the size of the first DCI can be equal to the size of the second DCI. This can reduce a quantity of times that the UE detects DCI, thereby reducing power consumption of the UE.

Based on the control information transmission method corresponding to FIG. 3, the gNB may further perform, on the second bandwidth resource, scheduling corresponding to the second bandwidth resource for the UE. To be specific, the gNB sends third DCI to the UE on the second bandwidth resource, for data transmission between the gNB and the UE on the second bandwidth resource; and the UE receives, on the second bandwidth resource, the third DCI sent by the gNB. The third DCI may be the same as the second DCI, or may be DCI determined based on the second bandwidth resource. That the third DCI is DCI determined based on the second bandwidth resource may be specifically: The third DCI includes resource allocation information, where a length of the resource allocation information is determined based on the second bandwidth resource. For example, when the gNB reconfigures an operating bandwidth resource of the UE for the UE, if the operating bandwidth resource of the UE is a UE source operating bandwidth resource, the gNB may send the second DCI to the UE on the UE source operating bandwidth resource, for first n times of data transmission between the gNB and the UE on a UE target operating bandwidth resource after the reconfiguration. After the reconfiguration, the operating bandwidth resource of the UE is the UE target operating bandwidth resource, and the gNB may send the third DCI to the UE on the UE target operating bandwidth resource, for data transmission, other than the first n times of data transmission, between the gNB and the UE on the UE target operating bandwidth resource. n is an integer. For example, n is 1.

If DCI includes resource allocation information, the resource allocation information may be used to indicate a resource block (RB) or a resource block group (RBG) allocated by the gNB to the UE. Specifically, based on the control information transmission method corresponding to FIG. 3, if the DCI is used for data transmission between the gNB and the UE on the first bandwidth resource, the resource allocation information in the DCI indicates an RB or an RBG allocated by the gNB to the UE in the first bandwidth resource; or if the DCI is used for data transmission between the gNB and the UE on the second bandwidth resource, the resource allocation information in the DCI indicates an RB or an RBG allocated by the gNB to the UE in the second bandwidth resource. The RBG includes at least one RB. A quantity of RBs in the RBG may also be referred to as a size of the RBG or a magnitude of the RBG, or may have other names. The RB may be a physical resource block (PRB), or may be a virtual resource block (VRB).

Figure 4:
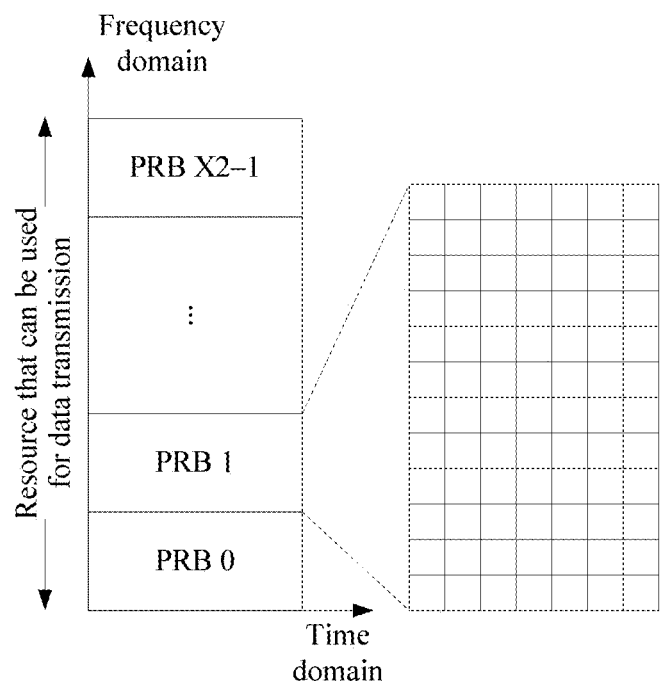
FIG. 4 is a schematic structural diagram of a bandwidth of a resource that can be used for data transmission according to an embodiment of this application.

In a wireless communications system, for example, in an OFDM-based communications system, a resource that can be used for data transmission includes several resource grids in frequency domain. One resource grid is corresponding to one subcarrier, and one PRB includes X1 resource grids, where X1 is an integer greater than 1. For example, X1 is 12. The resource that can be used for data transmission may be some or all of resources in a system resource, or may be some or all of resources in a bandwidth resource. This is not limited in this application. A bandwidth of the resource that can be used for data transmission may be referred to as X2 PRBs, where X2 is an integer greater than or equal to 1. PRBs in the resource that can be used for data transmission may be successively numbered from 0 to X2-1 in ascending order of frequencies, to obtain number values of the PRBs. The term "number value" may also be referred to as an "identifier" or "index" in the embodiments of this application. One PRB may include X3 symbols in time domain, where X3 is an integer greater than or equal to 1. For example, X3 is 7 or 14. That one PRB includes 12 resource grids in frequency domain and seven symbols in time domain is used as an example. FIG. 4 is a schematic structural diagram of a bandwidth of a resource that can be used for data transmission. As shown in FIG. 4, the bandwidth of the resource that can be used for data transmission includes a total of X2 PRBs: a PRB 0 to a PRB X2-1. For different subcarrier spacings, quantities of subcarriers in PRBs corresponding to the subcarrier spacings may be configured to be the same or different. This is not limited in this application. In the embodiments of this application, for a bandwidth resource, a bandwidth of a PRB in the bandwidth resource is determined based on a subcarrier spacing of the bandwidth resource and a quantity of subcarriers in the PRB. For example, for a bandwidth resource, if a subcarrier spacing of the bandwidth resource is 15 kHz, and one PRB includes 12 subcarriers, a bandwidth of the PRB in the bandwidth resource is 180 kHz. For another example, for a bandwidth resource, if a subcarrier spacing of the bandwidth resource is 60 kHz, and one PRB includes 12 subcarriers, a bandwidth of the PRB in the bandwidth resource is 720 kHz.

In a resource that can be used for data transmission, one PRB is corresponding to one VRB. The VRB may include a centralized VRB or a distributed VRB. A centralized VRB is directly mapped to a PRB. To be specific, an index of a PRB corresponding to a VRB whose index is $n_{VRB}$ is $n_{PRB}$, where $n_{PRB}=n_{VRB}$. A distributed VRB is mapped to a PRB according to a specific rule. The rule may be a mapping method commonly used by a person skilled in the art. For example, the mapping method may be a mapping method in the 3GPP standard protocol for a long term evolution (LTE) system.

In the embodiments of this application, in an example, for a bandwidth resource, if a size of one RBG is F1 RBs, where F1 is an integer greater than or equal to 1, a quantity of RBGs in the bandwidth resource is $\lceil F2/F1 \rceil$. F2 is a quantity of RBs in the bandwidth resource. It should be noted that if F2 mod F1 is greater than 0, for the bandwidth resource, a size of $\lfloor F2/F1 \rfloor$ RBGs is F1, and a size of one RBG is F2-$\lfloor F2/F1 \rfloor \times$F1.

According to the possible method A in the downlink control information transmission method corresponding to FIG. 3, the gNB sends DCI to the UE on the first bandwidth resource, where the DCI includes resource allocation information. A length of the resource allocation information may be determined according to the following first method for determining a length of resource allocation information or the following second method for determining a length of resource allocation information.

The first method for determining a length of resource allocation information includes: determining the length of the resource allocation information based on M bandwidth resources, where the M bandwidth resources include the first bandwidth resource and the second bandwidth resource, and M is an integer greater than or equal to 2. The M bandwidth resources are M bandwidth resources that are predefined or that are configured by the gNB for the UE by using signaling. The signaling may be RRC signaling, a broadcast message, a system message, a MAC CE, DCI, or signaling carried on a physical downlink data channel. The gNB may configure a bandwidth resource in the M bandwidth resources as the operating bandwidth resource of the UE. The M bandwidth resources may also be referred to as configuration bandwidth resources or candidate bandwidth resources, or may have other names. This is not limited in this application.

According to the first method for determining a length of resource allocation information, in an example, the length of the resource allocation information is max($N_{RBG}(i)$), where a value of i ranges from 0 to M-1, and $N_{RBG}(i)$ is a quantity of RBGs in an $i^{th}$ bandwidth resource of the M bandwidth resources. The method may also be described as calculating M values, where an $i^{th}$ value of the M values is $N_{RBG}(i)$, and a maximum value in the M values is the length of the resource allocation information. In an example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, $S_{RBG}(i)$ is a quantity of RBs in the RBG in the $i^{th}$ bandwidth resource, and the RB in the RBG in the $i^{th}$ bandwidth resource is an RB in the $i^{th}$ bandwidth resource. In the embodiments of this application, an operation $\lceil\ \rceil$ represents rounding up or rounding up to the next integer. For the quantity of RBs in the RBG in the $i^{th}$ bandwidth resource, a size of the RBG may be predefined, a size of the RBG may be indicated by using signaling sent by the gNB to the UE, or a size of the RBG may be determined based on a bandwidth of the $i^{th}$ bandwidth resource. The signaling may be RRC signaling, a broadcast message, a system message, a MAC CE, DCI, or signaling carried on a physical downlink data channel.

In the embodiments of this application, for a bandwidth resource, determining an RBG size based on the bandwidth resource may be determining the RBG size based on a bandwidth of the bandwidth resource. Determining the RBG size based on the bandwidth of the bandwidth resource may be determining the RBG size based on the bandwidth of the bandwidth resource and a mapping relationship between a bandwidth and an RBG size.

For example, Table 1 describes a possible mapping relationship between a bandwidth and an RBG size. As described in Table 1, if a quantity of RBs in the bandwidth resource is less than or equal to 10, there is one RB in an RBG; if a quantity of RBs in the bandwidth resource is greater than or equal to 11 and less than or equal to 26, there are two RBs in an RBG; if a quantity of RBs in the bandwidth resource is greater than or equal to 27 and less than or equal to 63, there are three RBs in an RBG; if a quantity of RBs in the bandwidth resource is greater than or equal to 64 and less than or equal to 110, there are four RBs in an RBG.

TABLE 1

| Bandwidth (a quantity of RBs in a bandwidth resource) | RBG size (a quantity of RBs in an RBG) |
| --- | --- |
| ≤10 | 1 |
| 11-26 | 2 |
| 27-63 | 3 |
| 64-110 | 4 |

For another example, Table 2 describes another possible mapping relationship between a bandwidth and an RBG size. As described in Table 2, if a quantity of RBs in the bandwidth resource is greater than or equal to 1 and less than or equal to 32, there are two RBs in an RBG; if a quantity of RBs in the bandwidth resource is greater than or equal to 33 and less than or equal to 64, there are four RBs in an RBG; if a quantity of RBs in the bandwidth resource is greater than or equal to 65 and less than or equal to 128, there are eight RBs in an RBG; if a quantity of RBs in the bandwidth resource is greater than or equal to 129 and less than or equal to 275, there are 16 RBs in an RBG.

TABLE 2

| Bandwidth (a quantity of RBs in a bandwidth resource) | RBG size (a quantity of RBs in an RBG) |
| --- | --- |
| 1-32 | 2 |
| 33-64 | 4 |
| 65-128 | 8 |
| 129-275 | 16 |

When an RBG is used as a resource allocation unit, the RBG size is determined based on the bandwidth of the bandwidth resource, and the RBG size may be increased as the bandwidth of the bandwidth resource increases, thereby reducing an increasing speed of a quantity of RBGs in the bandwidth resource. More RBGs in the bandwidth resource may introduce a greater length of the resource allocation information in the DCI when scheduling is performed for the UE in the bandwidth resource. Therefore, reducing the quantity of RBGs can reduce the length of the resource allocation information, thereby reducing signaling overheads.

According to the first method for determining a length of resource allocation information, in another example, the length of the resource allocation information is $\max(\lceil \log_2(N_{RBG}(i) \times (N_{RBG}(i)+1)/2) \rceil)$, where a value of i ranges from 0 to M−1, and $N_{RBG}(i)$ is a quantity of RBGs in an $i^{th}$ bandwidth resource of the M bandwidth resources. It may also be described as calculating M values, where an $i^{th}$ value of the M values is $\lceil \log_2(N_{RBG}(i) \times (N_{RBG}(i)+1)/2) \rceil$, and a maximum value in the M values is the length of the resource allocation information. In an example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, $S_{RBG}(i)$ is a quantity of RBs in the RBG in the $i^{th}$ bandwidth resource, and the RB in the RBG in the $i^{th}$ bandwidth resource is an RB in the $i^{th}$ bandwidth resource. A method for determining the quantity of RBs in the RBG in the $i^{th}$ bandwidth resource is the same as that in a corresponding description in the previous paragraph. Details are not described herein again.

The second method for determining a length of resource allocation information includes determining the length of the resource allocation information based on the first bandwidth resource.

According to the second method for determining a length of resource allocation information, in an example, the length of the resource allocation information is a quantity of first RBGs in the first bandwidth resource. In an example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. For the first RBG, a size of the RBG may be predefined, a size of the RBG may be indicated by using signaling sent by the gNB to the UE, or a size of the RBG may be determined based on a bandwidth of the first bandwidth resource. The signaling may be RRC signaling, a broadcast message, a system message, a MAC CE, DCI, or signaling carried on a physical downlink data channel.

According to the second method for determining a length of resource allocation information, in another example, the length of the resource allocation information is $\lceil \log_2((N_{RBG\_1} \times (N_{RBG\_1}+1)/2)) \rceil$, where $N_{RBG\_1}$ is a quantity of first RBGs in the first bandwidth resource. In an example, a value of $N_{RBG\_1}$ is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource.

According to the second method for determining a length of resource allocation information, the gNB sends DCI to the UE on the first bandwidth resource; and if the DCI is used for data transmission between the gNB and the UE on the second bandwidth resource, the resource allocation information in the DCI indicates a second RBG allocated to the UE in the second bandwidth resource, and an RB in the second RBG is an RB in the second bandwidth resource. A size of the second RBG may be determined according to any one of the following first method for determining an RBG size to the following fifth method for determining an RBG size.

The first method for determining an RBG size includes determining the size of the second RBG based on a bandwidth of the first bandwidth resource.

The second method for determining an RBG size includes determining the size of the second RBG based on the length of the resource allocation information and a bandwidth of the second bandwidth resource. Specifically, if the length of the resource allocation information is $\lceil N_{RB\_1}/S_{RBG\_1} \rceil$, the size of the second RBG is greater than or equal to $\lceil N_{RB\_2}/L \rceil$, where L is $\lceil N_{RB\_1}/S_{RBG\_1} \rceil$, and $N_{RB\_2}$ is a quantity of RBs in the second bandwidth resource. If the length of the resource allocation information is $\lceil \log_2(N_{RBG\_1} \times (N_{RBG\_1}+1)/2) \rceil$, the size of the second RBG is greater than or equal to $$\left\lceil \frac{N_{RB\_2}}{\left\lceil \frac{\sqrt{4 \times 2^{L+1}+1}-1}{2} \right\rceil} \right\rceil,$$

where L is $\lceil \log_2(N_{RBG\_1} \times (N_{RBG\_1}+1)/2) \rceil$, and $N_{RB\_2}$ is a quantity of RBs in the second bandwidth resource. For example, the size of the second RBG is $$\left\lceil \frac{N_{RB\_2}}{\left\lceil \frac{\sqrt{4 \times 2^{L+1}+1}-1}{2} \right\rceil} \right\rceil.$$

For another example, possible R values are predefined for the RBG size, and the size of the second RBG is a minimum value, in the R values, that is greater than or equal to $$\left\lceil \frac{N_{RB\_2}}{\left\lceil \frac{\sqrt{4 \times 2^{L+1}+1}-1}{2} \right\rceil} \right\rceil,$$

where R is an integer greater than or equal to 1. For example, the R values may be values of RBG sizes listed in Table 1 or Table 2.

The third method for determining an RBG size is determining the size of the second RBG based on a bandwidth of the second bandwidth resource.

The fourth method for determining an RBG size is predefining the size of the second RBG.

The fifth method for determining an RBG size is sending signaling by the gNB to the UE, to indicate the size of the second RBG by using the signaling. The signaling may be RRC signaling, a broadcast message, a system message, a MAC CE, DCI, or signaling carried on a physical downlink data channel.

According to the possible method A in the downlink control information transmission method corresponding to FIG. 3, the gNB sends DCI to the UE on the first bandwidth resource, where the DCI includes resource allocation information. The resource allocation information may be any one of a first type of resource allocation information to a fourth type of resource allocation information. One type of resource allocation information may also be referred to as resource allocation information corresponding to a resource allocation type.

First Type of Resource Allocation Information

This type of resource allocation information includes an L1_1-bit bitmap and L1_2 padding bits, where L1_1 is an integer greater than or equal to 1, and L1_2 is an integer greater than or equal to 0. A padding bit can be filled with a predefined value. For example, a value of the padding bit is 0. In the embodiments of this application, if the DCI includes the resource allocation information, a padding bit in the resource allocation information may be alternatively located in the DCI, and is not located in the resource allocation information. One bit in the L1_1-bit bitmap is corresponding to one RBG in a bandwidth resource, and the bit may also be referred to as one information bit. For one bit in the L1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1. During resource allocation by using the first type of resource allocation information, any RBG in a bandwidth resource can be allocated to the UE based on a value of each bit in the bitmap for data transmission. This can provide flexible resource configuration, and can be used for continuous and discontinuous resource allocation.

According to the possible method A in the downlink control information transmission method corresponding to FIG. 3, the gNB sends DCI to the UE on the first bandwidth resource. If resource allocation information included in the DCI is the first type of resource allocation information, a length of the resource allocation information may be determined according to either the following method A1 or the following method A2.

The method A1 includes: determining the length of the resource allocation information based on M bandwidth resources, where the M bandwidth resources include the first bandwidth resource and the second bandwidth resource, and M is an integer greater than or equal to 2. The M bandwidth resources are predefined or are configured by the gNB for the UE by using signaling. The signaling may be RRC signaling, a broadcast message, a system message, a MAC CE, DCI, or signaling carried on a physical downlink data channel. The gNB may configure a bandwidth resource in the M bandwidth resources as the operating bandwidth resource of the UE. The M bandwidth resources may also be referred to as configuration bandwidth resources or candidate bandwidth resources, or may have other names. This is not limited in this application.

According to the method A1, in an example, the length of the resource allocation information is max($N_{RBG}(i)$), where a value of i ranges from 0 to M−1, and $N_{RBG}(i)$ is a quantity of RBGs in an $i^{th}$ bandwidth resource of the M bandwidth resources. The method may also be described as calculating M values, where an $i^{th}$ value of the M values is $N_{RBG}(i)$, and a maximum value in the M values is the length of the resource allocation information. In an example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, $S_{RBG}(i)$ is a quantity of RBs in the RBG in the $i^{th}$ bandwidth resource, and the RB in the RBG in the $i^{th}$ bandwidth resource is an RB in the $i^{th}$ bandwidth resource. A value of $S_{RBG}(i)$ may be predefined, a value of $S_{RBG}(i)$ may be indicated by using signaling sent by the gNB to the UE, or a value of $S_{RBG}(i)$ may be determined based on a bandwidth of the $i^{th}$ bandwidth resource. The signaling may be RRC signaling, a broadcast message, a system message, a MAC CE, DCI, or signaling carried on a physical downlink data channel.

When the method A1 is applied to the possible method A in the downlink control information transmission method corresponding to FIG. 3, the gNB sends DCI to the UE on the first bandwidth resource. If the DCI is used for data transmission between the gNB and the UE on the first bandwidth resource, resource allocation information in the DCI includes an X1_1-bit bitmap and X1_2 padding bits, where one bit in the X1_1-bit bitmap is corresponding to one first RBG in the first bandwidth resource. For one bit in the X1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1. For example, a value of X1_1 is a quantity of first RBGs in the first bandwidth resource. In an example, a value of the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. A value of X1_2 is a value obtained by subtracting X1_1 from the length of the resource allocation information. A size of the first RBG may be predefined, a size of the first RBG may be indicated by using signaling sent by the gNB to the UE, or a size of the first RBG may be determined based on a bandwidth of the first bandwidth resource. The signaling may be RRC signaling, a broadcast message, a system message, a MAC CE, DCI, or signaling carried on a physical downlink data channel.

When the method A1 is applied to the possible method A in the downlink control information transmission method corresponding to FIG. 3, the gNB sends DCI to the UE on the first bandwidth resource. If the DCI is used for data transmission between the gNB and the UE on the second bandwidth resource, resource allocation information in the DCI includes a Y1_1-bit bitmap and Y1_2 padding bits, where one bit in the Y1_1-bit bitmap is corresponding to one second RBG in the second bandwidth resource. For one bit in the Y1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1. A value of Y1_1 is a quantity of second RBGs in the second bandwidth resource. In an example, a value of the quantity of second RBGs in the second bandwidth resource is $\lceil N_{RB\_2}/S_{RBG\_2} \rceil$, where $N_{RB\_2}$ is a quantity of RBs in the second bandwidth resource, $S_{RBG\_2}$ is a quantity of RBs in the second RBG, and the RB in the second RBG is an RB in the second bandwidth resource. A value of Y1_2 is a value obtained by subtracting Y1_1 from the length of the resource allocation information.

A size of the second RBG may be predefined, a size of the second RBG may be indicated by using signaling sent by the gNB to the UE, or a size of the second RBG may be determined based on a bandwidth of the second bandwidth resource. The signaling may be RRC signaling, a broadcast message, a system message, a MAC CE, DCI, or signaling carried on a physical downlink data channel.

According to the method A1, during cross-bandwidth-resource scheduling, when bandwidths of different bandwidth resources are different, lengths of resource allocation information that are determined based on the different bandwidth resources are different, and a maximum length in the lengths of the resource allocation information is configured as a length of resource allocation information used for cross-bandwidth-resource scheduling. This can satisfy a requirement of performing resource allocation based on different bandwidth resources.

The method A2 includes determining the length of the resource allocation information based on the first bandwidth resource.

According to the method A2, in an example, the length of the resource allocation information is a quantity of first RBGs in the first bandwidth resource. In an example, the quantity of first RBGs in the first bandwidth resource is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. A size of the first RBG may be predefined, a size of the first RBG may be indicated by using signaling sent by the gNB to the UE, or a size of the first RBG may be determined based on a bandwidth of the first bandwidth resource. The signaling may be RRC signaling, a broadcast message, a system message, a MAC CE, DCI, or signaling carried on a physical downlink data channel.

When the method A2 is applied to the possible method A in the downlink control information transmission method corresponding to FIG. 3, the gNB sends DCI to the UE on the first bandwidth resource. If the DCI is used for data transmission between the gNB and the UE on the first bandwidth resource, resource allocation information in the DCI includes an X1_1-bit bitmap, where one bit in the X1_1-bit bitmap is corresponding to one first RBG in the first bandwidth resource. For one bit in the X1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1. A value of X1_1 is a quantity of first RBGs in the first bandwidth resource.

When the method A2 is applied to the possible method A in the downlink control information transmission method corresponding to FIG. 3, the gNB sends DCI to the UE on the first bandwidth resource. If the DCI is used for data transmission between the gNB and the UE on the second bandwidth resource, resource allocation information in the DCI includes a Y1_1-bit bitmap and Y1_2 padding bits. A value of Y1_2 is a value obtained by subtracting Y1_1 from the length of the resource allocation information, and one bit in the Y1_1-bit bitmap is corresponding to one second RBG in the second bandwidth resource. For one bit in the Y1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1. An RB in the second RBG is an RB in the second bandwidth resource. A size of the second RBG may be determined according to any one of the following first method for determining a size of a second RBG to the following fifth method for determining a size of a second RBG.

The first method for determining a size of a second RBG includes predefining the size of the second RBG.

The second method for determining a size of a second RBG includes sending, by the gNB, signaling to the UE; and receiving, by the UE, the signaling sent by the gNB, to indicate the size of the second RBG by using the signaling. The signaling may be RRC signaling, a broadcast message, a system message, a MAC CE, DCI, or signaling carried on a physical downlink data channel.

The third method for determining a size of a second RBG includes determining that the size of the second RBG is equal to a size of a first RBG. It may also be understood that a quantity of RBs included in the second RBG is equal to a quantity of RBs included in the first RBG.

In an example, the gNB sends DCI to the UE on the first bandwidth resource, where the DCI is used for data transmission between the gNB and the UE on the first bandwidth resource or data transmission between the gNB and the UE on the second bandwidth resource. The bandwidth of the first bandwidth resource is 10 RBs, and the bandwidth of the second bandwidth resource is 72 RBs. The mapping relationship between a bandwidth and an RBG size that is described in Table 2 in the method A is used an example. In the method A2, based on the bandwidth of the first bandwidth resource, it is determined that a value of the size of the first RBG is 2, that a value of the size of the second RBG is 2, and that a value of the length of the resource allocation information included in the DCI is 5. If the DCI sent by the gNB to the UE is used for data transmission between the gNB and the UE on the second bandwidth resource, the length of the resource allocation information included in the DCI is 5 bits. In an example, a bit 0 is corresponding to an RBG 0 in the second bandwidth resource, and the RBG 0 is corresponding to {RB 0, RB 1} in the second bandwidth resource; a bit 1 is corresponding to an RBG 1 in the second bandwidth resource, and the RBG 1 is corresponding to {RB 2, RB 3} in the second bandwidth resource; a bit 2 is corresponding to an RBG 2 in the second bandwidth resource, and the RBG 2 is corresponding to {RB 4, RB 5} in the second bandwidth resource; a bit 3 is corresponding to an RBG 3 in the second bandwidth resource, and the RBG 3 is corresponding to {RB 6, RB 7} in the second bandwidth resource; and a bit 4 is corresponding to an RBG 4 in the second bandwidth resource, and the RBG 4 is corresponding to {RB 8, RB 9} in the second bandwidth resource. In another example, a bit 0 is corresponding to an RBG 35 in the second bandwidth resource, and the RBG 35 is corresponding to {RB 71, RB 70} in the second bandwidth resource; a bit 1 is corresponding to an RBG 34 in the second bandwidth resource, and the RBG 34 is corresponding to {RB 69, RB 68} in the second bandwidth resource; a bit 2 is corresponding to an RBG 33 in the second bandwidth resource, and the RBG 33 is corresponding to {RB 67, RB 66} in the second bandwidth resource; a bit 3 is corresponding to an RBG 32 in the second bandwidth resource, and the RBG 32 is corresponding to {RB 65, RB 64} in the second bandwidth resource; and a bit 4 is corresponding to an RBG 31 in the second bandwidth resource, and the RBG 31 is corresponding to {RB 63, RB 62} in the second bandwidth resource. It should be noted that in this application, mapping relationships between a bit in a bitmap and an RBG are not limited to the two listed types, and may also include other predefined or configured mapping relationships.

In another example, the gNB sends DCI to the UE on the first bandwidth resource, where the DCI is used for data transmission between the gNB and the UE on the first bandwidth resource or data transmission between the gNB and the UE on the second bandwidth resource. The bandwidth of the first bandwidth resource is 10 RBs, and the bandwidth of the second bandwidth resource is 8 RBs. The mapping relationship between a bandwidth and an RBG size that is described in Table 2 in the method A is used an example. In the method A2, based on the bandwidth of the first bandwidth resource, it is determined that a value of the size of the first RBG is 2, that a value of the size of the second RBG is 2, and that a value of the length of the resource allocation information included in the DCI is 5. If the DCI sent by the gNB to the UE is used for data transmission between the gNB and the UE on the second bandwidth resource, the length of the resource allocation information included in the DCI is 5 bits. A bit 0 is corresponding to an RBG 0 in the second bandwidth resource, and the RBG 0 is corresponding to {RB 0, RB 1} in the second bandwidth resource; a bit 1 is corresponding to an RBG 1 in the second bandwidth resource, and the RBG 1 is corresponding to {RB 2, RB 3} in the second bandwidth resource; a bit 2 is corresponding to an RBG 2 in the second bandwidth resource, and the RBG 2 is corresponding to {RB 4, RB 5} in the second bandwidth resource; a bit 3 is corresponding to an RBG 3 in the second bandwidth resource, and the RBG 3 is corresponding to {RB 6, RB 7} in the second bandwidth resource; and a bit 4 is a padding bit.

The fourth method for determining a size of a second RBG includes determining the size of the second RBG based on the bandwidth of the second bandwidth resource.

In an example, the gNB sends DCI to the UE on the first bandwidth resource, where the DCI is used for data transmission between the gNB and the UE on the first bandwidth resource or data transmission between the gNB and the UE on the second bandwidth resource. The bandwidth of the first bandwidth resource is 10 RBs, and the bandwidth of the second bandwidth resource is 72 RBs. The mapping relationship between a bandwidth and an RBG size that is described in Table 2 in the method A is used an example. In the method A2, based on the bandwidth of the first bandwidth resource, it is determined that a value of the size $S_{RBG\_1}$ of the first RBG is 2 and that a value of the length of the resource allocation information included in the DCI is 5, and it is determined, based on the bandwidth of the second bandwidth resource, that the size of the second RBG is 8. If the DCI sent by the gNB to the UE is used for data transmission between the gNB and the UE on the second bandwidth resource, the length of the resource allocation information included in the DCI is 5 bits. A bit 0 is corresponding to an RBG 0 in the second bandwidth resource, and the RBG 0 is corresponding to {RB 0, RB 1, RB 2, RB 3, RB 4, RB 5, RB 6, RB 7} in the second bandwidth resource; a bit 1 is corresponding to an RBG 1 in the second bandwidth resource, and the RBG 1 is corresponding to {RB 8, RB 9, RB 01, RB 11, RB 12, RB 13, RB 14, RB 15} in the second bandwidth resource; a bit 2 is corresponding to an RBG 2 in the second bandwidth resource, and the RBG 2 is corresponding to {RB 16, RB 17, RB 18, RB 19, RB 20, RB 21, RB 22, RB 23} in the second bandwidth resource; a bit 3 is corresponding to an RBG 3 in the second bandwidth resource, and the RBG 3 is corresponding to {RB 24, RB 25, RB 26, RB 27, RB 28, RB 29, RB 30, RB 31} in the second bandwidth resource; and a bit 4 is corresponding to an RBG 4 in the second bandwidth resource, and the RBG 4 is corresponding to {RB 32, RB 33, RB 34, RB 35, RB 36, RB 37, RB 38, RB 39} in the second bandwidth resource.

In another example, the gNB sends DCI to the UE on the first bandwidth resource, where the DCI is used for data transmission between the gNB and the UE on the first bandwidth resource or data transmission between the gNB and the UE on the second bandwidth resource. The bandwidth of the first bandwidth resource is 20 RBs, and the bandwidth of the second bandwidth resource is 72 RBs. The mapping relationship between a bandwidth and an RBG size that is described in Table 2 in the method A is used an example. In the method A2, based on the bandwidth of the first bandwidth resource, it is determined that a value of the size $S_{RBG\_1}$ of the first RBG is 2 and that a value of the length of the resource allocation information included in the DCI is 10, and it is determined, based on the bandwidth of the second bandwidth resource, that the size of the second RBG is 8. If the DCI sent by the gNB to the UE is used for data transmission between the gNB and the UE on the second bandwidth resource, the length of the resource allocation information included in the DCI is 10 bits. A bit 0 is corresponding to an RBG 0 in the second bandwidth resource, and the RBG 0 is corresponding to {RB 0, RB 1, RB 2, RB 3, RB 4, RB 5, RB 6, RB 7} in the second bandwidth resource; a bit 1 is corresponding to an RBG 1 in the second bandwidth resource, and the RBG 1 is corresponding to {RB 8, RB 9, RB 10, RB 11, RB 12, RB 13, RB 14, RB 15} in the second bandwidth resource; a bit 2 is corresponding to an RBG 2 in the second bandwidth resource, and the RBG 2 is corresponding to {RB 16, RB 17, RB 18, RB 19, RB 20, RB 21, RB 22, RB 23} in the second bandwidth resource; a bit 3 is corresponding to an RBG 3 in the second bandwidth resource, and the RBG 3 is corresponding to {RB 24, RB 25, RB 26, RB 27, RB 28, RB 29, RB 30, RB 31} in the second bandwidth resource; a bit 4 is corresponding to an RBG 4 in the second bandwidth resource, and the RBG 4 is corresponding to {RB 32, RB 33, RB 34, RB 35, RB 36, RB 37, RB 38, RB 39} in the second bandwidth resource; a bit 5 is corresponding to an RBG 5 in the second bandwidth resource, and the RBG 5 is corresponding to {RB 40, RB 41, RB 42, RB 43, RB 44, RB 45, RB 46, RB 47} in the second bandwidth resource; a bit 6 is corresponding to an RBG 6 in the second bandwidth resource, and the RBG 6 is corresponding to {RB 48, RB 49, RB 50, RB 51, RB 52, RB 53, RB 54, RB 55} in the second bandwidth resource; a bit 7 is corresponding to an RBG 7 in the second bandwidth resource, and the RBG 7 is corresponding to {RB 56, RB 57, RB 58, RB 59, RB 60o, RB 61, RB 62, RB 63} in the second bandwidth resource; a bit 8 is corresponding to an RBG 8 in the second bandwidth resource, and the RBG 8 is corresponding to {RB 64, RB 65, RB 66, RB 67, RB 68, RB 69, RB 70, RB 71} in the second bandwidth resource; and a bit 9 is a padding bit.

The fifth method for determining a size of a second RBG includes determining the size of the second RBG based on the length of the resource allocation information and the second bandwidth resource. For example, a value of the size of the second RBG is greater than or equal to $\lceil N_{RB\_2}/L \rceil$, where L is the length of the resource allocation information, and $N_{RB\_2}$ is a quantity of RBs in the second bandwidth resource. For example, the size of the second RBG is $\lceil N_{RB\_2}/L \rceil$. For another example, possible R values are predefined for the RBG size, and the size of the second RBG is a minimum value, in the R values, that is greater than or equal to $\lceil N_{RB\_2}/L \rceil$, where R is an integer greater than or equal to 1. For example, the R values may be values of RBG sizes listed in Table 1 or Table 2.

According to the method A2, during cross-bandwidth-resource scheduling, when the bandwidths of the first bandwidth resource and the second bandwidth resource are different, the length of the resource allocation information is determined based on the first bandwidth resource. This can avoid that the length of the resource allocation information exceeds an actual required length, thereby reducing signaling overheads.

The first type of resource allocation information may also be applied to the third DCI in the method corresponding to FIG. 3. To be specific, the gNB sends the third DCI to the UE on the second bandwidth resource, for data transmission between the gNB and the UE on the second bandwidth resource. The third DCI may be the same as the second DCI, or the third DCI may be determined based on the bandwidth of the second bandwidth resource. For example, the third DCI includes a Z1_1-bit bitmap, Z1_1 is an integer greater than or equal to 1, and one bit in the Z1_1-bit bitmap is corresponding to one third RBG in the second bandwidth resource. For one bit in the Z1_1-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. A value of Z1_1 may be a quantity of third RBGs in the second bandwidth resource. An RB included in the third RBG is an RB in the second bandwidth resource. A size of the third RBG may be predefined, a size of the third RBG may be indicated by using signaling sent by the gNB to the UE, or a size of the third RBG may be determined based on the bandwidth of the second bandwidth resource.

Second Type of Resource Allocation Information

This type of resource allocation information includes an L2_1-bit resource indicator value (RIV) and L2_2 padding bits, where L2_1 is an integer greater than or equal to 1, and L2_2 is an integer greater than or equal to 0. Information indicated by the RIV includes an index of a start RBG allocated by the gNB to the UE in the bandwidth resource and a quantity of RBGs consecutively allocated by the gNB to the UE in the bandwidth resource. In the resource configuration method, an RBG size is an integer greater than or equal to 1. When the RBG size is 1, an RBG in the resource allocation method is equivalent to an RB. According to the resource allocation method, during resource allocation, joint coding is performed on an index of an allocated start RBG and a quantity of consecutively allocated RBGs, so that resource allocation can be performed by using fewer information bits, thereby reducing signaling overheads.

According to the possible method A in the control information transmission method in FIG. 3, the gNB sends DCI to the UE on the first bandwidth resource. If resource allocation information included in the DCI is the second type of resource allocation information, a length of the resource allocation information may be configured according to either the following method B1 or the following method B2.

The method B1 includes determining the length of the resource allocation information based on M bandwidth resources. A description of the M bandwidth resources is the same as a corresponding description in the method A1. Details are not described herein again.

According to the method B1, in an example, the length of the resource allocation information is max ($\lceil \log_2(N_{RBG}(i) \times$ $(N_{RBG}(i)/2) \rceil$), where a value of i ranges from 0 to M−1, and $N_{RBG}(i)$ is a quantity of RBGs in an $i^{th}$ bandwidth resource of the M bandwidth resources. The method may also be described as calculating M values, where an $i^{th}$ value of the M values is $\lceil \log_2(N_{RBG}(i) \times (N_{RBG}(i)+1)/2) \rceil$, and a maximum value in the M values is the length of the resource allocation information. In an example, a value of $N_{RBG}(i)$ is $\lceil N_{RB}(i)/S_{RBG}(i) \rceil$, where $N_{RB}(i)$ is a quantity of RBs in the $i^{th}$ bandwidth resource of the M bandwidth resources, $S_{RBG}(i)$ is a quantity of RBs in the RBG in the $i^{th}$ bandwidth resource, and the RB in the RBG in the $i^{th}$ bandwidth resource is an RB in the $i^{th}$ bandwidth resource. A method for determining the quantity of RBs in the RBG in the $i^{th}$ bandwidth resource is similar to that in a corresponding description in the method A1. Details are not described herein again.

When the method B1 is applied to the possible method A in the downlink control information transmission method corresponding to FIG. 3, the gNB sends DCI to the UE on the first bandwidth resource. If the DCI is used for data transmission between the gNB and the UE on the first bandwidth resource, resource allocation information in the DCI includes an X2_1-bit RIV and X2_2 padding bits, where the X2_1-bit RIV indicates a start first RBG allocated by the gNB to the UE in the first bandwidth resource and a quantity of first RBGs consecutively allocated by the gNB to the UE in the first bandwidth resource. For example, a value of X2_1 is $\lceil \log_2(N_{RBG\_1} \times (N_{RBG\_1}+1)/2) \rceil$, and $N_{RBG\_1}$ is a quantity of first RBGs in the first bandwidth resource. In an example, $N_{RBG\_1} = \lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. A method for determining a size of a first RBG is similar to that in the description in the method A1. Details are not described herein again. A value of X2_2 is a value obtained by subtracting X2_1 from the length of the resource allocation information.

When the method B1 is applied to the possible method A in the downlink control information transmission method corresponding to FIG. 3, if the DCI is used for data transmission between the gNB and the UE on the second bandwidth resource, resource allocation information in the DCI includes a Y2_1-bit RIV and Y2_2 padding bits, where the Y2_1-bit RIV indicates a start second RBG allocated by the gNB to the UE in the second bandwidth resource and a quantity of second RBGs consecutively allocated by the gNB to the UE in the second bandwidth resource. A value of Y2_1 is $\lceil \log_2(N_{RBG\_2} \times (N_{RBG\_2}+1)/2) \rceil$, and $N_{RBG\_2}$ is a quantity of second RBGs in the second bandwidth resource. In an example, $N_{RBG\_2} = \lceil N_{RB\_2}/S_{RBG\_2} \rceil$, $N_{RB\_2}$ is a quantity of RBs in the second bandwidth resource, $S_{RBG\_2}$ is a quantity of RBs in the second RBG, and the RB in the second RBG is an RB in the second bandwidth resource. A method for determining a size of a second RBG is similar to that in the description in the method A1. Details are not described herein again. A value of Y2_2 is a value obtained by subtracting Y2_1 from the length of the resource allocation information.

The method B2 includes determining the length of the resource allocation information based on the first bandwidth resource.

According to the method B2, in an example, the length of the resource allocation information is $\lceil \log_2((N_{RBG} \times (N_{RBG\_1}+1)/2) \rceil$, and $N_{RBG\_1}$ is a quantity of first RBGs in the first bandwidth resource. In an example, a value of $N_{RBG\_1}$ is $\lceil N_{RB\_1}/S_{RBG\_1} \rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. A method for determining a size of a first RBG is similar to that in the description in the method A2. Details are not described herein again.

When the method B2 is applied to the possible method A in the downlink control information transmission method corresponding to FIG. 3, the gNB sends DCI to the UE on the first bandwidth resource. If the DCI is used for data transmission between the gNB and the UE on the first bandwidth resource, resource allocation information in the DCI includes an X2_1-bit RIV, where the X2_1-bit RIV indicates a start first RBG allocated by the gNB to the UE in the first bandwidth resource and a quantity of first RBGs consecutively allocated by the gNB to the UE in the first bandwidth resource. A value of X2_1 is $\lceil \log_2(N_{RBG\_1} \times (N_{RBG\_1}+1)/2) \rceil$.

When the method B2 is applied to the possible method A in the downlink control information transmission method corresponding to FIG. 3, the gNB sends DCI to the UE on the first bandwidth resource. If the DCI is used for data transmission between the gNB and the UE on the second bandwidth resource, resource allocation information in the DCI includes a Y2_1-bit RIV and Y2_2 padding bits, where a value of Y2_2 is a value obtained by subtracting Y2_1 from the length of the resource allocation information, and the Y2_1-bit RIV indicates a start second RBG allocated by the gNB to the UE in the second bandwidth resource and a quantity of second RBGs consecutively allocated by the gNB to the UE in the second bandwidth resource. An RB in the second RBG is an RB in the second bandwidth resource. A method for determining a size of a second RBG is similar to that in the description in the method A2. Details are not described herein again. A size of the second RBG may be determined according to any one of the following first method for determining a size of a second RBG to the following fifth method for determining a size of a second RBG.

The first method for determining a size of a second RBG is the same as the first method for determining a size of a second RBG in the method A2.

The second method for determining a size of a second RBG is the same as the second method for determining a size of a second RBG in the method A2.

The third method for determining a size of a second RBG is the same as the third method for determining a size of a second RBG in the method A2.

The fourth method for determining a size of a second RBG is the same as the fourth method for determining a size of a second RBG in the method A2.

The fifth method for determining a size of a second RBG includes determining the size of the second RBG based on a length of a resource allocation information and the second bandwidth resource. For example, a value of the size of the second RBG is greater than or equal to $$\left\lceil \frac{N_{RB\_2}}{\left\lceil \frac{\sqrt{4 \times 2^{L+1}+1}-1}{2} \right\rceil} \right\rceil,$$

where L is the length of the resource allocation information, and $N_{RB\_2}$ is a quantity of RBs in the second bandwidth resource. For example, the size of the second RBG is $$\left\lceil \frac{N_{RB\_2}}{\left\lceil \frac{\sqrt{4 \times 2^{L+1}+1}-1}{2} \right\rceil} \right\rceil.$$

For another example, possible R values are predefined for the RBG size, and the size of the second RBG is a minimum value, in the R values, that is greater than or equal $$\left\lceil \frac{N_{RB\_2}}{\left\lceil \frac{\sqrt{4 \times 2^{L+1}+1}-1}{2} \right\rceil} \right\rceil,$$

where R is an integer greater than or equal to 1. For example, the R values may be values of RBG sizes listed in Table 1 or Table 2.

The second type of resource allocation information may also be applied to the third DCI in the method corresponding to FIG. 3. To be specific, the gNB sends the third DCI to the UE on the second bandwidth resource, for data transmission between the gNB and the UE on the second bandwidth. The third DCI may be the same as the second DCI, or the third DCI may be determined based on a bandwidth of the second bandwidth resource. For example, the third DCI includes a Z2_1-bit RIV. Z2_1 is an integer greater than or equal to 1. Information indicated by the RIV includes an index of a start third RBG allocated by the gNB to the UE in the second bandwidth resource and a quantity of third RBGs consecutively allocated by the gNB to the UE in the second bandwidth resource. A value of Z2_1 is $\lceil \log_2(N_{RBG\_3} \times (N_{RBG\_3}+1)/2) \rceil$, and $N_{RBG\_3}$ is a quantity of third RBGs in the second bandwidth resource. In an example, $N_{RBG\_3}=\lceil N_{RB\_2}/S_{RBG\_3} \rceil$, $N_{RB\_2}$ is a quantity of RBs in the second bandwidth resource, $S_{RBG\_3}$ is a quantity of RBs in the third RBG, and the RB in the third RBG is an RB in the second bandwidth resource. A size of the third RBG may be predefined, a size of the third RBG may be indicated by using signaling sent by the gNB to the UE, or a size of the third RBG may be determined based on the bandwidth of the second bandwidth resource.

Third Type of Resource Allocation Information

This type of resource allocation information includes L3_1-bit RBG subset indication information, an L3_2-bit bitmap, and L3_3 padding bits, where L3_1 and L3_2 are integers greater than or equal to 1, and L3_3 is an integer greater than or equal to 0.

For a bandwidth resource, the RBG subset indication information in the third type of resource allocation information is used to indicate an RBG subset to which a resource allocated by the gNB to the UE in the bandwidth resource belongs. The RBG subset includes an integer quantity of RBGs. In a possible design, the bandwidth resource includes P RBG subsets, and a $p^{th}$ RBG subset of the P RBG subsets includes every $P^{th}$ RBGs starting from a $p^{th}$ RBG, where p is greater than or equal to 0 and is less than P, and P is an integer greater than or equal to 1. To be specific, in the bandwidth resource, in the $p^{th}$ RBG subset, a start RBG is the $p^{th}$ RBG in the bandwidth resource, and a step between two adjacent RBGs is P RBs. In an example, P is equal to an RBG size, and a length L3_1 of the RBG subset indication information is $\lceil \log_2(P) \rceil$. A size of the RBG may be predefined, a size of the RBG may be indicated by using signaling sent by the gNB to the UE, or a size of the RBG may be determined based on a bandwidth of the bandwidth resource. For example, a bandwidth resource includes 25 RBs, a mapping relationship between a bandwidth and an RBG size is described in Table 2 in the method A, an RBG size of the bandwidth resource is 2, and there are two RBG subsets. The bandwidth resource includes two RBG subsets. Indexes of RBGs included in a first RBG subset are {0, 2, 4, 6, 8, 10}, indexes of RBs included in the first RBG subset are {0, 1, 4, 5, 8, 9, 12, 13, 16, 17, 20, 21}, indexes of RBGs included in a second RBG subset are {1, 3, 5, 7, 9, 11}, and indexes of RBs included in the second RBG subset are {2, 3, 6, 7, 10, 11, 14, 15, 18, 19, 22, 23}.

A length of a bitmap in the third type of resource allocation information is L3_2, one bit in the L3_2-bit bitmap is corresponding to one RBG in the bandwidth resource, and the bit may also be referred to as one information bit. For one bit in the L3_2-bit bitmap, when a value of the bit is t1, a resource allocated by the gNB to the UE includes an RBG corresponding to the bit; or when a value of the bit is t2 or is not t1, a resource allocated by the gNB to the UE does not include an RBG corresponding to the bit. t1 and t2 may be integers. For example, t1 is 1.

Optionally, the third type of resource allocation information may further include 1-bit offset information. In this case, RBs corresponding to the L3_2-bit bitmap in the third type of resource allocation information are L3_2 consecutive RBs, in the allocated RBG subset, starting from an RB whose index is an offset $\Delta_{shift}(p)$, where $\Delta_{shift}(p)$ is an integer greater than or equal to 0. A L3_2 bits are in a one-to-one correspondence with L3_2 RBs. For example, if a value of the offset information is t3, $\Delta_{shift}(P)=0$; or if a value of the offset information is t4 or is not t3, $\Delta_{shift}(p)=K$, where t3, t4, and K are integers.

According to the possible method A in the downlink control information transmission method corresponding to FIG. 3, the gNB sends DCI to the UE on the first bandwidth resource. If resource allocation information included in the DCI is the third type of resource allocation information, a length of the resource allocation information may be determined according to either the following method C1 or the following method C2.

Method C1: In the method C1, the method for determining a length of resource allocation information in DCI is the same as that in a corresponding description in the method A1. Details are not described herein again.

When the method C1 is applied to the possible method A in the downlink control information transmission method corresponding to FIG. 3, if DCI is used for data transmission between the gNB and the UE on the first bandwidth resource, the DCI includes resource allocation information, where the resource allocation information includes X3_1-bit RBG subset indication information, an X3_2-bit bitmap, 1-bit offset information, and X3_3 padding bits. One bit in the X3_2-bit bitmap is corresponding to one first RBG in the first bandwidth resource. A method for determining a size of a first RBG is similar to that in the description in the method A1. Details are not described herein again. L3, namely, a sum of X3_1, X3_2, and 1, is a quantity of first RBGs in the first bandwidth resource. X3_3 is a value obtained by subtracting L3 from the length of the resource allocation information.

When the method C1 is applied to the possible method A in the downlink control information transmission method corresponding to FIG. 3, if DCI is used for data transmission between the gNB and the UE on the second bandwidth resource, the DCI includes resource allocation information, where the resource allocation information includes Y3_1-bit RBG subset indication information, a Y3_2-bit bitmap, 1-bit offset information, and Y3_3 padding bits. One bit in the Y3_2-bit bitmap is corresponding to one second RBG in the second bandwidth resource. A method for determining a size of a second RBG is similar to that in the description in the method A1. Details are not described herein again. L3, namely, a sum of Y3_1, Y3_2, and 1, is a quantity of second RBGs in the second bandwidth resource. For example, the quantity of second RBGs in the second bandwidth resource is $\lceil N_{RB\_2}/S_{RBG\_2} \rceil$, where $N_{RB\_2}$ is a quantity of RBs in the second bandwidth resource, $S_{RBG\_2}$ is a quantity of RBs in the second RBG, and the RB in the second RBG is an RB in the second bandwidth resource. Y3_3 is a value obtained by subtracting L3 from the length of the resource allocation information.

Method C2: In the method C2, the method for determining a length of resource allocation information in DCI is the same as that in a corresponding description in the method A2. Details are not described herein again.

When the method C2 is applied to the possible method A in the control information transmission method corresponding to FIG. 3, if DCI is used for data transmission between the gNB and the UE on the first bandwidth resource, the DCI includes resource allocation information, where the resource allocation information includes X3_1-bit RBG subset indication information, an X3_2-bit bitmap, and 1-bit offset information. One bit in the X3_2-bit bitmap is corresponding to one first RBG in the first bandwidth resource. A method for determining a size of a first RBG is similar to that in the description in the method A1. Details are not described herein again. L3, namely, a sum of X3_1, X3_2, and 1, is a quantity of first RBGs in the first bandwidth resource.

When the method C2 is applied to the possible method A in the downlink control information transmission method corresponding to FIG. 3, if DCI is used for data transmission between the gNB and the UE on the second bandwidth resource, the DCI includes resource allocation information, where the resource allocation information includes Y3_1-bit RBG subset indication information, a Y3_2-bit bitmap, 1-bit offset information, and Y3_3 padding bits. One bit in the Y3_2-bit bitmap is corresponding to one second RBG in the second bandwidth resource. A method for determining a size of a second RBG is similar to that in the description in the method A1. Details are not described herein again. Y3_3 is a value obtained by subtracting L3 from the length of the resource allocation information, and L3 is a sum of Y3_1, Y3_2, and 1. A method for determining a size of a second RBG may be the same as that in the description in the method B2. Details are not described herein again.

The third type of resource allocation information may also be applied to the third DCI in the method corresponding to FIG. 3. To be specific, the gNB sends the third DCI to the UE on the second bandwidth resource, for data transmission between the gNB and the UE on the second bandwidth resource. The third DCI may be the same as the second DCI, or the third DCI may be determined based on a bandwidth of the second bandwidth resource. For example, the third DCI includes L3_1-bit RBG subset indication information, an L3_2-bit bitmap, and 1-bit offset information. One bit in the L3_2-bit bitmap is corresponding to one third RBG in the second bandwidth resource. L3, namely, a sum of L3_1, L3_2, and 1, is a quantity of third RBGs in the second bandwidth resource. For example, the quantity of third RBGs in the second bandwidth resource is $\lceil N_{RB\_2}/S_{RBG\_3} \rceil$, where $N_{RB\_2}$ is a quantity of RBs in the second bandwidth resource, $S_{RBG\_3}$ is a quantity of RBs in the third RBG, and the RB in the third RBG is an RB in the second bandwidth resource. A size of the third RBG may be predefined, a size of the third RBG may be indicated by using signaling sent by the gNB to the UE, or a size of the third RBG may be determined based on the bandwidth of the second bandwidth resource.

Fourth Type of Resource Allocation Information

The fourth type of resource allocation information includes L4_1 information bits and L4_2 padding bits. L4_1 is an integer greater than or equal to 1, and L4_2 is an integer greater than or equal to 0. The L4_1 information bits indicate S combined indexes, where S is an integer greater than or equal to 1. A combined index indicates R groups of resource configuration information, where R is an integer greater than or equal to 1. In the S combined indexes, different combined indexes may indicate a same quantity R of groups of resource configuration information or different quantities R of groups of resource configuration information. This is not limited in this application. For a bandwidth resource, any group of the R groups of resource configuration information indicated by the combined index includes an index of a start RBG and an index of an end RBG. If the index of the start RBG is the same as the index of the end RBG, the group of resource configuration information indicates one RBG, and an index corresponding to the RBG is the index of the start RBG or the index of the end RBG. RBGs indicated by the S combined indexes are RBGs allocated by the gNB to the UE. During resource allocation by using the fourth type of frequency resource allocation information, joint coding is performed on indexes of an allocated start RBG and end RBG, so that resource allocation can be performed for the UE by using less information, thereby reducing signaling overheads.

According to the possible method A in the control information transmission method in FIG. 3, if resource allocation information included in DCI is the fourth type of resource allocation information, S is equal to 1 and R is equal to 2 in the fourth type of resource allocation information, and a length of the resource allocation information may be determined according to either the following method D1 or the following method D2.

The method D1 includes determining the length of the resource allocation information based on M bandwidth resources. The M bandwidth resources are similar to those in a corresponding description in the method A1. Details are not described herein again.

According to the method D1, in an example, the length of the resource allocation information is $$\max\left\{\left\lceil\log_2\left(\binom{N_{RBG}(i)+1}{4}\right)\right\rceil\right\},$$

where $N_{RBG}(i)$ is a quantity of RBGs in an $i^{th}$ bandwidth resource of the M bandwidth resources. For example, a value of $N_{RBG}(i)$ is $\lceil N_{RB}(i)/S_{RBG}(i)\rceil$, where $N_{RB}(i)$ is a quantity of RBs in the $i^{th}$ bandwidth resource of the M bandwidth resources, $S_{RBG}(i)$ is a quantity of RBs in the RBG in the $i^{th}$ bandwidth resource, and the RB in the RBG in the $i^{th}$ bandwidth resource is an RB in the $i^{th}$ bandwidth resource. A method for determining $S_{RBG}(i)$ is similar to that in the description in the method A1. Details are not described herein again. An operation ( ) in $$\binom{N_{RBG}(i)+1}{4}$$

is a binomial operation.

When the method D1 is applied to the possible method A in the downlink control information transmission method corresponding to FIG. 3, the gNB sends DCI to the UE on the first bandwidth resource. If the DCI is used for data transmission between the gNB and the UE on the first bandwidth resource, resource allocation information in the DCI includes X4_1 information bits and X4_2 padding bits, where the X4_1 information bits indicate a first RBG allocated by the gNB to the UE in the first bandwidth resource. A value of X4_1 is $$\left\lceil\log_2\left(\binom{N_{RBG\_1}+1}{4}\right)\right\rceil,$$

where $N_{RBG\_1}$ is a quantity of first RBGs in the first bandwidth resource. For example, the quantity of first RBGs in the first bandwidth resource is $\lceil N_{RB\_1}/S_{RBG\_1}\rceil$, where $N_{RB\_1}$ is a quantity of RBs in the first bandwidth resource, $S_{RBG\_1}$ is a quantity of RBs in the first RBG, and the RB in the first RBG is an RB in the first bandwidth resource. A method for determining a size of a first RBG is similar to that in the description in the method A1. Details are not described herein again. X4_2 is a value obtained by subtracting X4_1 from the length of the resource allocation information.

When the method D1 is applied to the possible method A in the downlink control information transmission method corresponding to FIG. 3, the gNB sends DCI to the UE on the first bandwidth resource. If the DCI is used for data transmission between the gNB and the UE on the second bandwidth resource, resource allocation information in the DCI includes Y4_1 information bits and Y4_2 padding bits, where the Y4_1 information bits indicate a second RBG allocated by the gNB to the UE in the second bandwidth resource. A value of Y4_1 is $$\left\lceil\log_2\left(\binom{N_{RBG\_2}+1}{4}\right)\right\rceil,$$

and $N_{RB\_2}$ is a quantity of second RBGs in the second bandwidth resource. In an example, $N_{RBG\_2}=\lceil N_{RB\_2}/S_{RBG\_2}\rceil$, $N_{RB\_2}$ is a quantity of RBs in the second bandwidth resource, $S_{RBG\_2}$ is a quantity of RBs in the second RBG, and an RB in the second RBG is an RB in the second bandwidth resource. A method for determining a size of a second RBG is similar to that in the description in the method A1. Details are not described herein again. Y4_2 is a value obtained by subtracting Y4_1 from the length of the resource allocation information.

The method D2 includes determining the length of the resource allocation information based on the first bandwidth resource.

According to the method D2, in an example, the length of the resource allocation information is $$\left\lceil\log_2\left(\binom{\lceil N_{RB\_1}/S_{RBG\_1}\rceil+1}{4}\right)\right\rceil,$$

where $N_{RB\_1}$ is a quantity of RBs in the first bandwidth resource, $S_{RBG\_1}$ is a quantity of RBs in the first RBG, and the RB in the first RBG is an RB in the first bandwidth resource. A method for determining a size of a first RBG is similar to that in the description in the method A2. Details are not described herein again.

When the method D2 is applied to the possible method A in the downlink control information transmission method corresponding to FIG. 3, if DCI is used for data transmission between the gNB and the UE on the first bandwidth resource, resource allocation information in the DCI includes X4_1 information bits, where the X4_1 information bits indicate a first RBG allocated by the gNB to the UE in the first bandwidth resource. A value of X4_1 is $$\left\lceil \log_2\left(\binom{\lceil N_{RB\_1}/S_{RBG\_1}\rceil+1}{4}\right)\right\rceil.$$

When the method D2 is applied to the possible method A in the downlink control information transmission method corresponding to FIG. 3, if DCI is used for data transmission between the gNB and the UE on the second bandwidth resource, resource allocation information in the DCI includes Y4_1 information bits and Y4_2 padding bits, where Y4_2 is a value obtained by subtracting Y4_1 from the length of the resource allocation information, and the Y4_1 information bits indicate a second RBG allocated by the gNB to the UE in the second bandwidth resource. A size of the second RBG may be determined according to any one of the following first method for determining a size of a second RBG to the following fifth method for determining a size of a second RBG.

The first method for determining a size of a second RBG is the same as the first method for determining a size of a second RBG in the method A2.

The second method for determining a size of a second RBG is the same as the second method for determining a size of a second RBG in the method A2.

The third method for determining a size of a second RBG is the same as the third method for determining a size of a second RBG in the method A2.

The fourth method for determining a size of a second RBG is the same as the fourth method for determining a size of a second RBG in the method A2.

The fifth method for determining a size of a second RBG includes determining the size of the second RBG based on a length of a resource allocation information and the second bandwidth resource. For example, the size $S_{RBG\_2}$ of the second RBG satisfies $$\left\lceil \log_2\left(\binom{\lceil N_{RB\_2}/S_{RBG\_2}\rceil+1}{4}\right)\right\rceil \le L,$$

where L is the length of the resource allocation information, and $N_{RB\_2}$ is a quantity of RBs in the second bandwidth resource. For example, the size of the second RBG satisfies $$\left\lceil \log_2\left(\binom{\lceil N_{RB\_2}/S_{RBG\_2}\rceil+1}{4}\right)\right\rceil \le L,$$

For another example, possible R values are predefined for the RBG size, and the size of the second RBG is a minimum value, in the R values, that satisfies $$\left\lceil \log_2\left(\binom{\lceil N_{RB\_2}/S_{RBG\_2}\rceil+1}{4}\right)\right\rceil \le L,$$

where R is an integer greater than or equal to 1. For example, the R values may be values of RBG sizes listed in Table 1 or Table 2.

The fourth type of resource allocation information may also be applied to the third DCI in the method corresponding to FIG. 3. To be specific, the gNB sends the third DCI to the UE on the second bandwidth resource, for data transmission between the gNB and the UE on the second bandwidth resource. The third DCI may be the same as the second DCI, or the third DCI may be determined based on the second bandwidth resource. For example, resource allocation information in the third DCI is the fourth type of resource allocation information.

Figure 5:
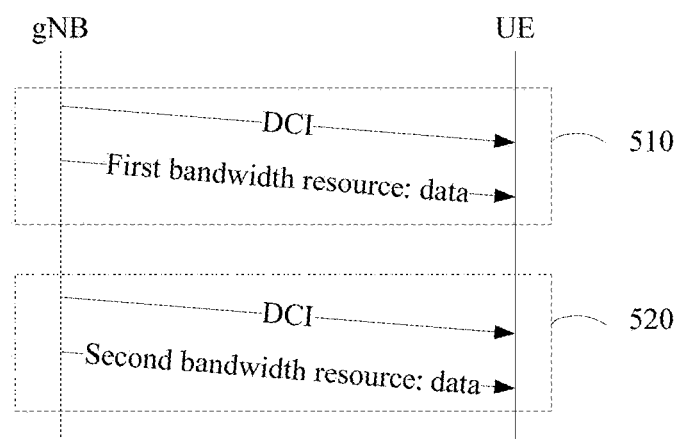
FIG. 5 shows a schematic procedure for DCI transmission according to an embodiment of this application.
Figure 6:
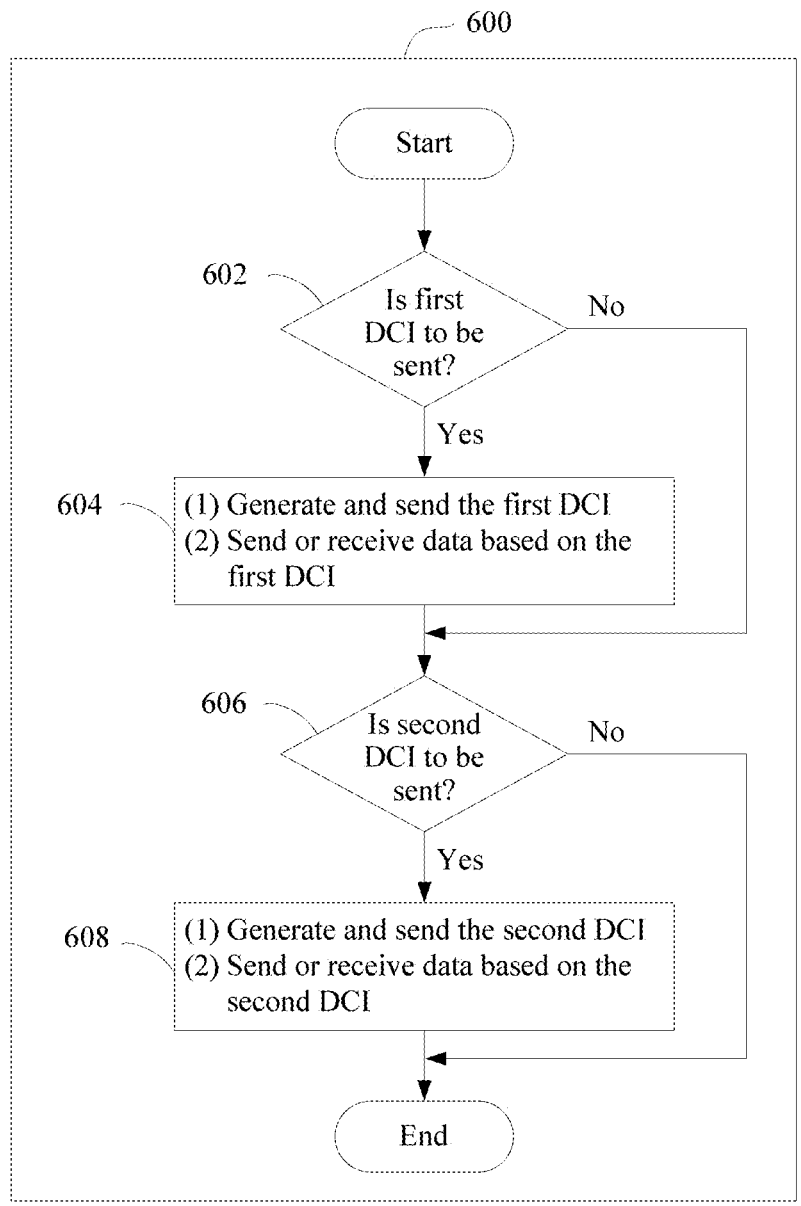
FIG. 6 shows a schematic procedure for network-device-side processing during DCI transmission according to an embodiment of this application.
Figure 7:
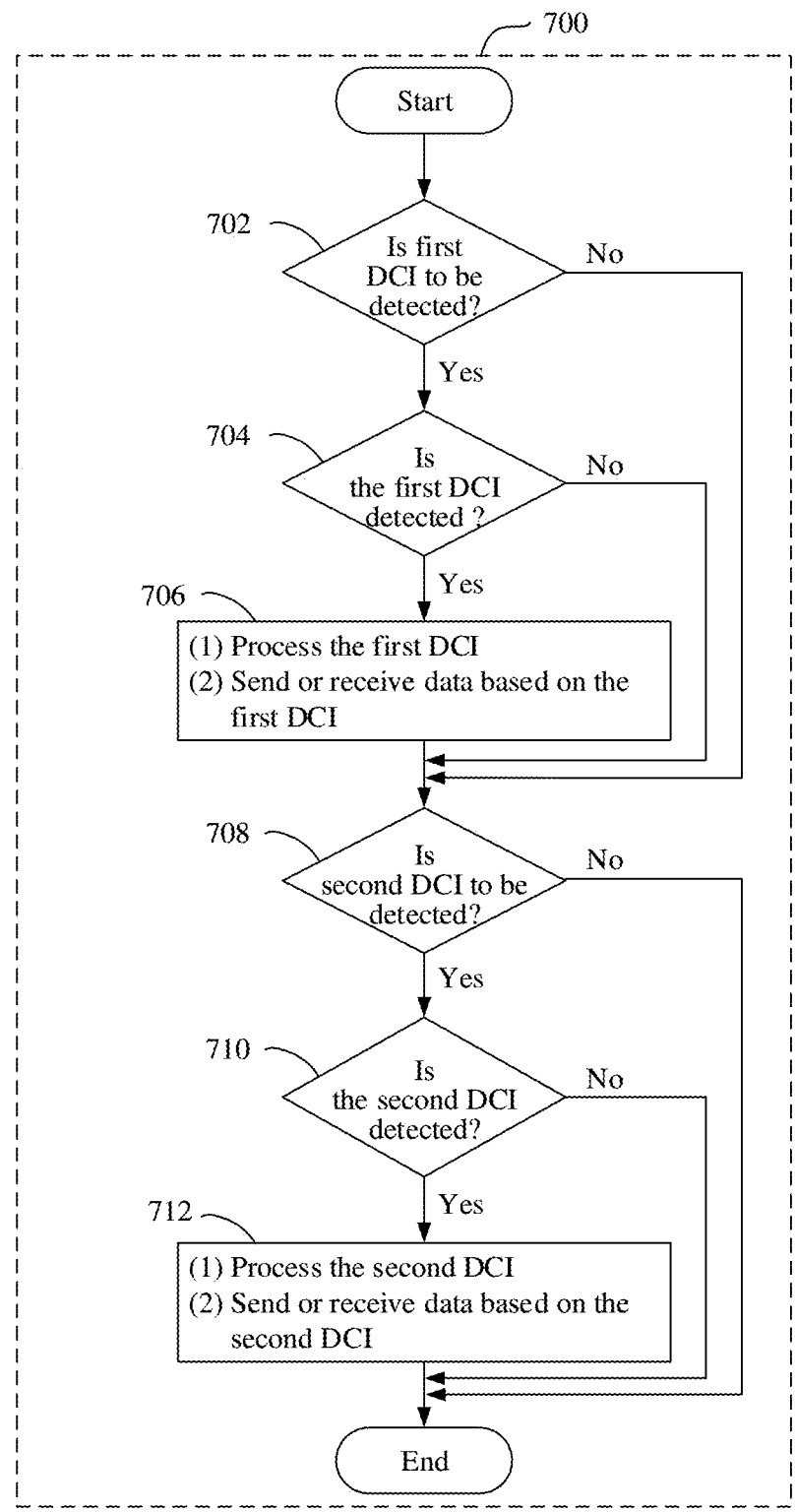
FIG. 7 shows a schematic procedure for terminal-device-side processing during DCI transmission according to an embodiment of this application.

According to the downlink control information transmission method corresponding to FIG. 3, FIG. 5 shows a schematic procedure for DCI transmission between a gNB and UE. With reference to FIG. 6 and FIG. 7, the following describes the procedure shown in FIG. 5. FIG. 6 shows a schematic procedure for gNB-side processing 600 during DCI transmission, and FIG. 7 shows a schematic procedure for UE-side processing 700 during DCI transmission.

As shown in a block diagram 510, the gNB may send DCI to the UE in a first bandwidth resource, where the DCI is used for data transmission between the gNB and the UE on the first bandwidth resource, and the DCI is referred to as first DCI. For example, the first DCI may be used by the gNB to send UE-specific data to the UE on the first bandwidth resource, and/or used by the gNB to receive, on the first bandwidth resource, UE-specific data sent by the UE.

For sending of the first DCI, on the gNB side, as shown in a block diagram 602, if the gNB sends the first DCI to the UE, the gNB performs a step shown in a block diagram 604, that is, the gNB generates the first DCI, and sends the first DCI to the UE on the first bandwidth resource. In a design, a scenario in which the gNB sends the first DCI to the UE is as follows: The gNB performs a scheduling algorithm; and if obtaining scheduling information that is used for scheduling performed for the UE and that is corresponding to the first bandwidth resource, the gNB generates the first DCI based on the scheduling information, and sends the first DCI to the UE on the first bandwidth resource. If the first DCI includes downlink scheduling information, the gNB generates UE-specific information, and sends the generated UE-specific information to the UE based on the downlink scheduling information. The gNB sends the first DCI in a time unit n1, and sends the UE-specific information to the UE in a time unit (n1+k1), where n1 and k1 are integers greater than or equal to 0. The gNB and the UE may determine a value of k1 through predefinition; or the gNB may send signaling to the UE to indicate a value of k1, and the UE receives the signaling and determines the value of k1 based on the signaling. If the first DCI includes uplink scheduling information, the gNB receives, based on the scheduling information, UE-specific information sent by the UE. The gNB sends the first DCI in a time unit n2, and receives, in a time unit (n2+k2), the UE-specific information sent by the UE, where n2 and k2 are integers greater than or equal to 0. The gNB and the UE may determine a value of k2 through predefinition; or the gNB may send signaling to the UE to indicate a value of k2, and the UE receives the signaling and determines the value of k2 based on the signaling.

For sending of the first DCI, on the UE side, as shown in a block diagram 702, if the UE detects the first DCI, the UE performs a step shown in a block diagram 704, that is, detects the first DCI. In a possible design, a scenario in which the UE detects the first DCI is determining, through predefinition or by using received signaling sent by the base station, a time unit in which the first DCI may be sent. For example, a sending period of the first DCI is predefined as T1 slots, and in this case, the UE detects the first DCI in every T1 slots, where T1 is an integer greater than or equal to 1; or a sending period of the first DCI is predefined as T2 milliseconds, and in this case, the UE detects the first DCI in time units corresponding to every T2 milliseconds, where T2 is an integer greater than or equal to 1. It should be noted that if detection of the first DCI needs to be performed in each time unit, step 702 may be omitted. When performing the step shown in the block diagram 704, if the first DCI is detected, the UE performs a step shown in a block diagram 706, that is, processes the first DCI; and if the first DCI includes downlink scheduling information, the UE receives, based on the downlink scheduling information, UE-specific information sent by the gNB. The UE receives the first DCI in a time unit n1, and receives, in a time unit (n1+k1), the UE-specific information sent by the gNB. n1 and k1 are the same as those in corresponding descriptions of the gNB side in the previous paragraph. Details are not described herein again. If the first DCI includes uplink scheduling information, the UE generates UE-specific information, and sends the UE-specific information to the base station based on the scheduling information. The UE receives the first DCI in a time unit n2, and sends the UE-specific information to the gNB in a time unit (n2+k2). n2 and k2 are the same as those in corresponding descriptions of the gNB side in the previous paragraph. Details are not described herein again.

As shown in a block diagram 520, the gNB may send DCI to the UE on a first bandwidth resource, where the DCI is used for data transmission between the gNB and the UE on a second bandwidth resource, and the DCI is referred to as second DCI. For example, the second DCI may be used by the gNB to send UE-specific data to the UE on the second bandwidth resource, and/or used by the gNB to receive, on the second bandwidth resource, UE-specific data sent by the UE.

For sending of the second DCI, on the gNB side, as shown in a block diagram 606, if the gNB sends the second DCI to the UE, the gNB performs a step shown in a block diagram 608, that is, the gNB generates the second DCI, and sends the second DCI to the UE on the first bandwidth resource. In an example, a scenario in which the gNB sends the second DCI to the UE is as follows: The gNB performs a scheduling algorithm; and if obtaining scheduling information that is used for scheduling performed for the UE and that is corresponding to the second bandwidth resource, the gNB generates the second DCI based on the scheduling information, and sends the second DCI to the UE on the first bandwidth resource. If the second DCI includes downlink scheduling information, the gNB generates UE-specific information, and sends the generated UE-specific information to the UE based on the downlink scheduling information. The gNB sends the second DCI in a time unit n3, and sends the UE-specific information to the UE in a time unit (n3+k3), where n3 and k3 are integers greater than or equal to 0. The gNB and the UE may determine a value of k3 through predefinition; or the gNB may send signaling to the UE to indicate a value of k3, and the UE receives the signaling and determines the value of k3 based on the signaling. If the second DCI includes uplink scheduling information, the gNB receives, based on the scheduling information, UE-specific information sent by the UE. The gNB sends the second DCI in a time unit n4, and receives, in a time unit (n4+k4), the UE-specific information sent by the UE, where n4 and k4 are integers greater than or equal to 0. The gNB and the UE may determine a value of k4 through predefinition; or the gNB may send signaling to the UE to indicate a value of k4, and the UE receives the signaling and determines the value of k4 based on the signaling.

For sending of the second DCI, on the UE side, as shown in a block diagram 708, if the UE detects the second DCI, the UE performs a step shown in a block diagram 710, that is, detects the second DCI. In an example, a scenario in which the UE detects the second DCI is determining, through predefinition or by using received signaling sent by the base station, a time unit in which the second DCI may be sent. For example, a sending period of the second DCI is predefined as T3 slots, and in this case, the UE detects the second DCI in every T3 slots, where T3 is an integer greater than or equal to 1; or a sending period of the second DCI is predefined as T4 milliseconds, and in this case, the UE detects the second DCI in time units corresponding to every T4 milliseconds, where T4 is an integer greater than or equal to 1. It should be noted that if detection of the second DCI needs to be performed in each time unit, step 708 may be omitted. When performing a step shown in a block diagram 710, if the second DCI is detected, the UE performs a step shown in a block diagram 712, that is, processes the second DCI; and if the second DCI includes downlink scheduling information, the UE receives, based on the downlink scheduling information, UE-specific information sent by the gNB. The UE receives the second DCI in a time unit n3, and receives, in a time unit (n3+k3), the UE-specific information sent by the gNB. n3 and k3 are the same as those in corresponding descriptions of the gNB side in the previous paragraph. Details are not described herein again. If the second DCI includes uplink scheduling information, the UE generates UE-specific information, and sends the UE-specific information to the base station based on the scheduling information. The UE receives the second DCI in a time unit n4, and sends the UE-specific information to the gNB in a time unit (n4+k4). n4 and k4 are the same as those in corresponding descriptions of the gNB side in the previous paragraph. Details are not described herein again.

In FIG. 5, FIG. 6, and FIG. 7, that a step related to the first DCI is prior to a step related to the second DCI is merely an example. In actual application, a step related to the second DCI may be prior to a step related to the first DCI, or a step related to the second DCI and a step related to the first DCI may be performed at the same time. This is not limited in this application. Further, in a unit of time or a period of time, only a step related to the first DCI may be performed, only a step related to the second DCI may be performed, or a step related to the first DCI and a step related to the second DCI may be performed. This is not limited in this application.

In the embodiments provided in this application, the method related to FIG. 3 in the embodiments of this application is separately described from perspectives of the gNB, the UE, and interaction between the gNB and the UE. In the embodiments of this application, the method related to FIG. 3 includes methods corresponding to FIG. 3, FIG. 5, FIG. 6, and FIG. 7. To implement the functions in the method related to FIG. 3, the gNB and the UE each may include a hardware structure and/or a software module, to implement the foregoing functions by using the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

Figure 8:
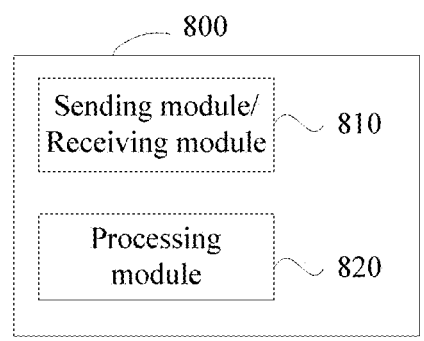
FIG. 8 is a schematic structural diagram of an apparatus according to an embodiment of this application.

FIG. 8 is a schematic structural diagram of an apparatus 800 according to an embodiment of this application. The apparatus 800 may be a gNB or an apparatus applied to a gNB. When the apparatus is applied to a gNB, the apparatus is capable of supporting the gNB in implementing the function of the gNB in the method related to FIG. 3. The apparatus 800 may be a hardware structure, a software module, or a combination of a hardware structure and a software module. An apparatus 800 may be implemented by a chip system. In the embodiments of this application, the chip system may include a chip, or may include a chip and another discrete device.

As shown in FIG. 8, the apparatus 800 includes a sending module/receiving module 810 and a processing module 820. In the embodiments of this application, the sending module/receiving module may also be referred to as a transceiver module.

When the apparatus 800 is configured to implement or support the gNB in implementing the method related to FIG. 3, the sending module/receiving module 810 is configured to send information to UE or receive information sent by UE. For example, the sending module/receiving module 810 is configured to send downlink control information (DCI) to the UE on a first bandwidth resource, where the DCI is used for data transmission between the gNB and the UE on the first bandwidth resource or data transmission between the gNB and the UE on a second bandwidth resource; and if the DCI is used for data transmission between the gNB and the UE on the first bandwidth resource, a size of the DCI is L1_1, or if the DCI is used for data transmission between the gNB and the UE on the second bandwidth resource, a size of the DCI is L1_2, where L1_1 is equal to L1_2, and L1_1 and L1_2 are integers greater than or equal to 1. Content of the DCI is the same as that in the description in the method related to FIG. 3. Details are not described herein again. The sending module/receiving module 810 is further configured to send data information to the UE and receive data information sent by the UE.

When the apparatus 800 is configured to implement or support the gNB in implementing the method related to FIG. 3, the processing module 820 generates the information to be sent to the UE and processes the received information sent by the UE. For example, the processing module 820 is configured to generate the DCI to be sent to the UE. The processing module 820 may be further configured to generate the data information to be sent to the UE and process the received data information sent by the UE.

Figure 9:
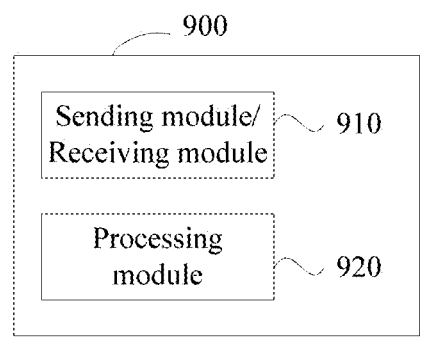
FIG. 9 is a schematic structural diagram of an apparatus according to an embodiment of this application.

FIG. 9 is a schematic structural diagram of an apparatus 900 according to an embodiment of this application. The apparatus 900 may be UE or an apparatus applied to UE. When the apparatus is applied to UE, the apparatus is capable of supporting the UE in implementing the function of the UE in the method related to FIG. 3. The apparatus 900 may be a hardware structure, a software module, or a combination of a hardware structure and a software module. The apparatus 900 may be implemented by a chip system. In the embodiments of this application, the chip system may include a chip, or may include a chip and another discrete device.

As shown in FIG. 9, the apparatus 900 includes a sending module/receiving module 910 and a processing module 920.

When the apparatus 900 is configured to implement or support the UE in implementing the method related to FIG. 3, the sending module/receiving module 910 is configured to receive information sent by a gNB or send information to a gNB. For example, the sending module/receiving module 910 is configured to receive downlink control information (DCI) on a first bandwidth resource, where the DCI is used for data transmission between the gNB and the UE on the first bandwidth resource or data transmission between the gNB and the UE on a second bandwidth resource; and if the DCI is used for data transmission between the gNB and the UE on the first bandwidth resource, a size of the DCI is L1_1, or if the DCI is used for data transmission between the gNB and the UE on the second bandwidth resource, a size of the DCI is L1_2, where L1_1 is equal to L1_2, and L1_1 and L1_2 are integers greater than or equal to 1. Content of the DCI is the same as that in the description in the method related to FIG. 3. Details are not described herein again. The sending module/receiving module 910 is further configured to send data information to the gNB and receive data information sent by the gNB.

When the apparatus 900 is configured to implement or support the UE in implementing the method related to FIG. 3, the processing module 920 is configured to generate the information to be sent to the gNB and process the received information sent by the gNB. For example, the processing module 920 is configured to process the received DCI sent by the gNB. The processing module 920 is further configured to generate the data information to be sent to the gNB and process the received data information sent by the gNB.

Figure 10:
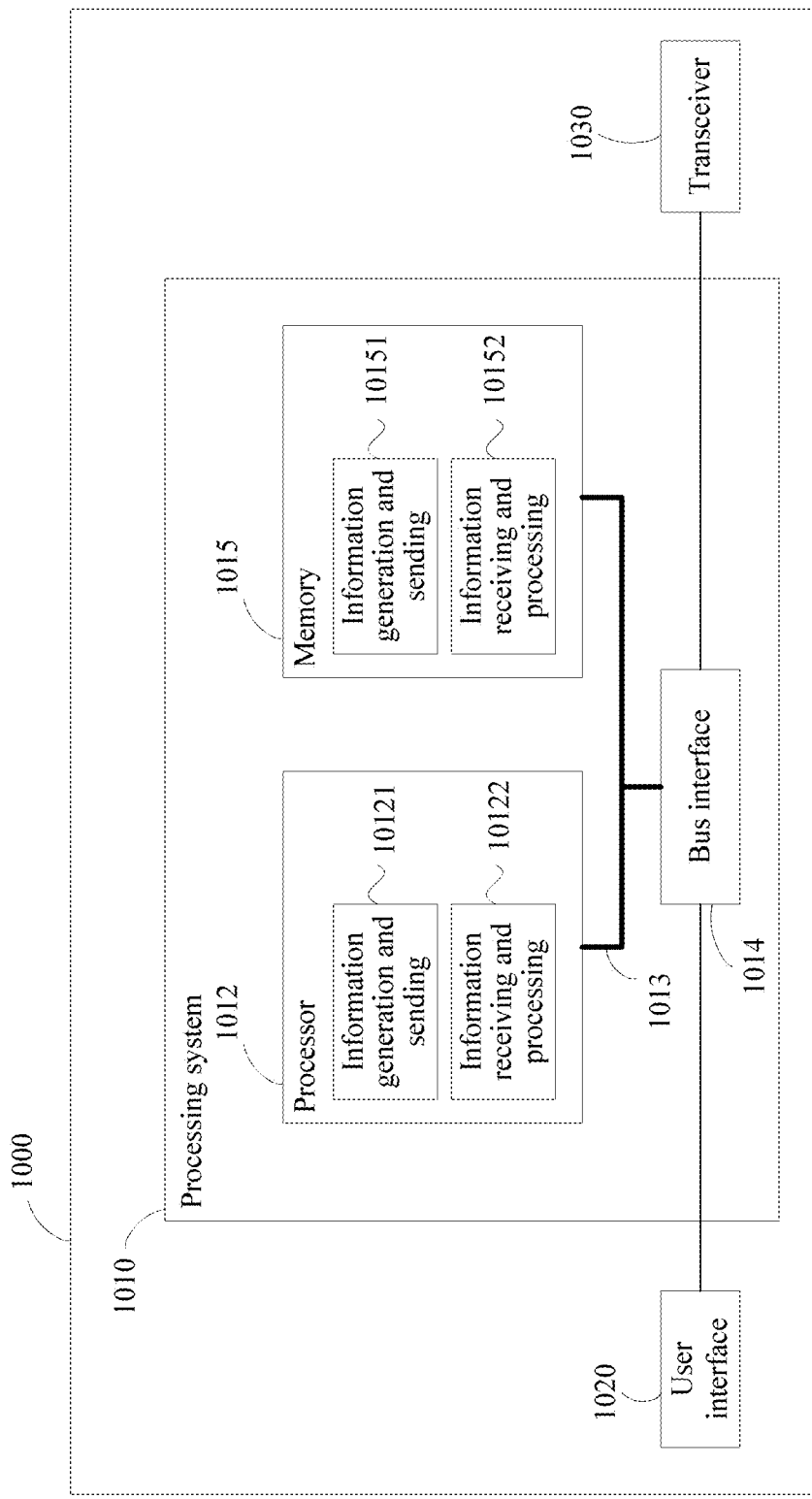
FIG. 10 is a schematic structural diagram of an apparatus according to an embodiment of this application.

FIG. 10 is a schematic structural diagram of an apparatus 1000 according to an embodiment of this application. The apparatus 1000 may be a gNB or an apparatus applied to a gNB. When the apparatus is applied to a gNB, the apparatus is capable of supporting the gNB in implementing the function of the gNB in the method related to FIG. 3.

As shown in FIG. 10, the apparatus 1000 includes a processing system 1010, configured to implement or support the gNB in implementing the function of the gNB in the method related to FIG. 3. The processing system 1010 may be a circuit, and the circuit may be implemented by a chip system. The processing system 1010 includes at least one processor 1012 that can be configured to implement or support the gNB in implementing the function of the gNB in the method related to FIG. 3. When the processing system 1010 includes another apparatus in addition to the processor, the processor 1012 may be further configured to manage the another apparatus included in the processing system 1010. For example, the another apparatus may be at least one of the following memory 1015, bus 1013, and bus interface 1014. In the embodiments of this application, the processor may be a central processing unit (CPU), a general purpose processor, a network processor (NP), a digital signal processor (DSP), a microprocessor, a microcontroller, a programmable logic device (PLD), or any combination thereof.

The processing system 1010 may further include the memory 1015, configured to store a program instruction and/or data. In the embodiments of this application, the memory includes a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories. If the processing system 1010 includes the memory 1015, the processor 1012 may be coupled to the memory 1015. Couplings in the embodiments of this application are indirect couplings or communications connections between apparatuses, units, or modules, may be electrical, mechanical, or in another form, and are used for information exchange between the apparatuses, the units, and the modules.

The processor 1012 may perform an operation with the memory 1015 cooperatively. The processor 1012 may execute the program instruction stored in the memory 1015. When executing the program instruction stored in the memory 1015, the processor 1012 can implement or support the gNB in implementing at least one of the functions of the gNB in the method related to FIG. 3. Specifically, the processor 1012 is configured to generate and send to-be-sent information, and receive information and process the received information. For example, the processor 1012 generates and sends downlink control information (DCI), where the DCI is used for data transmission between the gNB and the UE on a first bandwidth resource or data transmission between the gNB and the UE on a second bandwidth resource; and if the DCI is used for data transmission between the gNB and the UE on the first bandwidth resource, a size of the DCI is L1_1, or if the DCI is used for data transmission between the gNB and the UE on the second bandwidth resource, a size of the DCI is L1_2, where L1_1 is equal to L1_2, and L1_1 and L1_2 are integers greater than or equal to 1. Content of the DCI is the same as that in the description in the method related to FIG. 3. Details are not described herein again. The processor 1012 is further configured to generate and send data information, and receive and process data information. The processor 1012 may further read data stored in the memory 1015. The memory 1015 may further store data that is obtained when the processor 1012 executes the program instruction.

The processor 1012 may include an information generation and sending circuit 10121. When the apparatus 1000 is configured to implement or support the gNB in implementing the method related to FIG. 3, the information generation and sending circuit 10121 is configured to generate and send to-be-sent information. For example, the information generation and sending circuit 10121 is configured to generate and send the DCI, and may be further configured to generate and send the data information. The memory 1015 may further include an information generation and sending module 10151. When implementing the foregoing generation and sending functions, the information generation and sending circuit 10121 may further perform an operation with the information generation and sending module 10151 cooperatively.

Figure 11:
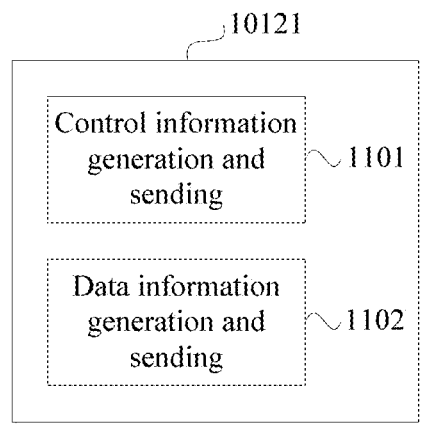
FIG. 11 is a schematic structural diagram of an apparatus according to an embodiment of this application.
Figure 12:
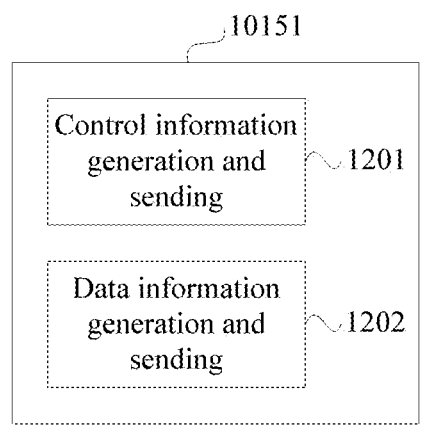
FIG. 12 is a schematic structural diagram of an apparatus according to an embodiment of this application.

FIG. 11 shows a possible structure of the information generation and sending circuit 10121. As shown in FIG. 11, the information generation and sending circuit 10121 may include a control information generation and sending circuit 1101, configured to generate and send control information. For example, the control information generation and sending circuit 1101 is configured to generate and send the DCI. As shown in FIG. 12, the information generation and sending module 10151 may further include a control information generation and sending module 1201. When implementing a function of the control information generation and sending circuit 1101, the control information generation and sending circuit 1101 may further perform an operation with the control information generation and sending module 1201 cooperatively. The information generation and sending circuit 10121 may include a data information generation and sending circuit 1102, configured to generate and send the data information. The information generation and sending module 10151 may further include a data information generation and sending module 1202. When implementing a function of the data information generation and sending circuit 1102, the data information generation and sending circuit 1102 may further perform an operation with the data information generation and sending module 1202 cooperatively.

The processor 1012 may further include an information receiving and processing circuit 10122. When the apparatus 1000 is configured to implement or support the gNB in implementing the method related to FIG. 3, the information receiving and processing circuit 10122 may be configured to receive information and process the received information. For example, the information receiving and processing circuit 10122 is configured to receive and process the data information. The memory 1015 may further include an information receiving and processing module 10152. When implementing the foregoing receiving and processing functions, the information receiving and processing circuit 10122 may further perform an operation with the information receiving and processing module 10152 cooperatively.

The processing system 1010 may further include the bus interface 1014, configured to provide an interface between the bus 1013 and another apparatus.

The apparatus 1000 may further include a transceiver 1030, configured to communicate with another communications device through a transmission medium, so that another apparatus in the apparatus 1000 may communicate with the another communications device. The another apparatus may be the processing system 1010. For example, the another apparatus in the apparatus 1000 may communicate with the another communications device by using the transceiver 1030, and receive and/or send corresponding information. It may also be described as: The another apparatus in the apparatus 1000 may receive corresponding information, where the corresponding information is received by the transceiver 1030 through the transmission medium, and the corresponding information may be exchanged between the transceiver 1030 and the another apparatus in the apparatus 1000 through the bus interface 1014 or through the bus interface 1014 and the bus 1013; and/or the another apparatus in the apparatus 1000 may send corresponding information, where the corresponding information is sent by the transceiver 1030 through the transmission medium, and the corresponding information may be exchanged between the transceiver 1030 and the another apparatus in the apparatus 1000 through the bus interface 1014 or through the bus interface 1014 and the bus 1013.

The apparatus 1000 may further include a user interface 1020. The user interface 1020 is an interface between a user and the apparatus 1000, and may be used for information exchange between the user and the apparatus 1000. For example, the user interface 1020 may be at least one of a keyboard, a mouse, a display, a speaker, a microphone, and a joystick.

The foregoing describes, from a perspective of the apparatus 1000, an apparatus structure provided in the embodiments of this application. In the apparatus, the processing system 1010 includes the processor 1012, and may further include at least one of the memory 1015, the bus 1013, and the bus interface 1014, to implement the function of the gNB in the method related to FIG. 3. The processing system 1010 also falls within the protection scope of this application.

Figure 13:
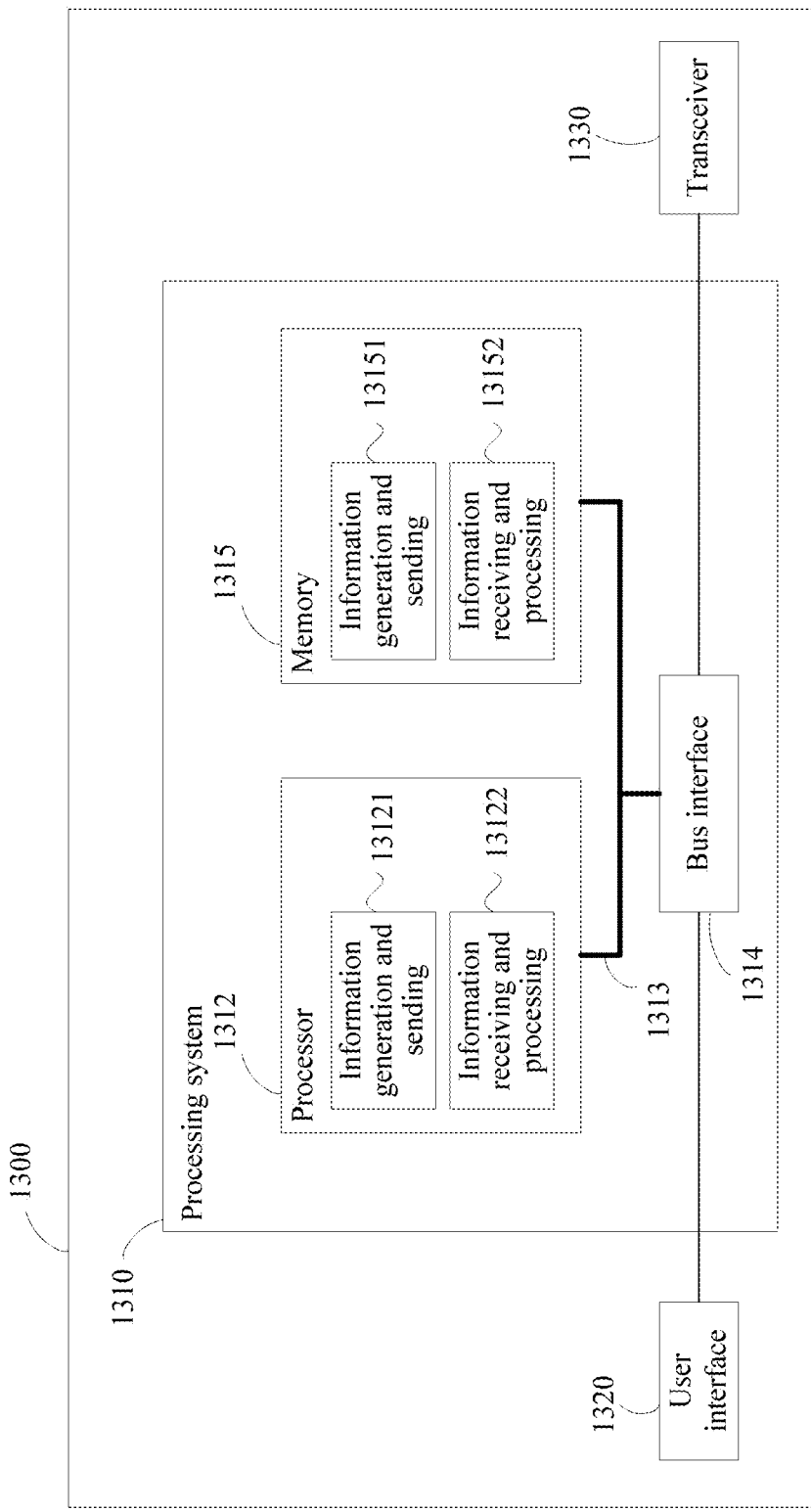
FIG. 13 is a schematic structural diagram of an apparatus according to an embodiment of this application.

FIG. 13 is a schematic structural diagram of an apparatus 1300 according to an embodiment of this application. The apparatus 1300 may be UE or an apparatus applied to UE. When the apparatus is applied to UE, the apparatus is capable of supporting the UE in implementing the function of the UE in the method related to FIG. 3.

As shown in FIG. 13, the apparatus 1300 includes a processing system 1310, configured to implement or support the UE in implementing the function of the UE in the method related to FIG. 3. The processing system 1310 may be a circuit, and the circuit may be implemented by a chip system. The processing system 1310 includes at least one processor 1312 that can be configured to implement or support the UE in implementing the function of the UE in the method related to FIG. 3. When the processing system 1310 includes another apparatus in addition to the processor, the processor 1312 may be further configured to manage the another apparatus included in the processing system 1310. For example, the another apparatus may be at least one of the following memory 1315, bus 1313, and bus interface 1314.

The processing system 1310 may further include the memory 1315, configured to store a program instruction and/or data. If the processing system 1310 includes the memory 1315, the processor 1312 may be coupled to the memory 1315. The processor 1312 may perform an operation with the memory 1315 cooperatively. The processor 1312 may execute the program instruction stored in the memory 1315. When executing the program instruction stored in the memory 1315, the processor 1312 can implement or support the UE in implementing at least one of the functions of the UE in the method related to FIG. 3. Specifically, the processor 1312 is configured to generate and send to-be-sent information, and receive information and process the received information. For example, the processor 1312 receives and processes downlink control information (DCI), where the DCI is used for data transmission between the gNB and the UE on a first bandwidth resource or data transmission between the gNB and the UE on a second bandwidth resource; and if the DCI is used for data transmission between the gNB and the UE on the first bandwidth resource, a size of the DCI is $L1\_1$, or if the DCI is used for data transmission between the gNB and the UE on the second bandwidth resource, a size of the DCI is $L1\_2$, where $L1\_1$ is equal to $L1\_2$, and $L1\_1$ and $L1\_2$ are integers greater than or equal to 1. Content of the DCI is the same as that in the description in the method related to FIG. 3. Details are not described herein again. The processor 1012 is further configured to generate and send data information, and receive and process data information. The processor 1312 may further read the data stored in the memory 1315. The memory 1315 may further store data that is obtained when the processor 1312 executes the program instruction.

The processor 1312 may include an information generation and sending circuit 13121. When the apparatus 1300 is configured to implement or support the UE in implementing the method related to FIG. 3, the information generation and sending circuit 13121 is configured to generate and send to-be-sent information. For example, the information generation and sending circuit 13121 is configured to generate and send the data information. The memory 1315 may further include an information generation and sending module 13151. When implementing the foregoing generation and sending functions, the information generation and sending circuit 13121 may further perform an operation with the information generation and sending module 13151 cooperatively.

The processor 1312 may further include an information receiving and processing circuit 13122. When the apparatus 1300 is configured to implement or support the UE in implementing the method related to FIG. 3, the information receiving and processing circuit 13122 is configured to receive information and process the received information. For example, the information receiving and processing circuit 13122 may be configured to receive and process the DCI, and may be further configured to receive and process the data information. The memory 1315 may further include an information receiving and processing module 13152. When implementing the foregoing receiving and processing functions, the information receiving and processing circuit 13122 may further perform an operation with the information receiving and processing module 13152 cooperatively.

Figure 14:
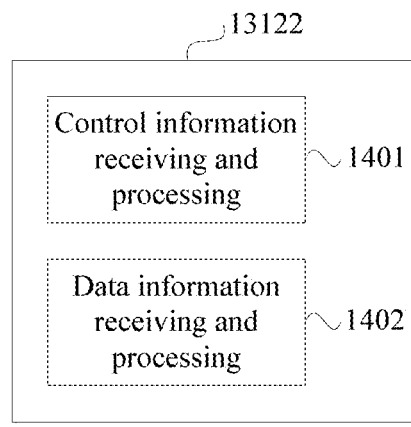
FIG. 14 is a schematic structural diagram of an apparatus according to an embodiment of this application.
Figure 15:
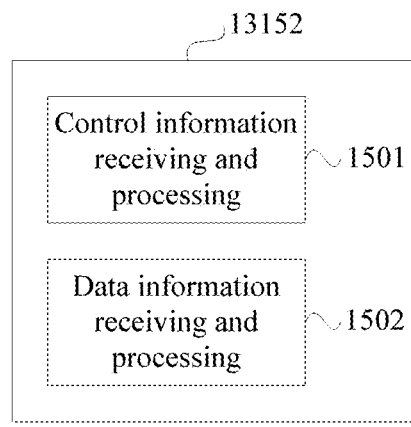
FIG. 15 is a schematic structural diagram of an apparatus according to an embodiment of this application.

FIG. 14 shows a possible structure of the information receiving and processing circuit 13122. As shown in FIG. 14, the information receiving and processing circuit 13122 may include a control information receiving and processing circuit 1401, configured to receive and process control information. For example, the control information receiving and processing circuit 1401 is configured to receive and process the DCI. As shown in FIG. 15, the information receiving and processing module 13152 may further include a control information receiving and processing module 1501. When implementing a function of the control information generation and sending circuit 1401, the control information generation and sending circuit 1401 may further perform an operation with the control information generation and sending module 1501 cooperatively. The information receiving and processing circuit 13122 may further include a data information receiving and processing circuit 1402, configured to receive and process the data information. The information receiving and processing module 13152 may further include a data information receiving and processing module 1502. When implementing a function of the data information receiving and processing circuit 1402, the data information receiving and processing circuit 1402 may further perform an operation with the data information receiving and processing module 1502 cooperatively.

The processing system 1310 may further include the bus interface 1314, configured to provide an interface between the bus 1313 and another apparatus.

The apparatus 1300 may further include a transceiver 1330, configured to communicate with another communications device through a transmission medium, so that another apparatus in the apparatus 1300 may communicate with the another communications device. The another apparatus may be the processing system 1310. For example, the another apparatus in the apparatus 1300 may communicate with the another communications device by using the transceiver 1330, and receive and/or send corresponding information. It may also be described as: The another apparatus in the apparatus 1300 may receive corresponding information, where the corresponding information is received by the transceiver 1330 through the transmission medium, and the corresponding information may be exchanged between the transceiver 1330 and the another apparatus in the apparatus 1300 through the bus interface 1314 or through the bus interface 1314 and the bus 1313; and/or the another apparatus in the apparatus 1300 may send corresponding information, where the corresponding information is sent by the transceiver 1330 through the transmission medium, and the corresponding information may be exchanged between the transceiver 1330 and the another apparatus in the apparatus 1300 through the bus interface 1314 or through the bus interface 1314 and the bus 1313.

The apparatus 1300 may further include a user interface 1320. The user interface 1320 is an interface between a user and the apparatus 1300, and may be used for information exchange between the user and the apparatus 1300. For example, the user interface 1320 may be at least one of a keyboard, a mouse, a display, a speaker, a microphone, and a joystick.

The foregoing describes, from a perspective of the apparatus 1300, an apparatus structure provided in the embodiments of this application. In the apparatus, the processing system 1310 includes the processor 1312, and may further include at least one of the memory 1315, the bus 1313, and the bus interface 1314, to implement the function of the UE in the method related to FIG. 3. The processing system 1310 also falls within the protection scope of this application.

To implement cross-bandwidth-resource scheduling, this application provides a downlink control information transmission design. If control information transmitted on a bandwidth resource included in a first bandwidth resource group includes a bandwidth resource identifier, a gNB sends the control information to UE on a first bandwidth resource, where a bandwidth resource indicated by the bandwidth resource identifier in the control information is the first bandwidth resource or a second bandwidth resource, the first bandwidth resource group includes the first bandwidth resource and the second bandwidth resource, the first bandwidth resource group is in J bandwidth resource groups, and J is an integer greater than or equal to 2; and the gNB and the UE perform data transmission on the bandwidth resource indicated by the bandwidth resource identifier in the control information. According to this design, cross-bandwidth-resource scheduling may be performed based on groups, and cross-bandwidth-resource scheduling is performed between bandwidth resources in a bandwidth resource group, so that the bandwidth resource identifier that is in the control information and that is used for implementing cross-bandwidth-resource scheduling is targeted for only the bandwidth resources in the bandwidth resource group. This can reduce information bits of the bandwidth resource identifier in the control information, thereby reducing signaling overheads during data transmission. In the foregoing design, when it is determined whether the control information transmitted on the bandwidth resource included in the first bandwidth resource group includes a bandwidth resource identifier, a possible method includes preconfiguring whether the control information transmitted on the bandwidth resource included in the first bandwidth resource group includes a bandwidth resource identifier. Another possible method includes: sending, by the gNB, indication information A to the UE, to indicate whether the control information transmitted on the bandwidth resource included in the first bandwidth resource group includes a bandwidth resource identifier. Cross-bandwidth-resource scheduling supports scheduling of a bandwidth resource on another bandwidth resource, and scheduling information may be used to implement activation and deactivation of a bandwidth resource, and implement resource scheduling when bandwidth resource switching is being performed. This reduces a delay compared with a solution in which bandwidth resource switching is performed before resource allocation.

Figure 16:
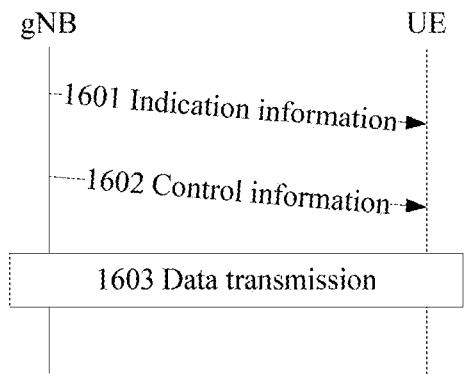
FIG. 16 is a schematic diagram of a DCI transmission method according to an embodiment of this application.

Corresponding to the downlink control information transmission design, an embodiment of this application provides a method shown in FIG. 16. The following details the method shown in FIG. 16.

Step 1601: A gNB sends indication information A to UE, where the indication information A is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2.

The UE receives the indication information A. For example, the gNB sends the indication information A to the UE by using RRC signaling; and the UE receives the RRC signaling to obtain the indication information A.

The indication information A is used to indicate whether the control information transmitted on the bandwidth resource included in the first bandwidth resource group includes a bandwidth resource identifier field, or is used to indicate that the control information transmitted on the bandwidth resource included in the first bandwidth resource group includes a bandwidth resource identifier field. The first bandwidth resource group includes at least two bandwidth resources, and the first bandwidth resource group is in the J bandwidth resource groups. Further, the first bandwidth resource group may be one or more of the J bandwidth resource groups. For example, the indication information A may be any one of the following first type of indication information to the following third type of indication information.

The first type of indication information is as follows: The indication information A includes a bandwidth resource group identifier, where a bandwidth resource group indicated by the bandwidth resource group identifier is the first bandwidth resource group. For example, if J is equal to 3, there are a total of three bandwidth resource groups: a bandwidth resource group 0, a bandwidth resource group 1, and a bandwidth resource group 2, and identifiers of the three bandwidth resource groups are 0, 1, and 2, respectively. If the indication information includes one bandwidth resource group identifier, and a value of the bandwidth resource group identifier is 0, control information transmitted on a bandwidth resource included in the bandwidth resource group 0 includes a bandwidth resource identifier field. If the indication information includes two bandwidth resource group identifiers, and values of the two bandwidth resource group identifiers are 0 and 1, control information transmitted on a bandwidth resource included in the bandwidth resource group 0 and control information transmitted on a bandwidth resource included in the bandwidth resource group 1 each include a bandwidth resource identifier field. The first type of indication information indicates a bandwidth resource group identifier to indicate that intra-group cross-bandwidth-resource scheduling can be performed.

The second type of indication information is as follows: The indication information A includes J-bit information bits, to indicate whether the control information transmitted on the bandwidth resource included in the first bandwidth resource group includes a bandwidth resource identifier field. 1-bit information of the J-bit information bits is corresponding to one of the J bandwidth resource groups. If a value of the 1-bit information is t1, the first bandwidth resource group includes the bandwidth resource group corresponding to the 1-bit information, that is, control information transmitted on a bandwidth resource included in the bandwidth resource group corresponding to the 1-bit information includes the bandwidth resource identifier field; or if a value of the 1-bit information is t2 or is not t1, the first bandwidth resource group does not include the bandwidth resource group corresponding to the 1-bit information, that is, control information transmitted on a bandwidth resource included in the bandwidth resource group corresponding to the 1-bit information does not include the bandwidth resource identifier field, where t1 and t2 are integers. For example, a value of t1 is 1. In the second type of indication information, an information bit may be used to indicate that cross-bandwidth-resource scheduling is performed in any one of the J bandwidth resource groups.

The third type of indication information includes 1-bit information bit, to indicate whether the control information transmitted on the bandwidth resource included in the first bandwidth resource group includes a bandwidth resource identifier field. If a value of the information bit is t1, for any one of the J bandwidth resource groups, control information transmitted on a bandwidth resource included in the bandwidth resource group includes a bandwidth resource identifier field; or if a value of the information bit is t2 or is not t1, for any one of the J bandwidth resource groups, control information transmitted on a bandwidth resource included in the bandwidth resource group does not include a bandwidth resource identifier field, where t1 and t2 are integers. For example, a value of t1 is 1. In the indication information, 1-bit information indicates whether all bandwidth resource groups can be used for cross-bandwidth-resource scheduling. This effectively reduces indication overheads.

A bandwidth resource in the J bandwidth resource groups is used for data transmission between the gNB and the UE. For example, the gNB may configure the bandwidth resource in the J bandwidth resource groups as an operating bandwidth resource of the UE, and communicate UE-specific information with the UE on the operating bandwidth resource of the UE. The bandwidth resource in the J bandwidth resource groups may also be referred to as a candidate bandwidth resource or a configuration bandwidth resource of the UE, or may have other names. This is not limited in this application. Each of the J bandwidth resource groups includes at least one bandwidth resource. For example, if J is equal to 5, the five bandwidth resource groups include two bandwidth resources, one bandwidth resource, four bandwidth resources, five bandwidth resources, and three bandwidth resources, respectively. Because the first bandwidth resource group includes at least two bandwidth resources, the first bandwidth resource group may be at least one of a $1^{st}$ bandwidth resource group, a $3^{rd}$ bandwidth resource group, a $4^{th}$ bandwidth resource group, and a $5^{th}$ bandwidth resource group. The gNB may configure the J bandwidth resource groups for the UE according to any one of the following several bandwidth resource group configuration methods.

A first bandwidth resource group configuration method includes sending, by the gNB, resource configuration information of the J bandwidth resource groups to the UE; and receiving, by the UE, the resource configuration information of the J bandwidth resource groups. Configuration information of a bandwidth resource group includes an identifier of the bandwidth resource group and resource configuration information of a bandwidth resource included in the bandwidth resource group. For example, the resource configuration information includes frequency domain resource configuration information. By using the first bandwidth resource group configuration method, the base station can flexibly group bandwidth resources in a system resource based on a scheduling requirement.

A second bandwidth resource group configuration method includes sending, by the gNB, resource configuration information and numerologies that are of M2 bandwidth resources to the UE; and receiving, by the UE, the resource configuration information and the numerologies that are of the M2 bandwidth resources, and determining the J bandwidth resource groups based on the numerologies of the M2 bandwidth resources. The resource configuration information includes frequency domain resource configuration information. For example, an identifier of a bandwidth resource group corresponding to 15 kHz is configured as a bandwidth resource group 0, an identifier of a bandwidth resource group corresponding to 30 kHz is configured as a bandwidth resource group 1, and an identifier of a bandwidth resource group corresponding to 60 kHz is configured as a bandwidth resource group 2. The gNB sends resource configuration information and numerologies that are of six bandwidth resources to the UE. The six bandwidth resources are denoted as a bandwidth resource 0, a bandwidth resource 1, a bandwidth resource 2, a bandwidth resource 3, a bandwidth resource 4, and a bandwidth resource 5. Subcarrier spacings of the six bandwidth resources are respectively 15 kHz, 15 kHz, 30 kHz, 30 kHz, 30 kHz, and 60 kHz, and in this case, the six bandwidth resources are corresponding to three bandwidth resource groups. The bandwidth resource group 0 includes the bandwidth resource 0 and the bandwidth resource 1, the bandwidth resource group 1 includes the bandwidth resource 2, the bandwidth resource 3, and the bandwidth resource 4, and the bandwidth resource group 2 includes the bandwidth resource 5. By using the second bandwidth resource group configuration method, bandwidth resources with a same numerology are classified into one group. This avoids cross-bandwidth-resource scheduling with different numerologies, thereby reducing implementation complexity.

A third bandwidth resource group configuration method includes preconfiguring the J bandwidth resource groups. For one of the J bandwidth resource groups, resource configuration information of a bandwidth resource included in the bandwidth resource group is preconfigured, and numerology configuration information of the bandwidth resource included in the bandwidth resource group may be further preconfigured. By using the third bandwidth resource group configuration method, overheads for indicating a bandwidth resource group configuration are reduced in a predefinition manner.

Step 1602: If the control information transmitted on the bandwidth resource included in the first bandwidth resource group includes the bandwidth resource identifier, the gNB sends the control information to the UE on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource.

If the control information transmitted on the bandwidth resource included in the first bandwidth resource group includes the bandwidth resource identifier, the UE receives, on the first bandwidth resource, the control information sent by the gNB, where a bandwidth resource indicated by the bandwidth resource identifier included in the control information is the first bandwidth resource or the second bandwidth resource, and the first bandwidth resource group includes the first bandwidth resource and the second bandwidth resource. Cross-bandwidth-resource scheduling is implemented in the first bandwidth resource group by sending control information of the second bandwidth resource on the first bandwidth resource.

Step 1603: The gNB and the UE perform data transmission on the bandwidth resource indicated by the bandwidth resource identifier in the control information.

If the control information sent in step 1602 is corresponding to downlink data transmission, the gNB may send, through a data channel based on the control information sent in step 1602, data information to the UE on the bandwidth resource indicated by the bandwidth resource identifier in the control information. The UE may receive, through the data channel based on the control information received in step 1602 and on the bandwidth resource indicated by the bandwidth resource identifier in the control information, the data information sent by the gNB.

If the control information sent in step 1602 is corresponding to uplink data transmission, the gNB may receive, through a data channel based on the control information sent in step 1602 and on the bandwidth resource indicated by the bandwidth resource identifier in the control information, data information sent by the UE. The UE may send, through the data channel based on the control information received in step 1602, the data information to the gNB on the bandwidth resource indicated by the bandwidth resource identifier in the control information.

In the embodiments provided in this application, the method corresponding to FIG. 16 in the embodiments of this application is separately described from perspectives of the gNB, the UE, and interaction between the gNB and the UE. To implement the functions in the method corresponding to FIG. 16, the gNB and the UE each may include a hardware structure and/or a software module, to implement the foregoing functions by using the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

Figure 17:
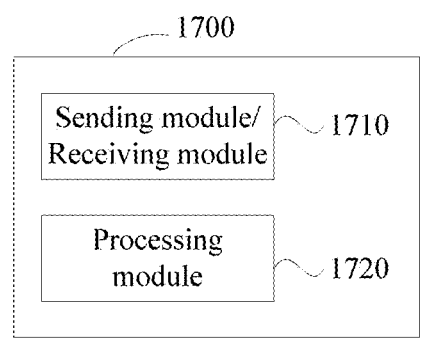
FIG. 17 is a schematic structural diagram of an apparatus according to an embodiment of this application.

FIG. 17 is a schematic structural diagram of an apparatus 1700 according to an embodiment of this application. The apparatus 1700 may be a gNB or an apparatus applied to a gNB. When the apparatus is applied to a gNB, the apparatus is capable of supporting the gNB in implementing the function of the gNB in the method corresponding to FIG. 16. The apparatus 1700 may be a hardware structure, a software module, or a combination of a hardware structure and a software module. The apparatus 1700 may be implemented by a chip system. In this embodiment of this application, the chip system may include a chip, or may include a chip and another discrete device.

As shown in FIG. 17, the apparatus 1700 includes a sending module/receiving module 1710 and a processing module 1720.

When the apparatus 1700 is configured to implement or support the gNB in implementing the method corresponding to FIG. 16, the sending module/receiving module 1710 is configured to send information to UE or receive information sent by UE to the gNB. For example, the sending module/receiving module 1710 is configured to: send indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, send the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and perform data transmission on the bandwidth resource indicated by the bandwidth resource identifier in the control information.

When the apparatus 1700 is configured to implement or support the gNB in implementing the method corresponding to FIG. 16, the processing module 1720 generates the information to be sent to the UE and processes the received information sent by the UE. For example, the processing module 1720 is configured to generate the indication information and the control information that are to be sent to the UE. The processing module 1720 is further configured to generate data information to be sent to the UE and process received data information sent by the UE.

Figure 18:
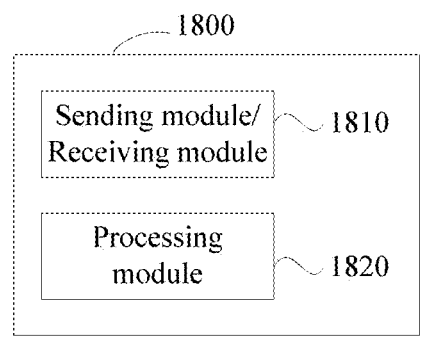
FIG. 18 is a schematic structural diagram of an apparatus according to an embodiment of this application.

FIG. 18 is a schematic structural diagram of an apparatus 1800 according to an embodiment of this application. The apparatus 1800 may be UE or an apparatus applied to UE. When the apparatus is applied to UE, the apparatus is capable of supporting the UE in implementing the function of the UE in the method corresponding to FIG. 16. The apparatus 1800 may be a hardware structure, a software module, or a combination of a hardware structure and a software module. The apparatus 1800 may be implemented by a chip system. In this embodiment of this application, the chip system may include a chip, or may include a chip and another discrete device.

As shown in FIG. 18, the apparatus 1800 includes a sending module/receiving module 1810 and a processing module 1820.

When the apparatus 1800 is configured to implement or support the UE in implementing the method corresponding to FIG. 16, the sending module/receiving module 1810 is configured to receive information sent by a gNB or send information to a gNB. For example, the sending module/receiving module 1810 is configured to: receive indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, receive the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and perform data transmission on the bandwidth resource indicated by the bandwidth resource identifier in the control information.

When the apparatus 1800 is configured to implement or support the UE in implementing the method corresponding to FIG. 16, the processing module 1820 is configured to generate the information to be sent to the gNB and process the received information sent by the gNB. For example, the processing module 1820 is configured to process the received control information and indication information that are sent by the gNB. The processing module 1820 is further configured to generate data information to be sent to the gNB and process received data information sent by the gNB.

Figure 19:
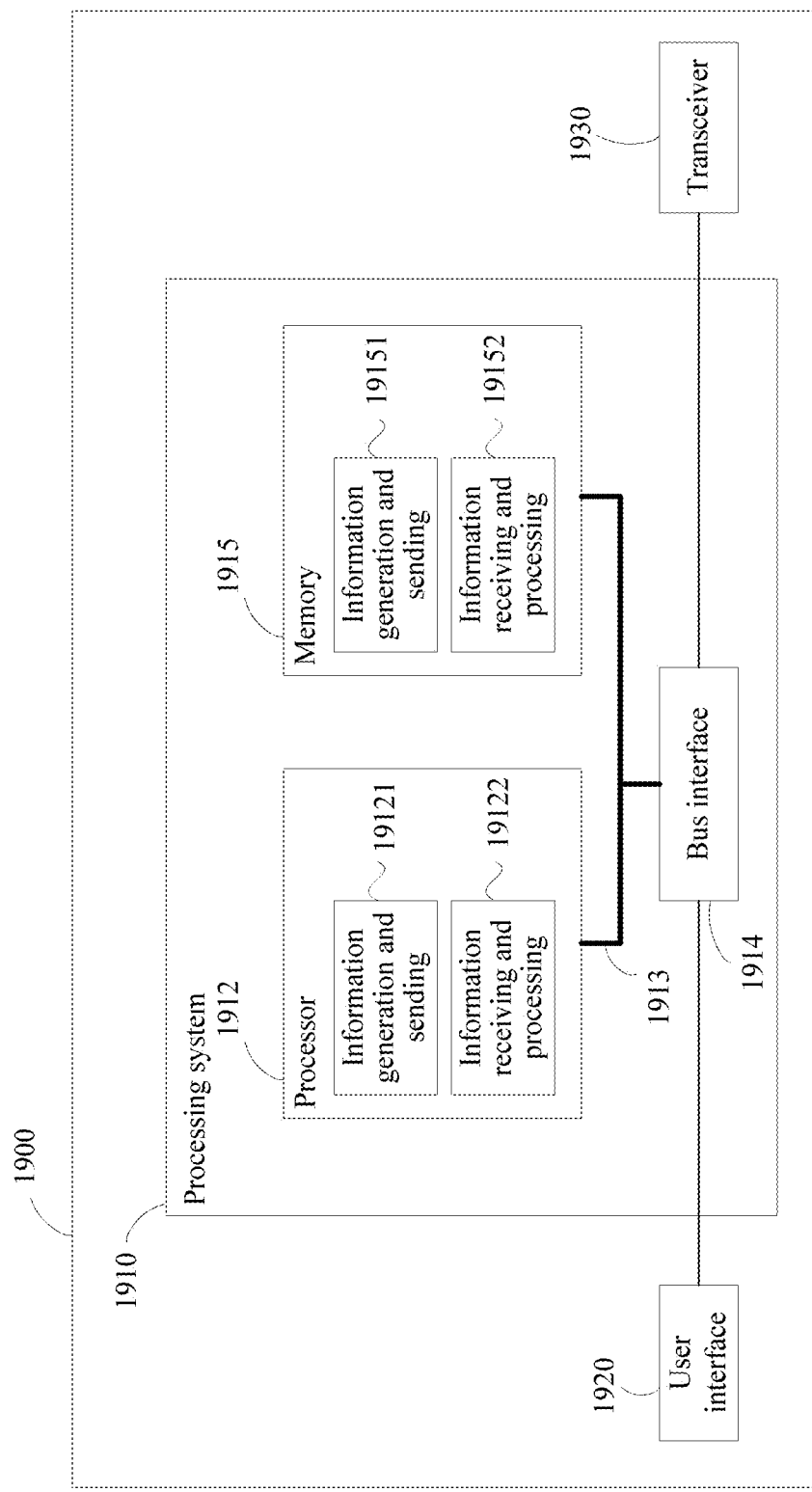
FIG. 19 is a schematic structural diagram of an apparatus according to an embodiment of this application.

FIG. 19 is a schematic structural diagram of an apparatus 1900 according to an embodiment of this application. The apparatus 1900 may be a gNB or an apparatus applied to a gNB. When the apparatus is applied to a gNB, the apparatus is capable of supporting the gNB in implementing the function of the gNB in the method corresponding to FIG. 16.

As shown in FIG. 19, the apparatus 1900 includes a processing system 1910, configured to implement or support the gNB in implementing the function of the gNB in the method corresponding to FIG. 16. The processing system 1910 may be a circuit, and the circuit may be implemented by a chip system. The processing system 1910 includes at least one processor 1912 that can be configured to implement or support the gNB in implementing the function of the gNB in the method corresponding to FIG. 16. When the processing system 1910 includes another apparatus in addition to the processor, the processor 1912 may be further configured to manage the another apparatus included in the processing system 1910. For example, the another apparatus may be at least one of the following memory 1915, bus 1913, and bus interface 1914.

The processing system 1910 may further include the memory 1915, configured to store a program instruction and/or data. If the processing system 1910 includes the memory 1915, the processor 1912 may be coupled to the memory 1915.

The processor 1912 may perform an operation with the memory 1915 cooperatively. The processor 1912 may execute the program instruction stored in the memory 1915. When executing the program instruction stored in the memory 1915, the processor 1912 can implement or support the gNB in implementing at least one of the functions of the gNB in the method corresponding to FIG. 16. Specifically, the processor 1912 is configured to generate and send to-be-sent information, and receive information and process the received information. For example, the processor 1912 generates and sends indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, generates the control information, and sends the control information on a first bandwidth resource, where a bandwidth resource indicated by the bandwidth resource identifier in the control information is the first bandwidth resource or a second bandwidth resource, and the first bandwidth resource group includes the first bandwidth resource and the second bandwidth resource; and performs data transmission on the bandwidth resource indicated by the bandwidth resource identifier in the control information. The processor 1912 may further read the data stored in the memory 1915. The memory 1915 may further store data that is obtained when the processor 1912 executes the program instruction.

The processor 1912 may include an information generation and sending circuit 19121. When the apparatus 1900 is configured to implement or support the gNB in implementing the method related to FIG. 16, the information generation and sending circuit 19121 is configured to generate and send to-be-sent information. For example, the information generation and sending circuit 19121 is configured to generate and send the indication information and the control information, and may be further configured to generate and send data information. The memory 1915 may further include an information generation and sending module 19151. When implementing the foregoing generation and sending functions, the information generation and sending circuit 19121 may further perform an operation with the information generation and sending module 19151 cooperatively.

The processor 1912 may further include an information receiving and processing circuit 19122. When the apparatus 1900 is configured to implement or support the gNB in implementing the method corresponding to FIG. 16, the information receiving and processing circuit 19122 may be configured to receive information and process the received information. For example, the information receiving and processing circuit 19122 may be configured to receive and process the data information. The memory 1915 may further include an information receiving and processing module 19152. When implementing the foregoing receiving and processing functions, the information receiving and processing circuit 19122 may further perform an operation with the information receiving and processing module 19152 cooperatively.

The processing system 1910 may further include the bus interface 1914, configured to provide an interface between the bus 1913 and another apparatus.

The apparatus 1900 may further include a transceiver 1930, configured to communicate with another communications device through a transmission medium, so that another apparatus in the apparatus 1900 may communicate with the another communications device. The another apparatus may be the processing system 1910. For example, the another apparatus in the apparatus 1900 may communicate with the another communications device by using the transceiver 1930, and receive and/or send corresponding information. It may also be described as: The another apparatus in the apparatus 1900 may receive corresponding information, where the corresponding information is received by the transceiver 1930 through the transmission medium, and the corresponding information may be exchanged between the transceiver 1930 and the another apparatus in the apparatus 1900 through the bus interface 1914 or through the bus interface 1914 and the bus 1913; and/or the another apparatus in the apparatus 1900 may send corresponding information, where the corresponding information is sent by the transceiver 1930 through the transmission medium, and the corresponding information may be exchanged between the transceiver 1930 and the another apparatus in the apparatus 1900 through the bus interface 1914 or through the bus interface 1914 and the bus 1913.

The apparatus 1900 may further include a user interface 1920. The user interface 1920 is an interface between a user and the apparatus 1900, and may be used for information exchange between the user and the apparatus 1900. For example, the user interface 1920 may be at least one of a keyboard, a mouse, a display, a speaker, a microphone, and a joystick.

The foregoing describes, from a perspective of the apparatus 1900, an apparatus structure provided in the embodiments of this application. In the apparatus, the processing system 1910 includes the processor 1912, and may further include at least one of the memory 1915, the bus 1913, and the bus interface 1914, to implement the function of the gNB in the method corresponding to FIG. 16. The processing system 1910 also falls within the protection scope of this application.

Figure 20:
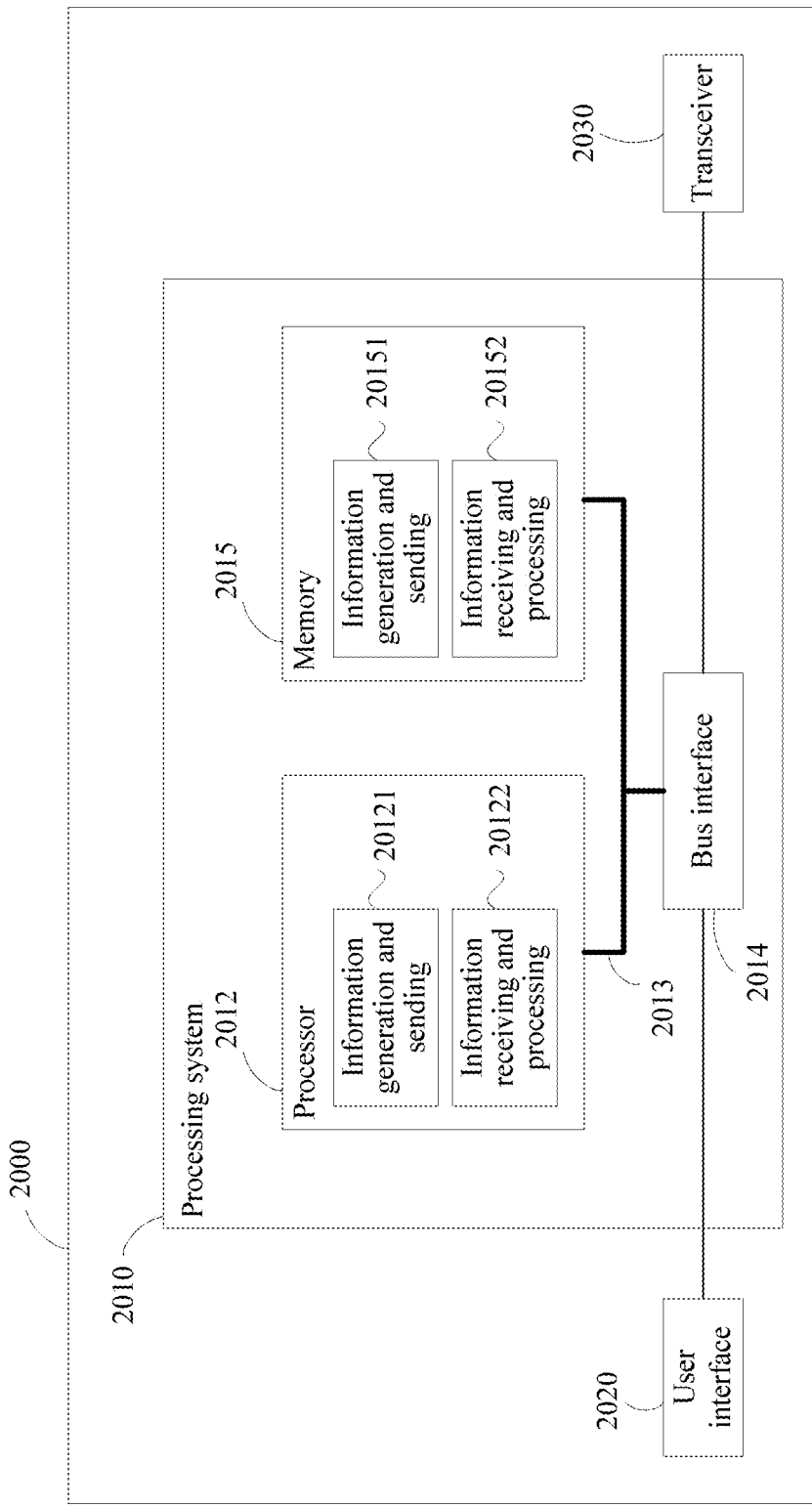
FIG. 20 is a schematic structural diagram of an apparatus according to an embodiment of this application.

FIG. 20 is a schematic structural diagram of an apparatus 2000 according to an embodiment of this application. The apparatus 2000 may be UE or an apparatus applied to UE. When the apparatus is applied to UE, the apparatus is capable of supporting the UE in implementing the function of the UE in the method corresponding to FIG. 16.

As shown in FIG. 20, the apparatus 2000 includes a processing system 2010, configured to implement or support the UE in implementing the function of the UE in the method corresponding to FIG. 16. The processing system 2010 may be a circuit, and the circuit may be implemented by a chip system. The processing system 2010 includes at least one processor 2012 that can be configured to implement or support the UE in implementing the function of the UE in the method corresponding to FIG. 16. When the processing system 2010 includes another apparatus in addition to the processor, the processor 2012 may be further configured to manage the another apparatus included in the processing system 2010. For example, the another apparatus may be at least one of the following memory 2015, bus 2013, and bus interface 2014.

The processing system 2010 may further include the memory 2015, configured to store a program instruction and/or data. If the processing system 2010 includes the memory 2015, the processor 2012 may be coupled to the memory 2015. The processor 2012 may perform an operation with the memory 2015 cooperatively. The processor 2012 may execute the program instruction stored in the memory 2015. When executing the program instruction stored in the memory 2015, the processor 2012 can implement or support the UE in implementing at least one of the functions of the UE in the method corresponding to FIG. 16. Specifically, the processor 2012 is configured to generate and send to-be-sent information, and receive information and process the received information. For example, the processor 2012 receives and processes indication information, where the indication information is used to indicate whether control information transmitted on a bandwidth resource included in a first bandwidth resource group includes a bandwidth resource identifier, or is used to indicate that control information transmitted on a bandwidth resource included in a first bandwidth resource group includes a bandwidth resource identifier, the first bandwidth resource group is in J bandwidth resource groups, and J is an integer greater than or equal to 2; if the control information transmitted on the bandwidth resource included in the first bandwidth resource group includes the bandwidth resource identifier, receives the control information on a first bandwidth resource, and processes the control information, where a bandwidth resource indicated by the bandwidth resource identifier in the control information is the first bandwidth resource or a second bandwidth resource, and the first bandwidth resource group includes the first bandwidth resource and the second bandwidth resource; and performs data transmission on the bandwidth resource indicated by the bandwidth resource identifier in the control information. The processor 2012 may further read the data stored in the memory 2015. The memory 2015 may further store data that is obtained when the processor 2012 executes the program instruction.

The processor 2012 may include an information generation and sending circuit 20121. When the apparatus 2000 is configured to implement or support the UE in implementing the method corresponding to FIG. 16, the information generation and sending circuit 20121 is configured to generate and send to-be-sent information. For example, the information generation and sending circuit 20121 is configured to generate and send data information. The memory 2015 may further include an information generation and sending module 20151. When implementing the foregoing generation and sending functions, the information generation and sending circuit 20121 may further perform an operation with the information generation and sending module 20151 cooperatively.

The processor 2012 may further include an information receiving and processing circuit 20122. When the apparatus 2000 is configured to implement or support the UE in implementing a method corresponding to FIG. 16, the information receiving and processing circuit 20122 is configured to receive information and process the received information. For example, the information receiving and processing circuit 20122 may be configured to receive and process the indication information and the control information, and may be further configured to receive and process the data information. The memory 2015 may further include an information receiving and processing module 20152. When implementing the foregoing receiving and processing functions, the information receiving and processing circuit 20122 may further perform an operation with the information receiving and processing module 20152 cooperatively.

The processing system 2010 may further include the bus interface 2014, configured to provide an interface between the bus 2013 and another apparatus.

The apparatus 2000 may further include a transceiver 2030, configured to communicate with another communications device through a transmission medium, so that another apparatus in the apparatus 2000 may communicate with the another communications device. The another apparatus may be the processing system 2010. For example, the another apparatus in the apparatus 2000 may communicate with the another communications device by using the transceiver 2030, and receive and/or send corresponding information. It may also be described as: The another apparatus in the apparatus 2000 may receive corresponding information, where the corresponding information is received by the transceiver 2030 through the transmission medium, and the corresponding information may be exchanged between the transceiver 2030 and the another apparatus in the apparatus 2000 through the bus interface 2014 or through the bus interface 2014 and the bus 2013; and/or the another apparatus in the apparatus 2000 may send corresponding information, where the corresponding information is sent by the transceiver 2030 through the transmission medium, and the corresponding information may be exchanged between the transceiver 2030 and the another apparatus in the apparatus 2000 through the bus interface 2014 or through the bus interface 2014 and the bus 2013.

The apparatus 2000 may further include a user interface 2020. The user interface 2020 is an interface between a user and the apparatus 2000, and may be used for information exchange between the user and the apparatus 2000. For example, the user interface 2020 may be at least one of a keyboard, a mouse, a display, a speaker, a microphone, and a joystick.

The foregoing describes, from a perspective of the apparatus 2000, an apparatus structure provided in the embodiments of this application. In the apparatus, the processing system 2010 includes the processor 2012, and may further include at least one of the memory 2015, the bus 2013, and the bus interface 2014, to implement the function of the UE in the method corresponding to FIG. 16. The processing system 2010 also falls within the protection scope of this application.

For a bandwidth resource, a gNB may send resource allocation information to the UE by using DCI, where a resource allocation type corresponding to the resource allocation information may be a resource allocation type 0 or a resource allocation type 1. Different resource allocation types may be corresponding to different DCI. Therefore, before the UE detects DCI, if the UE does not know whether the DCI sent by the gNB is DCI corresponding to the resource allocation type 0 or DCI corresponding to the resource allocation type 1, the UE may need to perform DCI detection based on each of the two types of DCI. This increases a quantity of times that the UE detects DCI, thereby increasing power consumption of the UE.

To reduce power consumption of the UE, this application provides a downlink control information transmission design. In this design, for resource allocation information included in control information, a resource allocation type corresponding to the resource allocation information is set to a resource allocation type 0 or a resource allocation type 1. An information bit length corresponding to the resource allocation information is G=max(LA,LB), where LA is a length of resource allocation information determined when a resource is allocated to the UE on a bandwidth resource based on the resource allocation type 0, and LB is a length of resource allocation information determined when a resource is allocated to the UE on a bandwidth resource based on the resource allocation type 1. According to this design, when the resources are allocated to the UE based on the resource allocation type 0 and the resource allocation type 1, the corresponding resource allocation information lengths are identical, so that corresponding control information lengths can be identical, and the UE can use one control information length to detect control information, thereby reducing power consumption of the UE. Otherwise, if a conventional resource allocation method is used, an information bit length of resource allocation information is determined based on a bandwidth resource and a resource allocation type that is corresponding to the resource allocation information. For a bandwidth resource, a gNB may send resource allocation information to the UE by using control information. When resource allocation types corresponding to the resource allocation information are different, information bit lengths of the resource allocation information may be different, and information bit lengths of the control information may be different. For example, if a resource allocation type corresponding to resource allocation information is a resource allocation type 0, an information bit length of control information is L1; or if a resource allocation type corresponding to resource allocation information is a resource allocation type 1, an information bit length of control information is L2. Before the UE receives the control information, if the UE does not know a resource allocation type corresponding to resource allocation information, the UE receives both control information with an information bit length of L1 and control information with an information bit length of L2. This increases a quantity of times control information is detected, thereby increasing power consumption of the UE.

Figure 21:
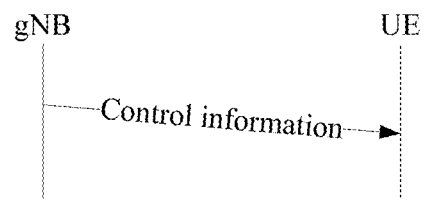
FIG. 21 is a schematic diagram of a DCI transmission method according to an embodiment of this application.

Based on the foregoing design, an embodiment of this application provides a downlink control information transmission method shown in FIG. 21.

As shown in FIG. 21, a gNB sends downlink control information to UE, where the control information includes G-bit resource allocation information, the G-bit resource allocation information indicates a resource allocated to the UE in a bandwidth resource and is used for data transmission between the gNB and the UE on the bandwidth resource, G=max(LA,LB), LA is a length of resource allocation information determined when a resource is allocated to the UE in the bandwidth resource based on a resource allocation type 0, and LB is a length of resource allocation information determined when a resource is allocated to the UE in the bandwidth resource based on a resource allocation type 1; and the UE receives the downlink control information sent by the gNB.

In a possible implementation, when the resource is allocated to the UE in the bandwidth resource based on the resource allocation type 0, one information bit in the resource allocation information is corresponding to one RBG in the bandwidth resource; and if a value of the information bit is t1, the resource allocated to the UE in the bandwidth resource includes the RBG; or if a value of the information bit is not t1 or is t2, the resource allocated to the UE in the bandwidth resource does not include the RBG. When the resource is allocated to the UE in the bandwidth resource based on the resource allocation type 0, a value of LA may be a quantity of RBGs in the bandwidth resource, and the quantity of RBGs in the bandwidth resource may be $\lceil N_{RB}/S_{RBG} \rceil$, where $N_{RB}$ is a quantity of RBs in the bandwidth resource, $S_{RBG}$ is a quantity of RBs included in the RBG, and the RBG includes at least one RB in the bandwidth resource. It should be noted that the resource allocation type 0 may also be referred to as a first resource allocation type, or may have other names. This is not limited in this application.

In a possible implementation, when the resource is allocated to the UE in the bandwidth resource based on the resource allocation type 1, the resource allocation information indicates a start RB allocated to the UE in the bandwidth resource and a quantity of RBs consecutively allocated to the UE in the bandwidth resource. When the resource is allocated to the UE in the bandwidth resource based on the resource allocation type 1, LB may be $\lceil \log_2(N_{RB} \times (N_{RB}+1)/2) \rceil$, where $N_{RB}$ is a quantity of RBs included in the bandwidth resource. It should be noted that the resource allocation type 1 may also be referred to as a second resource allocation type, or may have other names. This is not limited in this application.

According to the method described in FIG. 21, the gNB may further send resource allocation type indication information to the UE, to indicate a resource allocation type corresponding to the G-bit resource allocation information sent by the gNB to the UE, where the resource allocation type may be the resource allocation type 0 or the resource allocation type 1. The UE receives the resource allocation type indication information sent by the gNB, and determines, based on the resource allocation type indicated by the resource allocation type indication information and the received G-bit resource allocation information that is sent by the gNB, the resource allocated by the gNB to the UE in the bandwidth resource, where a value range of the resource allocation type indicated by the resource allocation type indication information includes 0 and 1. The gNB and the UE may perform data transmission on the allocated resource. For example, the data transmission includes at least one of sending data by the gNB to the UE and sending data by the UE to the gNB.

In the embodiments provided in this application, the method corresponding to FIG. 21 in the embodiments of this application is separately described from perspectives of the gNB, the UE, and interaction between the gNB and the UE. To implement the functions in the method corresponding to FIG. 21, the gNB and the UE each may include a hardware structure and/or a software module, to implement the foregoing functions by using the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

Figure 22:
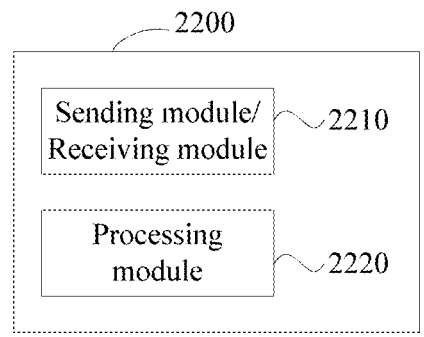
FIG. 22 is a schematic structural diagram of an apparatus according to an embodiment of this application.

FIG. 22 is a schematic structural diagram of an apparatus 2200 according to an embodiment of this application. The apparatus 2200 may be a gNB or an apparatus applied to a gNB. When the apparatus is applied to a gNB, the apparatus is capable of supporting the gNB in implementing the function of the gNB in the method corresponding to FIG. 21. The apparatus 2200 may be a hardware structure, a software module, or a combination of a hardware structure and a software module. The apparatus 2200 may be implemented by a chip system. In this embodiment of this application, the chip system may include a chip, or may include a chip and another discrete device.

As shown in FIG. 22, the apparatus 2200 includes a sending module/receiving module 2210 and a processing module 2220.

When the apparatus 2200 is configured to implement or support the gNB in implementing the method corresponding to FIG. 21, the sending module/receiving module 2210 is configured to send information to UE or receive information sent by UE to the gNB. For example, the sending module/receiving module 2210 is configured to generate and send downlink control information (DCI), where the control information includes G-bit resource allocation information, the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. A method for determining LA and LB, the resource allocation type 0, and the resource allocation type 1 are the same as those in the description in the method corresponding to FIG. 21.

When the apparatus 2200 is configured to implement or support the gNB in implementing the method corresponding to FIG. 21, the processing module 2220 generates the information to be sent to the UE and processes the received information sent by the UE. For example, the processing module 2220 is configured to generate the DCI to be sent to the UE. The processing module 2220 is further configured to generate data information to be sent to the UE and process received data information sent by the UE.

Figure 23:
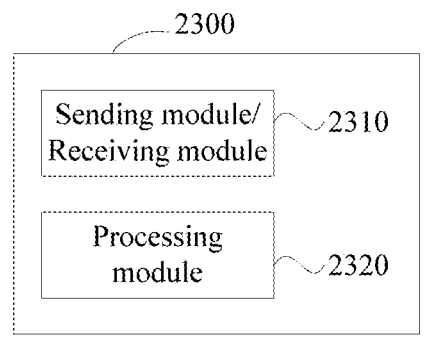
FIG. 23 is a schematic structural diagram of an apparatus according to an embodiment of this application.

FIG. 23 is a schematic structural diagram of an apparatus 2300 according to an embodiment of this application. The apparatus 2300 may be UE or an apparatus applied to UE. When the apparatus is applied to UE, the apparatus is capable of supporting the UE in implementing the function of the UE in the method corresponding to FIG. 21. The apparatus 2300 may be a hardware structure, a software module, or a combination of a hardware structure and a software module. The apparatus 2300 may be implemented by a chip system. In the embodiments of this application, the chip system may include a chip, or may include a chip and another discrete device.

As shown in FIG. 23, the apparatus 2300 includes a sending module/receiving module 2310 and a processing module 2320.

When the apparatus 2300 is configured to implement or support the UE in implementing the method corresponding to FIG. 21, the sending module/receiving module 2310 is configured to receive downlink control information (DCI), where the control information includes G-bit resource allocation information, the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. A method for determining LA and LB, the resource allocation type 0, and the resource allocation type 1 are the same as those in the description in the method corresponding to FIG. 21.

When the apparatus 2300 is configured to implement or support the UE in implementing the method corresponding to FIG. 21, the processing module 2320 is configured to generate information to be sent to a gNB and process received information sent by the gNB. For example, the processing module 2320 is configured to process the received DCI. The processing module 2320 may be further configured to generate data information to be sent to the gNB and process received data information sent by the gNB.

Figure 24:
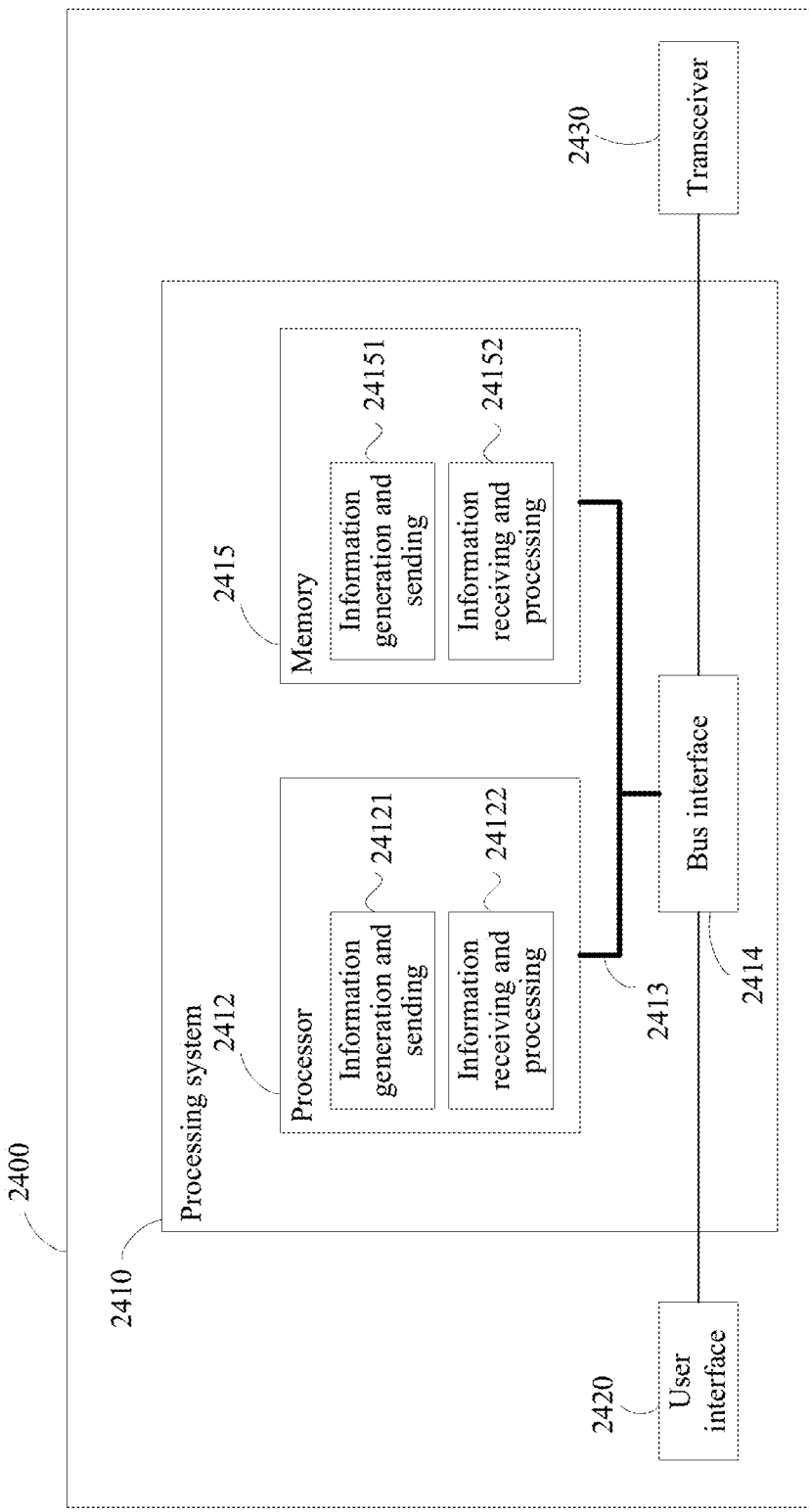
FIG. 24 is a schematic structural diagram of an apparatus according to an embodiment of this application.

FIG. 24 is a schematic structural diagram of an apparatus 2400 according to an embodiment of this application. The apparatus 2400 may be a gNB or an apparatus applied to a gNB. When the apparatus is applied to a gNB, the apparatus is capable of supporting the gNB in implementing the function of the gNB in the method corresponding to FIG. 21.

As shown in FIG. 24, the apparatus 2400 includes a processing system 2410, configured to implement or support the gNB in implementing the function of the gNB in the method corresponding to FIG. 21. The processing system 2410 may be a circuit, and the circuit may be implemented by a chip system. The processing system 2410 includes at least one processor 2412 that can be configured to implement or support the gNB in implementing the function of the gNB in the method corresponding to FIG. 21. When the processing system 2410 includes another apparatus in addition to the processor, the processor 2412 may be further configured to manage the another apparatus included in the processing system 2410. For example, the another apparatus may be at least one of the following memory 2415, bus 2413, and bus interface 2414.

The processing system 2410 may further include the memory 2415, configured to store a program instruction and/or data. If the processing system 2410 includes the memory 2415, the processor 2412 may be coupled to the memory 2415.

The processor 2412 may perform an operation with the memory 2415 cooperatively. The processor 2412 may execute the program instruction stored in the memory 2415. When executing the program instruction stored in the memory 2415, the processor 2412 can implement or support the gNB in implementing at least one of the functions of the gNB in the method corresponding to FIG. 21. Specifically, the processor 2412 is configured to generate and send downlink control information (DCI), where the control information includes G-bit resource allocation information, the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. A method for determining LA and LB, the resource allocation type 0, and the resource allocation type 1 are the same as those in the description in the method corresponding to FIG. 21. The processor 2412 may be further configured to generate and send data information, and receive and process data information. The processor 2412 may further read the data stored in the memory 2415. The memory 2415 may further store data that is obtained when the processor 2412 executes the program instruction.

The processor 2412 may include an information generation and sending circuit 24121. When the apparatus 2400 is configured to implement or support the gNB in implementing the method related to FIG. 21, the information generation and sending circuit 24121 is configured to generate and send to-be-sent information. For example, the information generation and sending circuit 24121 is configured to generate and send the downlink control information, and may be further configured to generate and send the data information. The memory 2415 may further include an information generation and sending module 24151. When implementing the foregoing generation and sending functions, the information generation and sending circuit 24121 may further perform an operation with the information generation and sending module 24151 cooperatively.

The processor 2412 may further include an information receiving and processing circuit 24122. When the apparatus 2400 is configured to implement or support the gNB in implementing the method corresponding to FIG. 21, the information receiving and processing circuit 24122 may be configured to receive information and process the received information. For example, the information receiving and processing circuit 24122 may be configured to receive and process the data information. The memory 2415 may further include an information receiving and processing module 24152. When implementing the foregoing receiving and processing functions, the information receiving and processing circuit 24122 may further perform an operation with the information receiving and processing module 24152 cooperatively.

The processing system 2410 may further include the bus interface 2414, configured to provide an interface between the bus 2413 and another apparatus.

The apparatus 2400 may further include a transceiver 2430, configured to communicate with another communications device through a transmission medium, so that another apparatus in the apparatus 2400 may communicate with the another communications device. The another apparatus may be the processing system 2410. For example, the another apparatus in the apparatus 2400 may communicate with the another communications device by using the transceiver 2430, and receive and/or send corresponding information. It may also be described as: The another apparatus in the apparatus 2400 may receive corresponding information, where the corresponding information is received by the transceiver 2430 through the transmission medium, and the corresponding information may be exchanged between the transceiver 2430 and the another apparatus in the apparatus 2400 through the bus interface 2414 or through the bus interface 2414 and the bus 2413; and/or the another apparatus in the apparatus 2400 may send corresponding information, where the corresponding information is sent by the transceiver 2430 through the transmission medium, and the corresponding information may be exchanged between the transceiver 2430 and the another apparatus in the apparatus 2400 through the bus interface 2414 or through the bus interface 2414 and the bus 2413.

The apparatus 2400 may further include a user interface 2420. The user interface 2420 is an interface between a user and the apparatus 2400, and may be used for information exchange between the user and the apparatus 2400. For example, the user interface 2420 may be at least one of a keyboard, a mouse, a display, a speaker, a microphone, and a joystick.

The foregoing describes, from a perspective of the apparatus 2400, an apparatus structure provided in the embodiments of this application. In the apparatus, the processing system 2410 includes the processor 2412, and may further include at least one of the memory 2415, the bus 2413, and the bus interface 2414, to implement the function of the gNB in the method corresponding to FIG. 21. The processing system 2410 also falls within the protection scope of this application.

Figure 25:
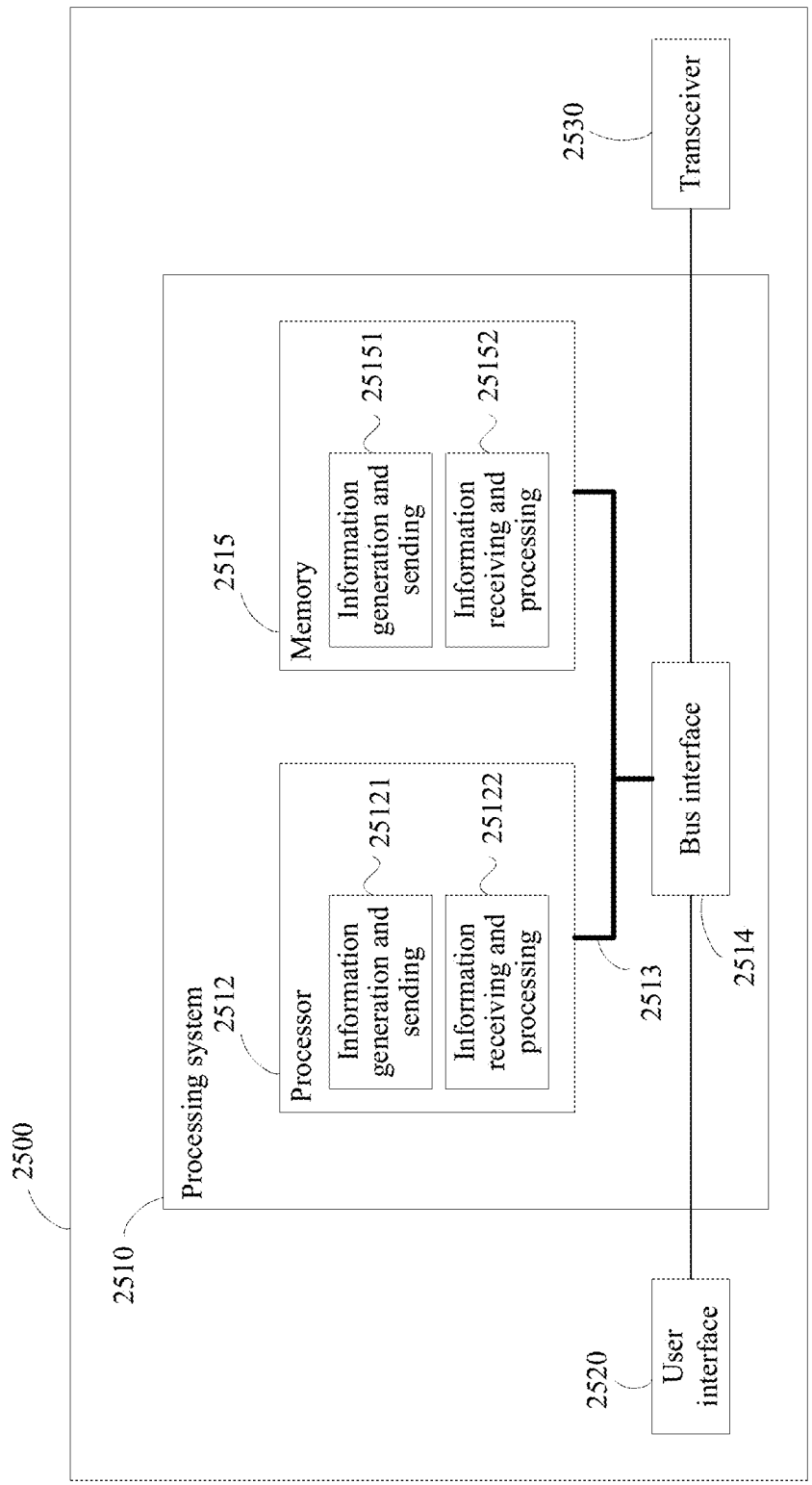
FIG. 25 is a schematic structural diagram of an apparatus according to an embodiment of this application.

FIG. 25 is a schematic structural diagram of an apparatus 2500 according to an embodiment of this application. The apparatus 2500 may be UE or an apparatus applied to UE. When the apparatus is applied to UE, the apparatus is capable of supporting the UE in implementing the function of the UE in the method corresponding to FIG. 21.

As shown in FIG. 25, the apparatus 2500 includes a processing system 2510, configured to implement or support the UE in implementing the function of the UE in the method corresponding to FIG. 21. The processing system 2510 may be a circuit, and the circuit may be implemented by a chip system. The processing system 2510 includes at least one processor 2512 that can be configured to implement or support the UE in implementing the function of the UE in the method corresponding to FIG. 21. When the processing system 2510 includes another apparatus in addition to the processor, the processor 2512 may be further configured to manage the another apparatus included in the processing system 2510. For example, the another apparatus may be at least one of the following memory 2515, bus 2513, and bus interface 2514.

The processing system 2510 may further include the memory 2515, configured to store a program instruction and/or data. If the processing system 2510 includes the memory 2515, the processor 2512 may be coupled to the memory 2515. The processor 2512 may perform an operation with the memory 2515 cooperatively. The processor 2512 may execute the program instruction stored in the memory 2515. When executing the program instruction stored in the memory 2515, the processor 2512 can implement or support the UE in implementing at least one of the functions of the UE in the method corresponding to FIG. 21. Specifically, the processor 2512 is configured to generate and send to-be-sent information, and receive information and process the received information. For example, the processor 2512 receives and processes downlink control information (DCI), where the control information includes G-bit resource allocation information, the G-bit resource allocation information indicates a resource allocated in a bandwidth resource, for performing data transmission on the bandwidth resource; and G=max(LA,LB), LA is a length of resource allocation information determined when a resource is allocated in the bandwidth resource based on a resource allocation type 0, LB is a length of resource allocation information determined when a resource is allocated in the bandwidth resource based on a resource allocation type 1, and LA and LB are integers greater than or equal to 1. A method for determining LA and LB, the resource allocation type 0, and the resource allocation type 1 are the same as those in the description in the method corresponding to FIG. 21. The processor 2512 may be further configured to generate and send data information, and receive and process data information. The processor 2512 may further read the data stored in the memory 2515. The memory 2515 may further store data that is obtained when the processor 2512 executes the program instruction.

The processor 2512 may include an information generation and sending circuit 25121. When the apparatus 2500 is configured to implement or support the UE in implementing the method corresponding to FIG. 21, the information generation and sending circuit 25121 is configured to generate and send to-be-sent information. For example, the information generation and sending circuit 25121 is configured to generate and send the data information. The memory 2515 may further include an information generation and sending module 25151. When implementing the foregoing generation and sending functions, the information generation and sending circuit 25121 may further perform an operation with the information generation and sending module 25151 cooperatively.

The processor 2512 may further include an information receiving and processing circuit 25122. When the apparatus 2500 is configured to implement or support the UE in implementing the method related to FIG. 21, the information receiving and processing circuit 25122 is configured to receive information and process the received information. For example, the information receiving and processing circuit 25122 may be configured to receive and process the downlink control information, and may be further configured to receive and process the data information. The memory 2515 may further include an information receiving and processing module 25152. When implementing the foregoing receiving and processing functions, the information receiving and processing circuit 25122 may further perform an operation with the information receiving and processing module 25152 cooperatively.

The processing system 2510 may further include the bus interface 2514, configured to provide an interface between the bus 2513 and another apparatus.

The apparatus 2500 may further include a transceiver 2530, configured to communicate with another communications device through a transmission medium, so that another apparatus in the apparatus 2500 may communicate with the another communications device. The another apparatus may be the processing system 2510. For example, the another apparatus in the apparatus 2500 may communicate with the another communications device by using the transceiver 2530, and receive and/or send corresponding information. It may also be described as: The another apparatus in the apparatus 2500 may receive corresponding information, where the corresponding information is received by the transceiver 2530 through the transmission medium, and the corresponding information may be exchanged between the transceiver 2530 and the another apparatus in the apparatus 2500 through the bus interface 2514 or through the bus interface 2514 and the bus 2513; and/or the another apparatus in the apparatus 2500 may send corresponding information, where the corresponding information is sent by the transceiver 2530 through the transmission medium, and the corresponding information may be exchanged between the transceiver 2530 and the another apparatus in the apparatus 2500 through the bus interface 2514 or through the bus interface 2514 and the bus 2513.

The apparatus 2500 may further include a user interface 2520. The user interface 2520 is an interface between a user and the apparatus 2500, and may be used for information exchange between the user and the apparatus 2500. For example, the user interface 2520 may be at least one of a keyboard, a mouse, a display, a speaker, a microphone, and a joystick.

The foregoing describes, from a perspective of the apparatus 2500, an apparatus structure provided in the embodiments of this application. In the apparatus, the processing system 2510 includes the processor 2512, and may further include at least one of the memory 2515, the bus 2513, and the bus interface 2514, to implement the function of the UE in the method corresponding to FIG. 21. The processing system 2510 also falls within the protection scope of this application.

In the apparatus embodiment of this application, module division of an apparatus is logical function division and may be another division in an actual implementation. For example, all function modules of the apparatus may be integrated into one module, or may be independent from each other, or at least two function modules may be integrated into one module.

All or some of the methods provided in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or a microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions of this application, but not to limit the protection scope of this application. Any modifications, equivalent replacements, improvements, and the like made on the basis of the technical solutions of this application shall fall within the protection scope of this application

What is claimed is:

1. A method, comprising:
   receiving downlink control information (DCI), wherein the DCI comprises G-bit resource allocation information, and the G-bit resource allocation information indicates a resource allocated to a terminal device in a bandwidth part; and
   performing data transmission on the resource allocated to the terminal device in the bandwidth part; and
   wherein G=max(LA,LB), LA is a length of resource allocation information determined when the resource is allocated to the terminal device in the bandwidth part based on a resource allocation type 0, LB is a length of resource allocation information determined when the resource is allocated to the terminal device in the bandwidth part based on a resource allocation type 1, LA and LB are independent of each other, and LA and LB are integers greater than or equal to 1.

2. The method according to claim 1, comprising:
receiving resource allocation type indication information, wherein the resource allocation type indication information indicates a resource allocation type corresponding to the G-bit resource allocation information, and the resource allocation type is the resource allocation type 0 or the resource allocation type 1.

3. The method according to claim 1, wherein:
the resource is allocated to the terminal device in the bandwidth part based on the resource allocation type 0;
one information bit in the G-bit resource allocation information corresponds to one resource block group (RBG) in the bandwidth part; and
when a value of the one information bit is t1, the resource allocated to the terminal device in the bandwidth part comprises the RBG, or when a value of the one information bit is not t1 or is t2, the resource allocated to the terminal device in the bandwidth part does not comprise the RBG, and wherein t1 and t2 are integers.

4. The method according to claim 3, wherein when a value of the one information bit is t1, the resource allocated to the terminal device in the bandwidth part comprises the RBG, and when a value of the one information bit is not t1 or is t2, the resource allocated to the terminal device in the bandwidth part does not comprise the RBG.

5. The method according to claim 1, wherein the resource is allocated to the terminal device in the bandwidth part based on the resource allocation type 1, and the G-bit resource allocation information indicates a start resource block (RB) allocated to the terminal device in the bandwidth part and a quantity of RBs consecutively allocated to the terminal device in the bandwidth part.

6. A terminal device, comprising:
a processor;
a non-transitory memory, wherein the non-transitory memory is coupled to the processor, and the processor executes a program instruction stored in the non-transitory memory; and
a transceiver, wherein the transceiver is coupled to the processor, and the processor is configured to use the transceiver to:
receive downlink control information (DCI), wherein the DCI comprises G-bit resource allocation information, and the G-bit resource allocation information indicates a resource allocated to the terminal device in a bandwidth part; and
perform data transmission on the resource allocated to the terminal device in the bandwidth part; and
wherein G=max(LA,LB), LA is a length of resource allocation information determined when the resource is allocated to the terminal device in the bandwidth part based on a resource allocation type 0, LB is a length of resource allocation information determined when the resource is allocated to the terminal device in the bandwidth part based on a resource allocation type 1, LA and LB are independent of each other, and LA and LB are integers greater than or equal to 1.

7. The terminal device according to claim 6, wherein the processor is configured to use the transceiver to receive resource allocation type indication information, wherein the resource allocation type indication information indicates a resource allocation type corresponding to the G-bit resource allocation information, and the resource allocation type is the resource allocation type 0 or the resource allocation type 1.

8. The terminal device according to claim 6, wherein:
the resource is allocated to the terminal device in the bandwidth part based on the resource allocation type 0;
one information bit in the G-bit resource allocation information corresponds to one resource block group (RBG) in the bandwidth part; and
when a value of the one information bit is t1, the resource allocated to the terminal device in the bandwidth part comprises the RBG, or when a value of the one information bit is not t1 or is t2, the resource allocated to the terminal device in the bandwidth part does not comprise the RBG, wherein t1 and t2 are integers.

9. The terminal device according to claim 8, wherein when a value of the one information bit is t1, the resource allocated to the terminal device in the bandwidth part comprises the RBG, and when a value of the one information bit is not t1 or is t2, the resource allocated to the terminal device in the bandwidth part does not comprise the RBG.

10. The terminal device according to claim 6, wherein the resource is allocated to the terminal device in the bandwidth part based on the resource allocation type 1, and the G-bit resource allocation information indicates a start resource block (RB) allocated to the terminal device in the bandwidth part and a quantity of RBs consecutively allocated to the terminal device in the bandwidth part.

11. A network device, comprising:
a processor;
a non-transitory memory, wherein the non-transitory memory is coupled to the processor, and the processor is configured to execute a program instruction stored in the non-transitory memory; and
a transceiver, wherein the transceiver is coupled to the processor, and the processor is configured to use the transceiver to:
send downlink control information (DCI), wherein the DCI comprises G-bit resource allocation information, and the G-bit resource allocation information indicates a resource allocated to a terminal device in a bandwidth part; and
perform data transmission on the resource allocated to the terminal device; and
wherein G=max(LA,LB), LA is a length of resource allocation information determined when the resource is allocated to the terminal device in the bandwidth part based on a resource allocation type 0, LB is a length of resource allocation information determined when the resource is allocated to the terminal device in the bandwidth part based on a resource allocation type 1, LA and LB are independent of each other, and LA and LB are integers greater than or equal to 1.

12. The network device according to claim 11, wherein the processor is configured to use the transceiver to send resource allocation type indication information, wherein the resource allocation type indication information indicates a resource allocation type corresponding to the G-bit resource allocation information, and the resource allocation type is the resource allocation type 0 or the resource allocation type 1.

13. The network device according to claim 11, wherein:
the resource is allocated to the terminal device in the bandwidth part based on the resource allocation type 0;

one information bit in the G-bit resource allocation information corresponds to one resource block group (RBG) in the bandwidth part; and when a value of the one information bit is t1, the resource allocated to the terminal device in the bandwidth part comprises the RBG, or when a value of the one information bit is not t1 or is t2, the resource allocated to the terminal device in the bandwidth part does not comprise the RBG, and wherein t1 and t2 are integers.

14. The network device according to claim 13, wherein when a value of the one information bit is t1, the resource allocated to the terminal device in the bandwidth part comprises the RBG, and when a value of the one information bit is not t1 or is t2, the resource allocated to the terminal device in the bandwidth part does not comprise the RBG.

15. The network device according to claim 11, wherein the resource is allocated to the terminal device in the bandwidth part based on the resource allocation type 1, and the G-bit resource allocation information indicates a start resource block (RB) allocated to the terminal device in the bandwidth part and a quantity of RBs consecutively allocated to the terminal device in the bandwidth part.

\* \* \* \* \*